United States Patent Office 3,139,421
Patented June 30, 1964

---

3,139,421
AZO COMPOUNDS AND METHODS FOR PRODUCING SAME
Edward F. Elslager, Donald F. Worth, David B. Capps, and Leslie M. Werbel, all of Ann Arbor, Mich., assignors to Parke, Davis & Company, Detroit, Mich., a corporation of Michigan
No Drawing. Filed Mar. 14, 1960, Ser. No. 14,523
6 Claims. (Cl. 260—154)

This invention relates to a novel class of azo compounds and salts thereof and to methods for obtaining same. More particularly, it relates to novel 4-(dialkylaminoalkylamino)-1-naphthylazo heterocyclic compounds and non-toxic acid-addition salts thereof which possess anti-parasitic activity.

The novel 4 - (dialkylaminoalkylamino)-1-naphthylazo heterocyclic compounds with which the present invention is concerned have in their free base form the formula

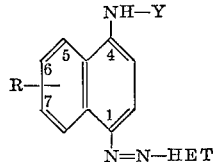

where Y represents a radical of the formula

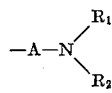

or a radical of the formula

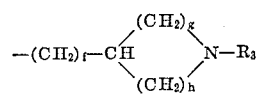

A represents an alkylene radical containing between 2 and 8 carbon atoms inclusive, or an alkylene radical containing more than 2 and less than 7 carbon atoms in which one of the methylene groups not attached to the nitrogen atoms is replaced by —O—, —S—, =CHOH, =COH-(lower alkyl), =N(lower alkyl) or =CH(diloweralkylaminoalkyl); R represents hydrogen, a lower alkyl radical, a halogen atom, or a lower alkoxy radical, said R group can be attached to the 5th, 6th, or 7th positions of the naphthylene nucleus; $R_1$ and $R_2$ each represents an alkyl radical, a cycloalkyl radical, a hydroxyalkyl radical, or an alkoxyalkyl, said radicals containing fewer than 7 carbon atoms, the allyl or methallyl radicals, or a lower dialkylaminoalkyl radical containing 3 to 7 carbon atoms inclusive, or in combination with —N< represent a heterocyclic radical having fewer than 10 carbon atoms such as e.g. a pyrrolidyl, piperidinyl, hexamethyleneiminyl, morpholinyl, piperazinyl, homopiperazinyl or decahydroquinolyl radical, said heterocyclic radical optionally bearing lower alkyl, lower hydroxyalkyl, lower alkoxyalkyl, hydroxy, lower alkoxy, amino, or lower dialkylaminoalkyl substituents; $f$ represents an integer from 0 to 3 inclusive, $g$ and $h$ represent integers such that $g+h=3$ or 4; $R_3$ represents a lower alkyl, lower hydroxyalkyl, lower alkoxyalkyl, or a lower dialkylaminoalkyl radical; and HET represents a heterocyclic radical of fewer than 15 carbon atoms, a carbon atom of which is bound to the azo nitrogen atom, said heterocyclic radical may carry one or more substituents such as keto, hydroxy, lower alkyl, lower hydroxyalkyl, lower aminoalkyl, halo, phenoxy, acyl, sulfo, carboxy, thio, sulfonamido, sulfonyl, imino, phenyl, lower alkoxy, nitro, or amino radicals. Examples of suitable heterocyclic radicals are the furyl, thienyl, pyrryl, pyrazolyl, imidazolyl, thiazolyl, isothiazolyl, oxazolyl, isooxazolyl, hexamethyleneiminyl, oxazinyl, thiazinyl, triazolyl, oxadiazolyl, thiadiazolyl, dioxanyl, oxathiolyl, oxadiazolyl, dithiinyl, oxathiinyl, pyranyl, thiapyranyl, pyridyl, pyrimidyl, pyridazinyl, pyrazinyl, or the tetrazolyl radicals, their N-oxides and benzo-, and naphtho-condensed ring systems.

In accordance with the invention, the novel 4-(dialkylaminoalkylamino)-1-naphthylazo heterocyclic compounds of the above formula and their acid-addition salts can be produced in a number of ways.

For example, the products of the invention can be prepared by coupling an a-naphthylamine having in free base form the formula

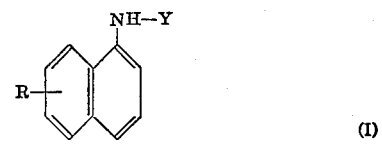

(I)

with a diazonium compound of the formula

In the above formula Ac⁻ represents the anion of an acid or the OH⁻ ion and R, Y, and HET have the same meaning as given above. Preferably, the reaction is conducted under acidic or neutral conditions (pH≦7), although if desired, basic conditions can be employed. In carrying out this condensation it is generally satisfactory to employ substantially equivalent quantities of the reactants in the presence of a suitable solvent. Suitable solvents for the reaction are aqueous mixtures of water-miscible aliphatic alcohols, such as methanol, ethanol and propanol; tetrahydrofuran, N,N-dimethylacetamide, N,N-dimethylformamide, simple organic acids such as formic acid, acetic acid, propionic acid and the like; or the acid furnishing the anion represented by Ac⁻. Where it is desired to carry out the reaction at a controlled pH, a suitable buffer system may be employed. In general, the time and temperature of the reaction are not critical; however, heating is to be avoided, and a temperature less than 15° C. is preferred.

The diazonium compounds of the above formula can be conveniently prepared in situ, by the reaction of an amine of the formula

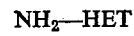

with an alkali nitrite such as e.g. sodium nitrite in an acid medium (pH <7) or by other methods known to organic chemists, and added to the coupling reaction mixture containing the desired a-naphthylamine of Formula I.

The a-naphthylamines of the Formula I employed as starting materials in this reaction can be prepared in various ways.

For example, they can be prepared by aminoalkylation of an a-naphthylamine of the formula

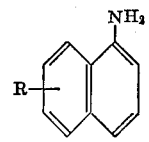

or an alkali metal salt thereof with an aminoalkylating agent of the formula

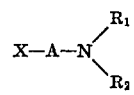

or of the formula

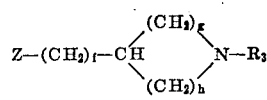

wherein X represents a halogen atom or the

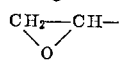

group; Z represents a halogen atom, and A, R, $R_1$, $R_2$, $R_3$, $f$, $g$ and $h$ have the aforementioned significance. The reaction proceeds readily in a solvent medium. Suitable solvents for the reaction are benzene, toluene, and the like. Where the free base form is employed the reaction is preferably conducted in the presence of a base such as an alkali-metal carbonate, for example, potassium carbonate.

a-Naphthylamines of Formula I can also be prepared by reduction of a Schiff base having the formula

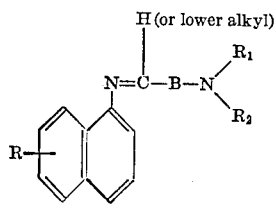

The reduction can be conveniently effected by hydrogenation in the presence of a noble metal catalyst, such as e.g. 20% palladium on charcoal. The Schiff bases of the above formula can be readily prepared by condensation of an aminoaldehyde or ketone of the formula

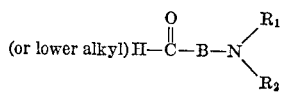

and an a-naphthylamine of the formula

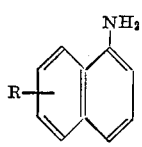

in a solvent medium. Suitable solvents for the reaction are benzene, toluene and the like. The reaction is favored by an acid catalyst such as e.g. p-toluene sulfonic acid, and by temperatures in excess of 50° C. and is preferably carried out between 50 and 150° C. The Schiff bases so formed can be reduced catalytically without isolation or purification from the reaction mixture. In the above formulas R, $R_1$ and $R_2$ have the aforementioned significance and B represents an alkylene radical containing between 2 and 7 carbon atoms inclusive, or an alkylene radical containing more than 2 and less than 6 carbon atoms in which one of the methylene groups not attached to the nitrogen atoms is replaced by —O—, —S—, =CHOH, =CH(dialkylaminoalkyl) or =N(lower alkyl).

Additionally, the a-naphthylamines of Formula I can be prepared by a replacement reaction between a compound of the formula

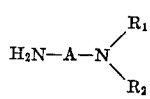

or of the formula

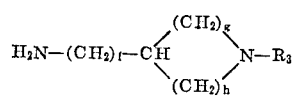

and the hydroxyl group on an a-naphthol of the formula

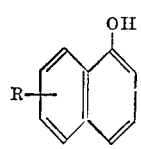

The reaction is favored by temperatures of 100–175° C. and is preferably carried out in a sealed container in an aqueous medium and in the presence of an agent such as sulfur dioxide, sodium bisulfite or sodium hydrosulfite. In the above formulas A, R, $R_1$, $R_2$, $R_3$, $f$, $g$, and $h$ have the aforementioned significance.

Another process for the preparation of the compounds of the invention comprises reacting an azo compound of the formula

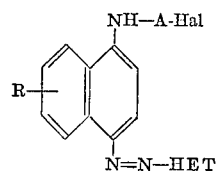

with an amine of the formula

wherein Hal represents a hologen atom and A, R, $R_1$, $R_2$, and HET are defined as hereinbefore. The reaction is preferably carried out in a solvent medium. Some suitable solvents for this purpose are aliphatic alcohols such as ethanol, isopropanol, pentanol, glycols or the amine employed in the reaction. The relative proportions of the reactants is not critical; however, best results are obtained when an excess of the amine is employed. The reaction is favored by temperatures in excess of 50° C. and preferably carried out between 50 and 150° C.

The azo compounds of the above formula employed as starting materials in this reaction are conveniently prepared by the coupling of a compound of the formula

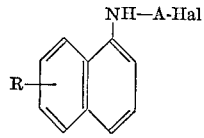 (II)

with a diazonium compound of the formula

[N≡N—HET]+Ac⁻ wherein Hal, A, R, and HET have the aforementioned significance and Ac⁻ represents the OH⁻ ion or the anion of a hydrohalic acid. Preferably, the reaction is conducted under acidic or neutral conditions (pH ≦7), although if desired, basic conditions can be employed. In carrying out this condensation it is satisfactory to employ substantially equivalent quantities of the reactants in the presence of a suitable solvent. Suitable solvents for the reaction are aqueous mixtures of water-miscible aliphatic alcohols, such as methanol, ethanol and propanol; tetrahydrofuran, N,N-dimethylacetamide; simple organic acids such as formic acid, acetic acid, propionic acid and the like; or an excess of the acid furnishing the anion represented by Ac⁻. Where it is desired to carry out the reaction at a controlled pH, a suitable buffer system may be employed. In general, the time and temperature of the reaction are not critical; however, heating is to be avoided, and a temperature less than 15° C. is preferred.

The diazonium compounds of the above formula can be conveniently prepared in situ, by the reaction of an amine of the formula $NH_2$—HET with an alkali metal nitrite such as e.g. sodium nitrite in an acid medium (pH <7) or by other methods known to organic chemists, and added to the coupling reaction mixture containing the desired compound of Formula II.

The compounds of the invention can also be produced by hydrolysis of a compound of the formula

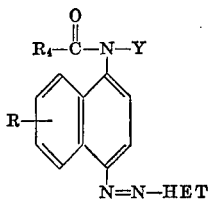

wherein the group

is particularly susceptible to hydrolytic cleavage by acidic or basic hydrolytic agents under mild conditions. In the above formulas $R_4$ represents the hydrogen atom or a perhaloalkyl radical such as e.g. —$CF_3$, and R, Y, and HET have the aforementioned significance. Where $R_4$ represents a perhaloalkyl radical, the hydrolysis is preferably effected by dissolving the starting material in a water-miscible inert organic solvent such as methanol, adding an aqueous solution of an alkali metal hydroxide, conveniently and aqueous solution of sodium or potassium hydroxide having a normality of about 1 to 3, and allowing the reaction mixture to stand (with or without stirring) at about room temperature until the reaction is completed. Where $R_4$ represents the hydrogen atom, hydrolysis is preferably conducted in the presence of a mineral acid such as e.g. hydrochloric acid under similar reaction conditions.

The amides employed as starting materials in this process are novel per se and can be prepared by a process which comprises acylation of a nitro compound having the formula

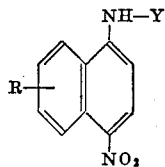

with an acid of the formula

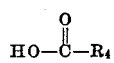

or a functional derivative thereof to yield an amide of the formula

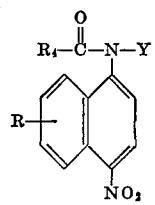

subjecting said amide to hydrogenation in the presence of a catalyst such as e.g. Raney nickel to yield an amino compound of the formula

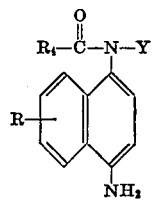

converting the said amino compound to a diazonium compound, and coupling the said diazonium compound with a suitable heterocyclic compound. In the above formulas Y, R and $R_4$ have the aforementioned significance. Where $R_4$ represents the perhaloalkyl group such as e.g. trifluoromethyl, the acylation reaction is conveniently effected by employing the acid anhydride in a solvent medium such as e.g. N,N-dimethylformamide. Where $R_4$ represents a hydrogen atom, acylation is preferably effected using a formic acid-acetic-anhydride mixture. Acylation with the latter agent is favored by increased temperatures, preferably between 50–125° C., whereas the acylation using the perhaloalkanoic acid anhydride proceeds readily at about 25–50° C.

The conversion of the free —$NH_2$ group to the diazonium salt proceeds readily under mild acidic conditions in the presence of an alkali nitrite such as e.g. sodium nitrite, preferably at a temperature under 15° C. The coupling of the diazonium salt and the heterocyclic component can be effected under basic or acidic conditions. In general, where the heterocyclic component is acid-sensitive, the formamide derivative is employed and the coupling conducted under neutral or basic conditions (pH $\geq 7$). Where the heterocyclic component is alkali-sensitive, the coupling reaction is preferably conducted under acidic conditions (pH $\leq 7$) and a perhaloalkanoylamide derivative, preferably the trifluoroacetamide derivative, is employed. The time and temperature of the coupling reaction are not critical, however, best results are obtained when the reaction is allowed to proceed at a temperature less than 15° C. Preferred solvent for the reaction is water or aqueous mixtures of water-miscible alcohols such as methanol, ethanol, propanol and the like. If desired, after the coupling reaction has proceeded to completion, the azo-amide compounds can be hydrolzyed to the azo products of the invention without isolation or purification by adjusting the pH and temperature of the mixture to the preferred range.

As mentioned above, the compounds of the invention possess valuable anti-parasitic properties. More particularly, the compounds are active against *Schistosoma mansoni*, a causative agent of schistosomiasis. They are active when administered orally. In addition, the compounds of the invention are valuable intermediates in the preparation of other valuable chemical compounds possessing anti-parasitic activity.

The free bases encompassed herein can also be employed in the form of their addition salts with pharmaceutically acceptable acids, the term "pharmaceutically acceptable acids" designating acids capable of being employed in the production of salts suitable for pharmaceutical use even though, like irritant and corrosive acids, they are not acceptable for pharmaceutical use in and of themselves. The expression "salts with pharmaceutically acceptable acids" refers to chemical structure rather than to method of formation, and includes such salts whether formed by neutralization or other salt forming means. Some examples of the many organic and inorganic acids which can be used to produce the corresponding acid-addition salts are hydrochloric, hydrobromic, hydroiodic, sulfuric, phosphoric, oxalic, cholic, sulfamic, naphthalene-1,5-disulfonic, phenoxyacetic, lactic, tartaric, gluconic, alginic, citric, succinic, maleic, malonic, adipic, mandelic, oleic, tannic, ethylsulfuric, penicillinic, benzoic, 5,5'-naphthalenedisalicylic, 3- and 5-phenylsalicylic, 3-hydroxy-2-naphthoxy, 4,4'-methylene-bis - (3 - hydroxy - 2 - naphthoxy), 1,4,5,8 - naphthalene-tetracarboxylic, 4-biphenylcarboxylic, terephthalic, pyromellitic, 8-hydroxy-7-iodo-5-quinolinesulfonic, cyclopentylpropionic, cyclohexanecarboxylic, arsanilic, arsonic acid and the like. Salts of the free bases of the invention with inorganic antimony derivatives such as e.g. antimony trichloride, and with compounds known to possess activity against schistosomiasis such as phthalic acid, mono-4-(3'-chloro-4'-methylphenyl)-piperazide, maleic acid mono-4-

(3' - chloro - 4' - methylphenyl) - piperazide, pyridine-2,3-dicarboxylic acid mono-4-(3'-chloro-4'-methylphenyl)-piperazide, succinic acid mono-4-(3'-chloro-4'-methylphenyl)-piperazide, oxalic acid mono-4-(3'-chloro-4'-methylphenyl) - piperazide, maleic acid mono-4-(3'-bromo-4'-methylphenyl)-piperazide, adipic acid mono-4-(3' - chloro - 4' - methylphenyl)-piperazide, glutaric acid mono - 4 - (3' - chloro - 4' - methylphenyl) - piperazide, terephthalic acid mono-4-(3'-chloro-4'-methylphenyl)-piperazide, diglycollic acid mono-4-(3'-chloro-4'-methylphenyl)-piperazide, N,N'-[heptamethylenebis - (oxy-p-phenylene)]-diglycine, N,N'-[heptamethylenebis (oxy-p-phenylene)] - di-b-alanine, [heptamethylenebis-(oxy-p-phenylene nitrilo)]-tetraacetic acid, and organic antimony derivatives such as 2-hydroxy-5-oxo-1,3,2-dioxastibiolane-4-glycolic acid, 2-(4,6-disulfo-1,3,2-benzodioxastibiol-2-yloxy)-1-phenyl-3,5-disulfonic acid, and antimony-2,3-dimercaptosuccinate are of particular interest.

The invention is illustrated, but not limited, by the following examples:

Example 1

A solution of 41.2 g. (0.325 mole) of 5-aminouracil in 1 l. of 50% ethanol and 85 ml. (1 mole) of concentrated hydrochloric acid is cooled to 0° C. The amine is diazotized by the slow, portion-wise addition of a solution of 22.4 g. (0.325 mole) of sodium nitrite in 200 ml. of water. The mixture is stirred 15 minutes at 0° C., then added slowly at 0° to 5° C. to a solution of 78.7 g. (0.325 mole) of 1-(2-diethylaminoethylamino)-naphthalene in 1 l. of 95% ethanol and sufficient concentrated hydrochloric acid to make the solution acidic to Congo red. The deep purple solution which forms immediately changes slowly to a green suspension as the hydrochloride salt begins to precipitate. The suspension is stirred about 1 hour at 0° C. The pH is adjusted to approximately 8 by the addition of sodium hydroxide solution and the red product is collected by filtration. This is the desired 5 - [4 - (2 - diethylaminoethylamino) - 1 - naphthylazo]-uracil, of formula

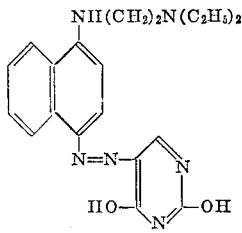

Crystallization from ethanol gives shiny red crystals, M.P. 210–211° C. (dec.).

The hydrochloride salt is prepared as follows: 3.3 g. of the base is dissolved in boiling ethanol and the solution is filtered into 200 ml. of ethanolic hydrogen chloride. The resulting deep purple suspension is heated to boiling and allowed to cool overnight. The dihydrochloride salt which precipitates is collected by filtration and dried in vacuo at 65° C.; M.P. 200–203° C.

The acid addition salt with 4,4'-methylenebis(3-hydroxy-2-naphthoic acid) can be prepared according to the following procedure: 200 g. (0.5 mole) of 5-[4-(2-diethylaminoethylamino)-1-naphthylazo]-uracil and 97 g. (0.25 mole) of 4,4'-methylenebis(3-hydroxy-2-naphthoic acid) are dissolved in 2.5 l. of dimethylformamide. The solution is cooled to approximately 10° C. and poured slowly with vigorous stirring into 7.5 l. of cold water. The precipitate is collected by filtration, washed thoroughly with water and methanol, and dried in vacuo. The red salt thus obtained, M.P. 210–215° C., is the desired 5 - [4 - (2 - diethylaminoethylamino) - 1 - naphthylazo]-uracil, salt with one-half formula weight 4,4'-methylenebis(3-hydroxy-2-naphthoic acid), of formula,

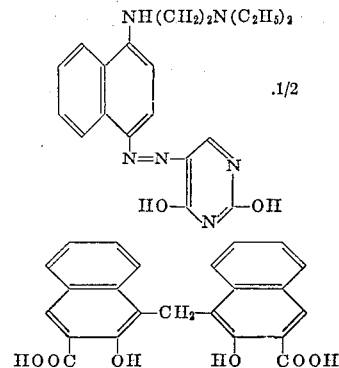

In like manner, the following related compounds can be prepared, starting from 5-aminouracil and an equivalent quantity of the appropriate 1-(dialkylaminoalkylamino)-naphthalene:

5-[4-(2-dimethylaminoethylamino)-1-naphthylazo]-uracil

5-[4-(2-diisopropylaminoethylamino)-1-naphthylazo]-uracil

5-[4-(2-dibutylaminoethylamino)-1-naphthylazo]-uracil

5-[4-(2-diisobutylaminoethylamino)-1-naphthaylazo]-uracil

5-[4-(3-dimethylaminopropylamino)-1-naphthylazo]-uracil

5-[4-(3-diethylaminopropylamino)-1-naphthylazo]-uracil

5-[4-(2-dimethylamino-1-methylethylamino)-1-naphthylazo]-2,4-pyrimidinediol

The starting material, 1-(2-diethylaminoethylamino)-naphthalene, can be prepared as follows: a mixture of 572 g. (4 moles) of 1-naphthylamine, 690 g. (4 moles) of 2-diethylaminoethylchloride hydrochloride, 1250 g. (9 moles) of anhydrous potassium carbonate, 3 l. of benzene and 20 g. of copper-bronze powder is stirred and boiled under reflux for 18 hours. The mixture is cooled and 5 l. of 5% sodium hydroxide and 1 l. of ether are added. The mixture is stirred vigorously for one-half hour, the layers are allowed to separate and the aqueous layer is siphoned off. The alkaline solution is extracted with several portions of ether, benzene or chloroform, and the combined organic extracts are added to the benzene-ether layer. The combined solvent mixture is washed twice with water, once with saturated sodium chloride solution and dried over anhydrous magnesium sulfate. The drying agent is collected by filtration and the filtrate concentrated in vacuo on the steam bath. Vacuum distillation of the residue through a 10-inch Vigreux column gives the desired 1-(2-diethylaminoethylamino)-naphthalene as a pale yellow oil, B.P. 170–172° C./1.5 mm., $n_D^{25}$ 1.5903.

The other intermediate 1-(dialkylaminoalkylamino)-naphthalenes can be prepared by the procedures described under Examples 1 through 15 herein.

Example 2

A solution of 12.0 g. (0.025 mole) of N-[4-(2,6-diamino - 3 - pyridylazo) - 1 - naphthyl] - N - (2 - diethylaminoethyl)-α,α,α-trifluoroacetamide is dissolved in 250 ml. of 2-propanol, filtered, and treated with 25 ml. (0.050 mole) of 2 N sodium hydroxide solution in methanol and 5 ml. of water. Stirring is continued for 25 hours, after which time excess Dry Ice is added and the mixture is diluted with an ice and water mixture to a volume of 1 l. The precipitate is collected by filtration and the filtrate is concentrated to a volume of approximately 400 ml., during which process a precipitate appears. This is collected by filtration and combined with the previous solid. This product is dissolved in 300 ml. of 2-propanol, filtered, and the filtrate is concentrated to 250 ml. and treated with 12 ml. of a 2 N 2-propanolhydrogen chloride mixture. The precipitate is collected by filtration and crystallized from a dimethylformamide-2-propanol mixture. The black crystals thus obtained, M.P. 234° C. (dec.), are the desired 2,6-diamino-3-[4-(2-dimethylaminoethylamino)-1-naphthylazo]pyridine, monohydrochloride, of formula,

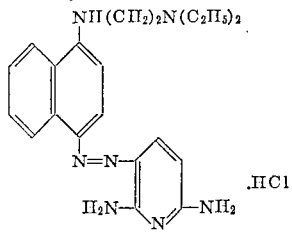

By a similar procedure, the following related compounds can be prepared, starting from the appropriate 1-(alkylaminoalkylamino)-naphthalene via the N-[4-(heterocyclicazo)-1-naphthyl]-N-(alkylaminoalkylamino) - $\alpha,\alpha,\alpha$-trifluoroacetamides:

1-{3-[4(2,6-diamino-3-pyridylazo)-1-naphthylamino]-propyl}-piperidine, hydrochloride.

2,6-diamino-3-[4-(3-diethylaminopropylamino)-1-naphthylazo]-pyridine, hydrochloride.

2,6-diamino-3-[4-(2-diethylaminoethylamino)-7-nitro-1-naphthylazo]-pyridine, hydrochloride.

2,6-diamino-3-{4-{3-[bis-(2-methoxyethyl-amino]-2,2-dimethylpropylamino}-1-naphthylazo}-pyridine, hydrochloride.

4-amino-3-[4-(3-diethylaminopropylamino)-1-naphthylazol]-2,6-pyridinediol, hydrochloride.

2,4,6-triamino-3-[4-(2-diethylaminoethylamino)-1-naphthylazo]-pyridine, hydrochloride.

2-amino-6-(2-diethylaminoethoxy)-3-[4-(2-diethylaminoethylamino)-1-naphthylazo]-pyridine, dihydrochloride.

4-{2-{1-{2-[4-(2,6-diamino-3-pyridylazo)-1-naphthylamino]-ethyl}-4-piperidyl}-ethyl}-morpholine, dihydrochloride.

N - [4 - (2,6 - diamino - 3 - pyridylazo) - 1 - naphthyl]-N - (2 - diethylaminoethyl) - $\alpha,\alpha,\alpha$ - trifluoroacetamide, employed as a starting material in the above procedure, is prepared as follows: a mixture of 46 g. (0.22 mole) of 1-chloro-4-nitronaphthalene and 77 g. (0.66 mole) of N,N-diethylethylenediamine is heated on the steam bath until an exothermic reaction occurs. The temperature reaches 140° C., then drops slowly to 110° C., whereupon heating is resumed for 2 hours. The hot melt is poured with stirring into 750 ml. of water containing 35 ml. of concentrated ammonium hydroxide and ice. The aqueous phase is separated, the residue triturated with warm water, and the residue crystallized from 2-propanol. This is the desired intermediate, N,N-diethyl-N'-(4-nitro-1-naphthyl)-ethylenediamine, yellow platlets, M.P. 80–81° C.

Subsequently, a solution of 13.5 g. of trifluoroacetic anhydride in 40 ml. of dimethylformamide is added to a stirred solution of 14.4 g. of N,N-diethyl-N'-(4-nitro-1-naphthyl)-ethylenediamine in 90 ml. of dimethylformamide over a period of 30 minutes. Stirring is continued for 1 hour and the reaction mixture is poured into 1 l. of ice and water containing 150 ml. of 1 M sodium bicarbonate solution. The mixture is extracted with three 2 l. portions of ether and the combined ether extracts are washed with water and dried over anhydrous magnesium sulfate. The desiccant is collected by filtration and the ether is removed in vacuo to give the desired intermediate N - (4 - nitro-1-naphthyl)-N-(2-diethylaminoethyl)-$\alpha,\alpha,\alpha$-trifluoroacetamide as a viscous oil, which is used directly in the subsequent reaction without further purification.

The N - (2-diethylaminoethyl)-N-(4-nitro-1-naphthyl)-$\alpha,\alpha,\alpha$-trifluoroacetamide (16 g.), is dissolved in 250 ml. of methanol and 40 ml. of 1 N methanolic hydrogen chloride and hydrogenated in the presence of 1 g. of Raney nickel catalyst at 25–35° C. under 25–55 p.s.i.g. of hydrogen. The catalyst is collected by filtration and the filtrate evaporated under reduced pressure to give a mushy crystalline residue which is diluted with ether, filtered, and the precipitate washed thoroughly with ether. Crystallization from ethanol gives the desired N-(2-diethylaminoethyl)-N - (4 - amino - 1 - naphthyl)-trifluoroacetamide, monohydrochloride as fine white needles, M.P. 216–218° C.

To a stirred solution of 9.75 g. (0.025 mole) of N-(2-diethylaminoethyl) - N - (4-amino-1-naphthyl)-trifluoroacetamide, monohydrochloride, in 90 g. of water and ice containing 4.5 ml. of concentrated hydrochloric acid is added 25 ml. of 1 M sodium nitrite over a period of 5 minutes. The mixture is stirred at 0° C. for 5 minutes and added immediately to a solution of 2.8 g. (0.025 mole) of 2,6-diaminopyridine in 5.5 ml. of concentrated hydrochloric acid and 275 g. of ice and water. After stirring for one hour at 1–12° C. and one hour at 12–18° C., a solution of 8 ml. of concentrated ammonium hydroxide diluted to 100 ml. with water is added and the orange solid which separates is collected by filtration, washed with 200 ml. of water containing a few drops of concentrated ammonium hydroxide, and dried in vacuo. This is the desired intermediate, N-[4-(2,6-diamino-3-pyridylazo)-1-naphthyl]-N-(2-diethylaminoethyl) - $\alpha,\alpha,\alpha$-trifluoroacetamide.

The other N - (4 - pyridylazo-1-naphthyl)-N-(dialkylaminoalkyl)-$\alpha,\alpha,\alpha$-trifluoroacetamides are prepared in a similar manner from the appropriate aminopyridine and N - dialkylaminoalkyl-N-(4 - amino-1-naphthyl)-$\alpha,\alpha,\alpha$-trifluoroacetamide compounds.

Alternatively, 2,6 - diamino-3[4-(2-diethylaminoethylamino)-1-naphthylazo]-pyridine, monohydrochloride and related compounds can be prepared from N-(2-diethylaminoethyl)-N-(4-amino-1-naphthyl)-formamide according to the following procedure: A mixture of 3.5 ml. of formic acid, 8.4 ml. of acetic anhydride, and 50 ml. of tetrahydrofuran is heated on the steam bath for two hours. Upon cooling 5.74 g. (0.02 mole) of N,N-diethyl-N'-(4-nitro-1-naphthyl)-ethylenediamine is added, and the resulting solution is stirred and heated under reflux for 24 hours. The solvent is removed in vacuo and the residue suspended in excess aqueous sodium hydroxide solution and extracted with ether. The ether extracts are dried over anhydrous sodium sulfate, the drying agent is collected by filtration, and the solvent removed in vacuo. The residual yellow oil is the desired intermediate, N-(2-diethylaminoethyl) - N - (4-nitro-1-naphthyl)-formamide, which is used directly in the next step without further purification.

The above formyl derivative is subsequently dissolved in 300 ml. of methanol and hydrogenated at an initial hydrogen pressure of 44 p.s.i.g. in the presence of 1 g. of Raney nickel catalyst. The catalyst is collected by filtration and the solvent removed in vacuo. The residual oil is cooled to room temperature, dissolved in 2-propanol, and treated with a 2-propanol-hydrogen chloride mixture until precipitation is complete. The crude product is collected by filtration, washed with 2-propanol and dried in vacuo at 40° C. for 14 hours. Rapid crystallization from warm 2-propanol containing a slight excess of hydrogen chloride gives the intermediate N-(2-diethylaminoethyl)-N - (4 - amino-1-naphthyl) - formamide, dihydrochloride, 1½ hydrate, as a lavender solid, M.P. 130–140° C. (dec.), of formula,

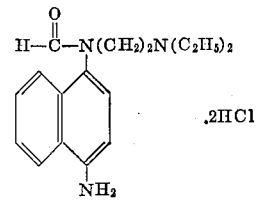

Subsequently, a cooled solution of 0.386 g. (0.0056 mole) of sodium nitrite in 50 ml. of water is added to a solution of 2.0 g. (0.0056 mole) of N-(2-diethylaminoethyl)-N-(4-amino-1-naphthyl)-formamide, dihydrochloride in dilute hydrochloric acid. After a few minutes, the diazonium salt solution is added at 0–5° C. with stirring to a solution of 0.612 g. (0.0056 mole) of 2,6-diaminopyridine in 100 ml. of water and 1.2 ml. of concentrated hydrochloric acid. Stirring is continued for several minutes and the reaction mixture is made alkaline with sodium hydroxide solution. The red solid, which exhibits a green iridescence, is collected by filtration and dried in vacuo. This is the desired intermediate, N-[4-(2,6-diamino-3-pyridylazo)-1-naphthyl]-N-(2-diethylaminoethyl) - formamide, of formula,

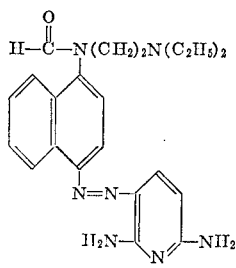

The intermediate N - [4-(2,6-diamino-3-pyridylazo)-1-naphthyl]-N-(2-diethylaminoethyl)-formamide is allowed to stand at room temperature for 18 hours in ethanolic hydrogen chloride. The mixture is concentrated and made alkaline with aqueous sodium hydroxide. The resulting maroon solid is collected by filtration, washed thoroughly with water, and crystallized from a mixture of dimethylformamide and 2-propanol. The black crystals thus obtained, M.P. 234° C. (dec.), are the desired 2,6-diamino-3 - [4 - (2-diethylaminoethylamino)-1-naphthylazo]-pyridine, monohydrochloride and are identical with the material obtained by the hydrolysis of N-[4-(2,6-diamino-3-pyridylazo) - 1 - naphthyl]-N-(2-diethylaminoethyl)-α,α,α-trifluoroacetamide.

*Example 3*

To a solution of 9.5 g. (0.084 mole) of 5-aminoindazole in 200 ml. of ice water and 20 ml. of concentrated hydrochloric acid is cautiously added with stirring 5.8 g. (0.084 mole) of sodium nitrite in 100 ml. of cold water. The mixture is maintained at 0° C. during the addition. When the addition is complete, the diazonium salt mixture is stirred at 0° C. for 10 minutes and poured slowly with stirring into a solution of 27.5 g. (0.084 mole) of 1,1-diisopropyl-4-methyl - 7 - (1-naphthyl) - diethylenetriamine in 250 ml. of water and 17.5 ml. of concentrated hydrochloric acid. Stirring is continued for 2 hours at 0° C. and the mixture is allowed to stand at room temperature for 14 hours. The reaction mixture is made strongly alkaline with 10% aqueous sodium hydroxide solution and the orange-red dye is collected by filtration, washed thoroughly with water and dried in vacuo at 40° C. for 18 hours. This is the desired 5-{4-{2-[(2-diisopropylaminoethyl)-methylamino] - ethylamino} - 1 - naphthylazo}-indazole, of formula,

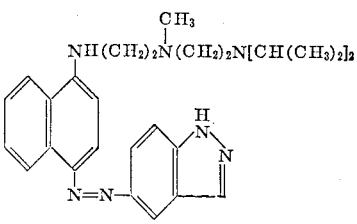

orange crystals, M.P. 107–109° C.

Utilizing the preparative methods described under Examples 1 through 15 herein, the following related compounds can be prepared, starting from equivalent quantities of the appropriate aminoindazole and 1-(dialkylaminoalkylamino)-naphthalene:

5-[4-(2-dimethylaminoethylamino)-1-naphthylazo]-indazole

6-{4-[3-(4-methoxypiperidino)-propylamino]-1-naphthylazo}-indazole

7-[4-(2-diethylaminoethylamino)-1-naphthylazo]-indazole

6-{4[2-(butylmethylamino)-ethylamino]-1-naphthylazo}-2-methylindazole

5-[4-(2-diethylaminoethylamino)-1-naphthylazo]-indazole

5-{6-bromo-4-[(3-diethylamino-2,2-dimethylpropylamino)]-1-naphthylazo}-indazole

7-[4-(2-diethylaminoethylamino)-1-naphthylazo]-4-indazolesulfonic acid

6-[4-(2-diethylaminoethylamino)-6-nitro-1-naphthylazo]-indazole 6-amino-7-[4-(2-diethylaminoethylamino)-1-naphthylazo]-1H-indazole 6-[4-(4-diethylaminocyclohexylamino)-1-naphthylazo]-1H-indazole 4-{2-(allylethylamino)-ethylamino]-1-naphthylazo}-5-amino-1H-indazole 5-{4-[2-(4-methyl-1-piperazinyl)-ethylamino]-1-naphthylazo}-1H-indazole 1,1-diisopropyl-4-methyl-7 - (1-naphthyl) - diethylenetriamine, employed as a starting material in the above preparation, is readily prepared according to the following procedures: a solution of 1.1 kg. (25 moles) of ethylene oxide in 10 l. of 95% ethanol (kept at 0° C. to minimize the evaporation of ethylene oxide) is added in a slow stream over a period of 3 hours to a solution of 3.25 kg. (22.7 moles) of 1-naphthylamine in 15 l. of 95% ethanol with stirring, maintaining the temperature at 0° C. during the addition. The reaction does not appear to be exothermic and no color change is noted. After the addition is complete, the reaction mixture is allowed to stand at room temperature for 16 hours and then boiled under reflux for 3 hours. The volatile materials are removed in vacuo on the steam bath and the residue distilled in high vacuo through an 8-inch Vigreux column to give N - (2 - hydroxyethyl) - 1 - naphthylamine as a colorless syrupy liquid, B.P. 157–161° C./0.25 mm., which solidifies in the receiver. A mixture of 1 kg. (5.35 moles) of N-(2-hydroxyethyl)-1-naphthylamine and 9 l. of constant boiling hydrobromic acid (48%) is boiled under reflux for 24 hours with mechanical stirring. Reflux is adjusted so that approximately 500 ml. of the condensed hydrobromic acid-water mixture is collected during this period. Upon cooling, the desired bromide, hydrobromide which separates is collected by filtration, the filter cake is sucked dry, and the product is digested thoroughly by stirring with 3 l. of boiling 2-propanol. The occluded brown impurities dissolve and the off-white crystals are collected by filtration, washed with fresh cold 2-propanol and dried in vacuo at 50° C. for 24 to 48 hours; M.P. softening at 200° C., M.P. 208–211° C.

In a 2 l. 3-necked flask is placed 166 g. (0.5 mole) of N-(2-bromoethyl)-1-naphthylamine, hydrobromide, 79 g. (0.5 mole) of N,N-diisopropyl-N'-methylethylenediamine, 138 g. (1.0 mole) of anhydrous potassium carbonate and 500 ml. of dimethylformamide. This mixture is stirred and heated at 100° C. for 30 hours. Upon cooling, the reaction mixture is poured into 4 l. of water and the oil which separates is extracted thoroughly with ether. The combined ether extracts are dried over anhydrous potassium carbonate, the drying agent is collected by filtration, and the solvent removed in vacuo on the steam bath. The residue is distilled in vacuo through an 8-inch Vigreux column to give the desired 1,1-diisopropyl-4-methyl-7-(1-naphthyl)-diethylenetriamine as a pale yellow oil, B.P. 153–157° C./0.3 mm., $n_D^{25}$ 1.5619.

Alternatively, a mixture of 166 g. (0.5 mole) of N-(2-bromoethyl)-1-naphthylamine, hydrobromine, 79 g. (0.5 mole) of N,N-diisopropyl-N'-methylethylenediamine, 138 g. (1.0 mole) of anhydrous potassium carbonate and 500 ml. of toluene is stirred and boiled under reflux for 30 hours. Upon cooling, 1 l. of 10% aqueous sodium hydroxide solution is added and the mixture is stirred until two distinct layers separate. The aqueous layer is siphoned off and extracted with 100 ml. of fresh toluene. The combined toluene extracts are dried over anhydrous potassium carbonate, the drying agent is collected by filtration and the solvent evaporated in vacuo by means of a rotary evaporator. Distillation of the residue in vacuo through an 8-inch Vigreux column gives the desired naphthylamine as a yellow oil, B.P. 149–151° C./0.2 mm., $n_D^{25}$ 1.5613.

Xylene also serves as an excellent solvent. For example, a mixture of 118 g. (0.36 mole) of N-(2-bromoethyl) - 1 - naphthylamine, hydrobromide, 126 g. (0.80 mole) of N,N-diisopropyl-N'-methyl-ethylenediamine, and 500 ml. of xylene is stirred and boiled under reflux for 30 hours. Upon cooling, 1 l. of 10% aqueous sodium hydroxide solution is added and the mixture is stirred until the two layers separate. The aqueous layer is separated and extracted with 200 ml. of benzene. The combined benzene-xylene layers are dried over anhydrous potassium carbonate and the solvent removed in vacuo. Distillation of the residue in vacuo through an 8-inch Vigreux column gives the desired amine as a yellow oil, B.P. 153–156° C./0.3 mm., $n_D^{25}$ 1.5621.

The other intermediate 1 - (dialkylaminoalkylamino)-naphthalenes employed herein can be prepared according to the procedures described under Examples 1 through 15.

*Example 4*

A solution of 4.4 g. (0.062 mole) of sodium nitrite in 40 ml. of water is cooled to 0° C. and is slowly added to a solution of 12.7 g. (0.062 mole) of 8-amino-5,6-dimethoxyquinoline in 200 ml. of 50% ethanol and 17 ml. of concentrated hydrochloric acid, maintaining the temperature at 0° C. This diazonium solution is subsequently added to a solution of 17.5 g. (0.62 mole) of N,N-diethyl-2,2-dimethyl-N'-1-naphthyl-1,3-propanediamine in 200 ml. of 95% ethanol which has been made strongly acidic to Congo red with concentrated hydrochloric acid. The mixture is stirred for 2 hours at 0° C. and 18 hours at room temperature. The crude hydrochloride is collected by filtration and crystallized from isopropanol. The desired 8-[4-(3-diethylamino - 2,2-dimethylpropylamino)-1-naphthylazo] - 5,6-dimethoxyquinoline, trihydrochloride, of formula,

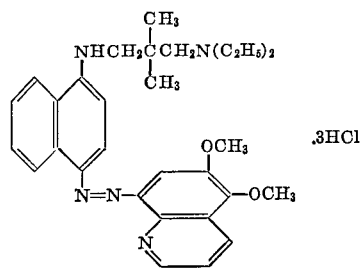

contains 1½ moles of water of hydration and melts at 166–170° C.

In like manner, the following related compounds can be prepared, starting from the appropriate 1-(dialkylaminoalkylamino)-naphthalene and aminoquinoline:

2-{8-{4-[2-(isopropylmethylamino)-ethylamino]-1-naphthylazo}quinolyloxy}-ethanol, hydrochloride
5-[4-(2-diethylaminoethylamino)-1-naphthylazo]-8-methylquinoline, hydrochloride
1-{2-[4-(6-quinolylazo)-1-naphthylamino]-ethyl}-3-pyrrolidinol, hydrochloride
3-diethylamino-3'-[4-(6-methoxy-8-quinolylazo)-1-naphthylamino]-1,1'-(ethylimino)-di-2-propanol, hydrochloride
5-[4-(2-diethylaminoethylamino)-1-naphthylazo]-7-(diethylaminomethyl)-8-quinolinol, hydrochloride
7-chloro-4-(4-diethylamino-1-methylbutylamino)-8-{4-[2-(ethylmethylamino)-ethylamino]-1-naphthylazo}-quinoline, hydrochloride
α-Diethylamino-4-{5-{4-[2-(diisopropylamino)-ethylamino]-1-naphthylazo}-2-quinolylamino}-o-cresol, hydrochloride
α-Diethylamino-4-{8-[4-(2-diethylaminoethylamino)-1-naphthylazo]-4-quinolylamino}-o-cresol, hydrochloride N,N - diethyl-2,2-dimethyl-N'-1-naphthyl-1,3-propanediamine, employed as a starting material in the above procedure, can be prepared as follows: a mixture of 157 g. (1.0 mole) of β-diethylaminopivaldehyde, 143 g. (1.0 mole) of 1-naphthylamine, 1 g. of p-toluenesulfonic acid and 400 ml. of benzene is boiled under reflux for 8 hours. The water which separates is removed through a Dean-Stark water trap. The benzene is removed in vacuo on the steam bath, the residue is dissolved in 300 ml. of methanol, and 5 g. of 20% palladium on charcoal catalyst is added. The resulting mixture is hydrogenated in a steel bomb at room temperature under an initial hydrogen pressure of 52 p.s.i.g. When hydrogenation is complete, the solvent is removed in vacuo on the steam bath and the residue is made strongly alkaline with 10% aqueous sodium hydroxide solution. The oil which separates is extracted with benzene, the combined benzene extracts are dried over anhydrous potassium carbonate and the benzene is removed in vacuo. The residue is distilled in vacuo through a 10-inch Vigreux column to give the desired N,N - diethyl-2,2-dimethyl-N'-1-naphthyl-1,3-propanediamine as a pale yellow oil, B.P. 161° C./1.0 mm., $n_D^{25}$ 1.5790.

The other intermediate 1-(dialkylaminoalkylamino)-naphthalenes employed in the above example are prepared according to the procedures described under Examples 1 through 15 herein.

*Example 5*

A mixture of 4.4 g. (0.01 mole) of N-(2-bromoethyl)-4-(3-dibenzofuranylazo)-1-naphthylamine and 50 ml. of piperidine is heated on the steam bath for one hour. The red solution is poured into 1 l. of water and the product which precipitates is collected by filtration, washed thoroughly with water, and dried in vacuo at 55° C. for 18 hours. Crystallization from acetone gives the desired 1-{2-[4-(3-dibenzofuranylazo) - 1 - naphthylamino]-ethyl}-piperidine, of formula,

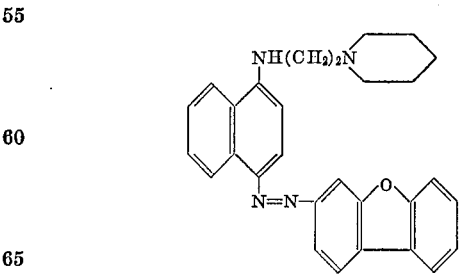

as glistening red crystals, M.P. 164–165° C.

Alternatively, N-(2-chloroethyl) - 4 - (3-dibenzofuranylazo)-1-naphthylamine, M.P. 170–171° C., can be substituted for N-(2-bromoethyl)-4-(3-dibenzofuranylazo)-1-naphthylamine in the above procedure.

Utilizing the preparative methods described under Examples 1 through 15 herein, the following related compounds can be prepared, starting from the appropriate furan and 1-naphthylamine precursors:

N'-[4-(3-dibenzofuranylazo)-1-naphthyl]-N,N-diethyl-ethylenediamine

N'-[4-(2-dibenzofuranylazo)-1-naphthyl]-N,N-diethyl-ethylenediamine

5-[4-(2-diethylaminoethylamino)-1-naphthylazo]-2-furancarbamic acid, ethyl ester 5-[4-(2-diethylaminoethylamino)-1-naphthylazo]-2-benzofurancarboxylic acid N'-[4-(2-bromo-3-dibenzofuranylazo)-6-chloro-1-naphthyl]-N-isopropyl-N-methylethylenediamine 1-{2-[4-(6,7,8,9-tetrahydro-3-dibenzofuranylazo)-1-naphthylamino]-ethyl}-1-pyrrolidine N'[4-(3-dibenzofuranylazo)-1-naphthyl]-N,N-diethyl-2-methyl-1,3-propanediamine N'-[4-(8-acetyl-3-dibenzofuranylazo)-7-methoxy-1-naphthyl]-N,N-diethylethylenediamine 7-[4-(3-dibenzofuranylazo)-1-naphthyl]-1,1,4-triethyldiethylenetriamine 3-[4-(3-piperidinopropylamino)-1-naphthylazo]-2-dibenzofuranol N⁴-[4-(3-dibenzofuranylazo)-1-naphthyl]-N,N-diethyl-1,4-pentanediamine 4-(3-dibenzofuranylazo)-N-{[1-(diethylaminoethyl)-cyclohexyl]-methyl}-1-naphthylamine N-(2-bromoethyl)-4-(3-dibenzofuranylazo) - 1 - naphthylamine, employed as a starting material in the above procedure, is prepared as follows: a suspension of 18.3 g. (0.1 mole) of 3-aminodibenzofuran in 1 l. of water containing 35 ml. (0.3 mole) of 48% aqueous hydrogen bromide is cooled to 0° C. and treated slowly with a solution of 6.9 g. (0.1 mole) of sodium nitrite in 50 ml. of water, maintaining the temperature at 0 to 5° C. The resulting yellow suspension is stirred at 0° C. for one-half hour and is then poured with vigorous stirring into a solution of 33.1 g. (0.1 mole) of N-(2-bromoethyl)-1-naphthylamine, hydrobromide in 300 ml. of water. The thick purple suspension thus obtained is stirred for 2 hours at room temperature and the solid collected by filtration and dried in vacuo at 55° C. for 18 hours. The hydrobromide salt is converted to the base by grinding with concentrated sodium hydroxide solution and acetone and the base is crystallized from chloroform. This is the desired intermediate, N-(2-bromoethyl)-4-(3-dibenzofuranylazo)-1-naphthylamine, M.P. 157–158° C.

The other intermediate 1-naphthylamines employed herein can be prepared according to the procedures described under Examples 1 through 15.

*Example 6*

To a solution of 9.3 g. (0.1 mole) of 3-aminopyridine in 250 ml. of water and 35 ml. of concentrated hydrochloric acid is slowly added at 0° C. with stirring a solution of 6.9 g. (0.1 mole) of sodium nitrite in 200 ml. of water. Upon completion of the diazotization, the diazonium salt solution is added at 0 to 3° C. to a solution of 27.2 g. (0.1 mole) of 1-diethylamino-3-(1-naphthylamino)-2-propanol in 1 l. of water containing 17 ml. of concentrated hydrochloric acid and 300 ml. of 95% ethanol. A deep red solution forms immediately. After 3 hours, the reaction mixture is made strongly alkaline with sodium hydroxide solution and the organic layer which separates is extracted with chloroform. The combined chloroform extracts are washed thoroughly with water and dried over anhydrous sodium sulfate. The drying agent is collected by filtration, the chloroform is evaporated in vacuo, and the residue dissolved in ether and treated with anhydrous hydrogen chloride. The purple hydrochloride which separates is collected by filtration and crystallized from an ethanol-ether mixture. After drying in vacuo for 48 hours at 40° C., the sample is allowed to equilibrate in the air. The red-brown solid melts at 154–157° C., and is the desired 1-diethylamino-3-[4-(3-pyridylazo)-1-naphthylamino]-2-propanol, trihydrochloride, monohydrate, of formula,

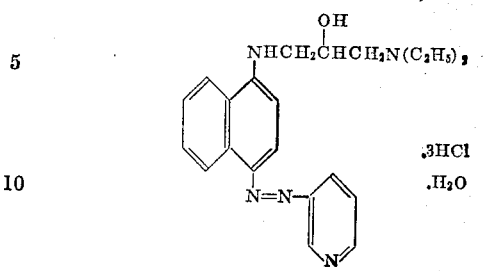

1-diethylamino-3-(1-naphthylamino)-2 - propanol, B.P. 175–178° C./0.5 mm., employed as an intermediate in the above procedure, is prepared from 1-naphthol and 3-amino-1-diethylamino-2-propanol according to the method described in Example 8 herein for the synthesis of 1-(3-dimethylaminopropylamino)-naphthalene.

Alternatively, the desired azo compound can be prepared in the following manner: a solution of 12.9 g. (0.1 mole) of N,N-diethylepihydrinamine in 100 ml. of ethanol is added with stirring to a solution of 24.8 g. (0.1 mole) of 3-(4-amino-1-naphthylazo)-pyridine in 200 ml. of ethanol and the mixture is boiled under reflux for 24 hours. The solvent is removed in vacuo and the residue is purified as described above. The desired 1-diethylamino-3-[4-(3-pyridylazo)-1-naphthylamino]-2 - propanol trihydrochloride hydrate thus obtained melts at 153–155° C. The intermediate 3-(4-amino-1-naphthylazo) - pyridine, M.P. 185–187° C., is prepared from 1-naphthylamine and diazotized 3-aminopyridine according to the procedure described under Example 1 herein.

1-diethylamino-3-[4-(3-pyridylazo)-1 - naphthylamino]-2-propanol trihydrochloride can also be obtained by the following procedure: a mixture of 37.7 g. (0.1 mole) of 1-chloro-3-[4-(3-pyridylazo)-1-naphthylamino] - 2 - propanol hydrochloride and 300 g. of diethylamine is placed in a bomb and heated at 110° C. for 12 hours. The bomb is allowed to cool, is carefully vented and the reaction mixture poured into 2 l. of 10% aqueous sodium hydroxide solution. This mixture is worked up as indicated above to give the desired 1-diethylamino-3-[4-(3-pyridylazo)-1-naphthylamino]-2-propanol, trihydrochloride, monohydrate, M.P. 155–157° C.

The intermediate 1-chloro-3-[4-(3-pyridylazo)-1-naphthylamino]-2-propanol, hydrochloride, is prepared by coupling diazotized 3-aminopyridine into 1-chloro-3-(1-naphthylamino)-2-propanol according to the procedure outlined in Example 1 above for the preparation of 5-[4-(2-diethylaminoethylamino)-1-naphthylazo]-uracil.

The following related compounds can be prepared using similar methods, starting from the appropriate aminopyridine and 1-naphthylamine compounds:

1-diethylamino-2-methyl-3-[4-(3-pyridylazo)-1-naphthylamino]-2-propanol, sulfate 2-{ethyl{2-[4-(3-pyridylazo)-1-naphthylamino]-ethyl}-amino}-ethanol, diphosphate 5-[4-(2-diethylaminoethylamino)-7-methoxy-1-naphthylazo]-2-phenoxypyridine, trihydrochloride 1-{2-{2-[4-(3-pyridylazo)-1-naphthylamino]-ethoxy}-ethyl}-piperidine, salt with 4,4'-methylenebis[3-hydroxy-2-naphthoic acid]

3-{4-{2-[bis(2-ethoxyethyl)-amino]-ethylamino}-1-naphthylazo}-pyridine, cholate

3-[4-(2-diethylaminoethylamino)-7-phenyl-1-naphthylazo]-pyridine, malonate

4-{4-{5-[4-(2-diethylaminoethylamino)-1-naphthylazo]-2-pyridylamino} butyl}-morpholine 5-[4-(2-dicyclohexylaminoethylamino)-1-naphthylazo]-2-picoline, disalicylate The intermediate 1-naphthylamine compounds can be prepared according to the procedures outlined above to-

17 gether with those described under Examples 1 through 15 herein.

Example 7

5-aminobenzimidazole dihydrochloride (10.3 g., 0.05 mole) is diazotized and coupled into 13.5 g. (0.05 mole) of 4-[3-(1-naphthylamino)-propyl]-morpholine according to the procedure described under Example 1 herein. The desired 5-[4-(3-morpholinopropylamino)-1-naphthylazo]-benzimidazole thus obtained, M.P. 220–223° C., has the formula,

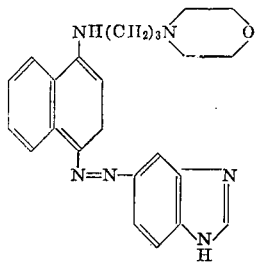

Utilizing the preparative methods described under Examples 1 through 15 herein, the following related compounds can be prepared starting from the appropriate 1-naphthylamine compound and amino or hydroxybenzimidazole or indazole:

5(or 6)-[4-(2-diethylaminoethylamino)-1-naphthylazo]-benzimidazole
5-[4-(2-diethylaminoethylamino)-1-naphthylazo]-2-benzimidazolinethione
5-[4-(5-diethylamino-1-methylpentylamino)-1-naphthylazo]-1H-indazole
5-{6-chloro-4-[2-(ethylmethylamino)-ethylamino]-1-naphthylazo}-1,3-dimethyl-2-benzimidazolinone
5(or 6)-{4-{2-[4-(2-hydroxyethyl)-1-piperazinyl]-ethylamino}-1-naphthylazo}-2-benzimidazolecarboxylic acid
α-methyl-α-[4-(1-phenyl-5-benzimidazolylazo)-1-naphthylaminomethyl]-1-piperidine-ethanol
8-(5(or 6)-benzimidazolylazo)-5-(2-diethylaminoethylamino)-2-naphthalenesulfonic acid
5-[4-(3-dimethylamino-2-ethoxypropylamino)-1-naphthylazo]-2-methyl-1H-naphth-[1,2]-imidazole
7(or 4)-{4-[3-(diallylamino)-propylamino]-1-naphthylazo}-2-methyl - 5(or 6) - benzimidazolesulfonic acid
6(or 5)-[4-(2-diethylaminoethylamino)-1-naphthylazo]-2-methyl-5-benzimidazolol
5(or 6)-{4-{2-[ethyl(2-diisopropylaminoethyl)-amino]-ethylamino}-1-naphthylazo}-benzimidazole
5(or 6)-{4-[2-(2-diethylaminoethoxy)-ethylamino]-1-naphthylazo}-benzimidazole The starting material, 4-[3-(1-naphthylamino)-propyl]-morpholine, can be prepared as follows: a mixture of 86.4 g. (0.6 mole) of 1-naphthol, 102.8 g. (0.714 mole) of 4-(1-aminopropyl)-morpholine, 93.6 g. (0.9 mole) of sodium bisulfite and 600 ml. of water is agitated in a pressure vessel at 150° C. for 8 hours. The reaction mixture is removed from the reactor and made alkaline with sodium hydroxide solution. The product is collected by filtration and crystallized from aqueous ethanol to give the desired 4-[3-(1-naphthylamino)-propyl]-morpholine as colorless crystals, M.P. 82–83.5° C.

The other intermediate 1-naphthylamine compounds are prepared according to the procedures described under Examples 1 through 15 herein.

Example 8

5-aminoisoquinoline (14.4 g., 0.1 mole) is diazotized and coupled with 22.8 g. (0.1 mole) of 1-(3-dimethylaminopropylamino)-naphthalene according to the procedure outlined under Example 1 herein. Crystallization of the crude dye from 2-propanol gives the desired 5-

18

[4-(3-dimethylaminopropylamino)-1-naphthylazo] - isoquinoline, of formula,

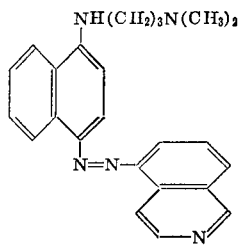

M.P. 158–160° C.

Utilizing the preparative methods outlined under Examples 1 through 15 herein, the following related compounds can be prepared starting from the appropriate 1-naphthylamine compound and amino or hydroxyisoquinoline:

4-[4-(2-diethylaminoethylamino)-1-naphthylazo]-isoquinoline
5-[4-(2-diethylaminoethylamino)-1-naphthylazo]-isoquinoline
7-{4-[2,2-dimethyl-3-(1-pyrrolidinyl)-propylamino]-1-naphthylazo}-3-ethylisocarbostyril
6-[4-(2-diethylaminoethylamino)-1-naphthylazo]-isoquinoline
8-[3-(2,2-dimethylpiperidino)-propylamino]-5-(6-isoquinolylazo)-2-naphthoic acid
5-amino-8-[4-(2-diethylaminoethylamino)-1-naphthylazo]-isoquinoline
1-(2-dimethylaminoethoxy)-3-ethyl-7-{4-[2-(isopropylmethylamino)-ethylamino]-1-naphthylazo}-isoquinoline
4-{4-[5-(dimethylaminomethyl)-tetrahydrofurfurylamino]-1-naphthylazo}-isoquinoline
1-{3-[6-chloro-4-(7-isoquinolylazo)-1-naphthylamino]-2,2-dimethylpropyl}-4-methylpiperazine
8-[4-(2-diisopropylaminoethylamino)-1-naphthylazo]-5-isoquinolinol
8-[4-(2-diethylaminoethylamino)-1-naphthylazo]-5-(3-diethylaminopropylamino)-isoquinoline
4-[4-(2-diethylaminoethylamino)-1-naphthylazo]-3-hydroxy-2-methylisocarbostyril The starting material, 1-(3 - dimethylaminopropylamino)-naphthalene, can be prepared as follows: a mixture of 28.8 g. (0.2 mole) of 1-naphthol, 40.4 g. (0.4 mole) of 3-dimethylaminopropylamine and 31.2 g. (0.3 mole) of sodium bisulfite in 250 ml. of water is shaken in a steel bomb at 150° C. for 8 hours. The mixture is rinsed from the bomb with water, made strongly alkaline with sodium hydroxide solution and extracted thoroughly with ether. The ether extracts are dried over anhydrous sodium sulfate, the ether removed in vacuo, and the residue distilled in vacuo through a 6-inch Vigreux column to give the desired 1-(3-dimethylaminopropylamino)-naphthalene as a yellow oil, B.P. 184–185° C./2.5 mm., $n_D^{25}$ 1.6054.

The other intermediate 1-naphthylamine compounds are prepared according to the procedures described under Examples 1 through 15 herein.

Example 9

N - (2-diethylaminoethyl)-N-(4-amino-1-naphthyl)-trifluoroacetamide, monohydrochloride (9.75 g., 0.025 mole) is diazotized according to the procedure described under Example 2 herein. To this cold diazonium salt solution is then added 100 g. of ice and a cold solution of 4.0 g. (0.027 mole) of 8-hydroxyquinoline in 100 ml. of water, 8.4 ml. (0.050 mole) of 6 N aqueous sodium hydroxide and 2.03 g. (0.025 mole) of sodium acetate. A reddish-brown precipitate forms immediately giving a thick suspension. The reaction mixture is stirred at 0–13° C. for 2 hours, and the intermediate trifluoroacetamide, of formula,

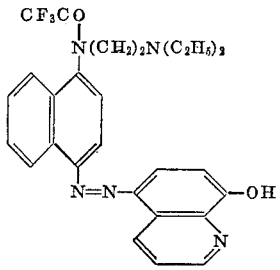

is collected by filtration, washed with water and dried in vacuo at 40° C. for 18 hours. The crude trifluoroacetamide is crystallized from 2-propanol, M.P. 158–160° C.

The N - (2-diethylaminoethyl)-2,2,2-trifluoro-N-[4-(8-hydroxy-5-quinolylazo)-1-naphthyl]-acetamide (8.5 g.) is suspended in 75 ml. of methanol and treated with 25 ml. of a 2 N sodium hydroxide solution in methanol together with 5 ml. of water. After stirring at room temperature for 44 hours, the residue is diluted with 150 ml. of water, excess Dry Ice is added, and the reaction mixture is concentrated in vacuo to a volume of 150 ml. The red dye that precipitates is the desired 5-[4-(2-diethylaminoethylamino)-1-naphthylazo]-8-quinolinol, of formula,

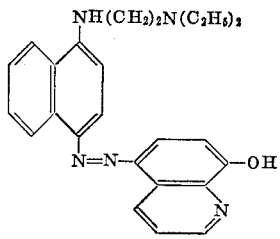

Crystallization from a dimethylformamide-water mixture gives reddish brown crystals, M.P. 161–163° C.

By similar procedures, the following related compounds can be prepared, starting from the appropriate N-(dialkylaminoalkyl) - N-(4-amino-1-naphthyl)-trifluoroacetamide and hydroxyquinoline via the N-[4-(quinolylazo)-1-naphthyl] - N - (dialkylaminoalkylamino) - α,α,α-trifluoroacetamides:

5 - [4 - (3 - piperidinopropylamino) - 1 - naphthylazo]-6-quinolinol
3 - [4 - (2 - diethylaminoethylamino) - 1 - naphthylazo]-2,4-quinolinediol
7 - [4 - (3 - diethylaminopropylamino)-7-sulfo-1-naphthylazo]-8-hydroxy-5-quinolinesulfonic acid
5 - [4 - (2 - diethylaminoethylamino) - 1 - naphthylazo]-α-(5-ethyl-2-quinuclidinyl)-6-hydroxy-4-quinolinemethanol
8 - hydroxy - 5 - {4-[3-(2-morpholinoethylthio)-propylamino]-1-naphthylazo}-7-quinolinesulfonic acid
5 - {4 - [2-(cyclohexylmethylamino)-ethylamino]-1-naphthylazo}-4-methyl-2,6-quinolinediol
5 - [4 - (2 - diethylaminoethylamino)-1-naphthylazo]-7-(dimethylaminomethyl)-8-quinolinol
5 - chloro - 7 - [4-(4-diethylamino-1-methylbutylamino)-1-naphthylazo]-8-quinolinol The intermediate N-(4-quinolylazo-1-naphthyl)-N-(dialkylaminoalkyl) - α,α,α-trifluoroacetamides are prepared from the appropriate hydroxyquinoline and N-dialkylaminoalkyl - N - (4-amino-1-naphthyl)-α,α,α-trifluoroacetamide compounds in accordance with the method described above for the preparation of N-(2-diethylaminoethyl)-2,2,2 - trifluoro - N-[4-(8-hydroxy-5-quinolylazo)-1-naphthyl]-acetamide.

*Example 10*

5-amino-2,3-dimethylquinoxaline (17.3 g., 0.1 mole) is diazotized and coupled into 30.3 g. (0.1 mole) of N-[2-(2-diethylaminoethylthio)-ethyl]-1-naphthylamine according to the procedure described under Example 1 herein. The red dye thus obtained is the desired 6-{4-[2-(2-diethylaminoethylthio) - ethylamino] - 1 - naphthylazo} - 2,3-dimethylquinoxaline, of formula

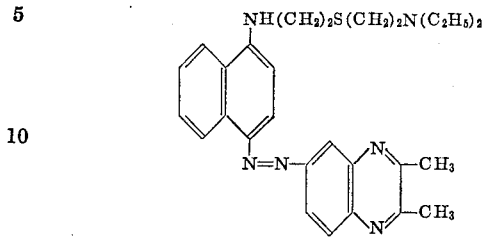

Utilizing the preparative methods outlined under Examples 1 through 15 herein, the following related compounds can be prepared starting from the appropriate 1-naphthylamine compound and aminoquinoxaline or aminoquinazoline:

6 - [4 - (2 - diethylaminoethylamino) - 1 - naphthylazo]-2,3-dimethylquinoxaline
1 - {2 - [4 - (6 - methoxy-7-quinazolinylazo)-1-naphthylamino]-ethyl}-3-piperidinol
6 - [4 - (2,2-dimethyl-3-piperidinopropylamino)-1-naphthylazo]-quinoxaline
6 - {4 - [2 - (allylethylamino)-ethylamino]-1-naphthylazo}-quinazoline
5 - {4 - [2 - (cyclohexylmethylamino) - ethylamino] - 1-naphthylazo}-7-methoxyquinoxaline
5 - {4 - {2 - [4 - (2 - piperidinoethyl)-piperidino]-ethylamino}-1-naphthylazo}-2,3-quinoxalinediol
6 - [4 - (2 - diethylaminoethylamino)-1-naphthylazo]-2,3-diphenylquinoxaline
7 - [4 - (2 - dimethylaminocyclohexylamino)-1-naphthylazo]-quinazoline
6 - [4 - (2 - dimethylaminoethylamino)-1-naphthylazo]-4-ethyl-3,4-dihydro-2(1H)-quinoxaline
5 - {4 - {2 - [bis(2 - diethylaminoethyl)-amino]-ethylamino}-1-naphthylazo}-quinazoline
5 - {4 - [2 - (hexahydro-1-azepinyl)-ethylamino]-1-naphthylazo}-7-methoxyquinoxaline
α - {[4 - (2 - quinoxalinylazo)-1-naphthylamino]-methyl}-1-piperidineethanol N - [2 - (2 - diethylaminoethylthio)-ethyl]-1-naphthylamine, employed as a starting material in the above procedure, is prepared from 1-(2-bromoethylamino)-naphthalene and 2-diethylaminoethanethiol according to the following method: 33.9 g. (0.2 mole) of 2-diethylaminoethanethiol hydrochloride is suspended in ammonia and extracted with toluene. To this dried toluene solution is then added a solution of 12 g. of sodium methoxide in 40 ml. of methanol and the mixture is stirred at room temperature for 2 hours. A toluene solution of 1-(2-bromoethylamino)-naphthalene, prepared by suspending 66.2 g. (0.2 mole) of the hydrobromide in concentrated ammonium hydroxide and extracting with toluene, is then added and the mixture boiled under reflux for 18 hours. Upon cooling, the sodium bromide which separates is collected by filtration and the filtrate is washed twice with water, dried over anhydrous potassium carbonate and evaporated in vacuo on the steam bath. The residue is distilled in vacuo through an 8-inch Vigreux column to give the desired N - [2 - (2 - diethylaminoethylthio) - ethyl]-1-naphthylamine as a yellow oil, B.P. 164–165° C./0.1 mm., $n_D^{25}$ 1.6015.

The other intermediate 1-naphthylamine compounds are prepared according to the procedures described under Examples 1 through 15 herein.

*Example 11*

A solution of 5.0 g. (0.05 mole) of 2-aminothiazole in 250 ml. of 50% sulfuric acid is cooled to −10° C., and nitrosyl sulfuric acid (3.5 g. of sodium nitrite in 35 ml. of concentrated sulfuric acid) is slowly added, keeping the temperature between −10 and −5° C. The resulting light brown solution is stirred for 30 minutes, then added to a solution of 12.7 g. (0.05 mole) of 1-[2-(1-naphthylamino)-ethyl]-piperidine in 250 ml. of 10% sulfuric acid. A dark red solution formed. After stirring for 2 hours at 0° to −10° C., 1 l. of water is added yielding a purple solution. Stirring is continued for 1 hour and the mixture is made alkaline with sodium hydroxide solution with cooling. The mixture is stirred for 24 hours and the sticky dye collected by filtration and washed with copious amounts of water to remove inorganic salts. The product is dissolved in chloroform; the chloroform solution is washed well with water, dried over anhydrous potassium carbonate, and the solvent removed in vacuo. The viscous residue is dissolved in acetone and precipitated by pouring the acetone solution into water. Upon heating the suspension, a crystalline solid separates which is collected by filtration and dried in vacuo at 45° C. Crystallization from an ethanol-water mixture gives the desired 1-{2-[4-(2-thiazolylazo)1 - naphthylamino]-ethyl}-piperidine, of formula,

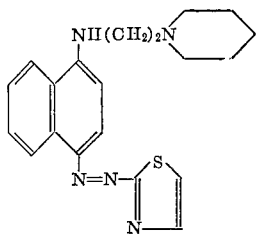

as emerald green, shimmering crystals, M.P. 135–137° C.

Utilizing the preparative methods outlined under Examples 1 through 15 herein, the following related compounds can be prepared starting from the appropriate 1-naphthylamine compound and aminothiazole:

2-[4-(2-diethylaminoethylamino)-1-naphthylazo]-thiazole
2-{4-[2-(isopropylmethylamino)-ethylamino]-1-naphthylazo}-5-nitrothiazole
2-{4-{2-[(2-diethylaminoethyl)ethylamino]-ethylamino}-1-naphthylazo}-4-methylthiazole
2-[4-(6-diethylaminohexylamino)-1-naphthylazo]-thiazole
2-[4-(3-dimethylamino-2,2-dimethylpropylamino)-1-naphthylazo-]-4-phenylthiazole
4-(2-dimethylaminoethyl)-1-{3-[4-(2-thiazolylazo)-1-naphthylamino]-propyl}-piperidine
2-[4-(2-diethylaminoethylamino)-1-naphthylazo]-4-(trifluoromethyl)-thiazole
2-[4-(2-diethylaminoethylamino)-5-methoxy-1-naphthylazo]-thiazole
2-[4-(2-diethylaminoethylamino)-1-naphthylazo]-4-ethylsulfonyl-5-nitrothiazole
2-[4-(2-dihexylaminoethylamino)-1-naphthylazo]-thiazole
2,2'-{2-[4-(2-thiazolylazo)-1-naphthylamino]-ethylimino}-diethanol
1-methyl-4-{2-[4-(2-thiazolylazo)-1-naphthylamino]-ethyl}-piperazine The starting material, 1-[2-(1-naphthylamino)-ethyl]-piperidine, can be prepared as follows: a mixture of 19 g. (0.057 mole) of N-(2-bromoethyl)-1-naphthylamine, hydrobromide and 100 ml. of piperidine is boiled under reflux for 20 hours and cooled; 100 ml. of 10% sodium hydroxide solution is added, and the mixture extracted with ether. The combined ether extracts are washed thoroughly with water, dried over anhydrous potassium carbonate, and the ether removed on the steam bath. The residue is distilled in vacuo through an 8-inch Vigreux column to give the desired 1-[2-(1-naphthylamino)-ethyl]-piperidine as a pale yellow oil with a purple fluorescence, B.P. 168–170°/0.5 mm., $n_D^{25}$ 1.6088.

The other intermediate 1-(dialkylaminoalkylamino)-naphthalene compounds employed herein are prepared according to the procedures described under Examples 1 through 15.

*Example 12*

3-aminoquinoline (14.4 g., 0.1 mole) is diazotized and coupled into 24.2 g. (0.1 mole) of 1-(2-diethylaminoethylamino)-naphthalene according to the procedure outlined under Example 1 herein for the preparation of 5-[4 - (2 - diethylaminoethylamino)-1-naphthylazo]-uracil. Crystallization of the crude dye from 2-propanol (decolorizing charcoal) gives the desired 3-[4-(2-diethylaminoethylamino)-1-naphthylazo]-quinoline, of formula,

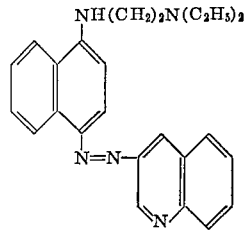

as red crystals, M.P. 124–125° C.

Alternatively, the desired 3-[4-(2-diethylaminoethylamino)-1-naphthylazo]-quinoline and other related compounds can be prepared by alkylating the appropriate (4-amino-1-naphthylazo)-heterocyclic compound with a suitable dialkylaminoalkyl halide. Thus, 3-[4-(2-diethylaminoethylamino)-1-naphthylazo]-quinoline is prepared according to the following procedure: to a xylene solution of 29.8 g. (0.1 mole) of 3-(4-amino-1-naphthylazo)-quinoline and 13.6 g. (0.1 mole) of 2-diethylaminoethylchloride is added 13.8 g. (0.1 mole) of anhydrous potassium carbonate and the resulting mixture is boiled under reflux for 24 hours. The cooled reaction mixture is washed with 50% sodium hydroxide solution and the xylene layer is separated and dried over anhydrous sodium sulfate. Volatile materials are removed in vacuo and the residue is crystallized from 2-propanol to give the desired 3-[4-(2-diethylaminoethylamino)-1-naphthylazo]-quinoline as red crystals, M.P. 124–125° C.

The intermediate 3-(4-amino-1-naphthylazo)-quinoline, M.P. 238–239° C., is prepared from diazotized 3-aminoquinoline and 1-naphthylamine according to the procedure described above for the coupling with 1-(2-diethylaminoethylamino)-naphthalene.

Utilizing the preparative methods described under Examples 1 through 15 herein, the following related compounds can be prepared, starting from the appropriate 1-naphthylamine and aminoquinoline precursors:

6-[4-(2-diethylaminoethylamino)-1-naphthylazo]-quinoline
1-{2-[4-(3-quinolylazo)-1-naphthylamino]-ethyl}-3-piperidinol
3-[4-(2-diethylaminoethylamino)-7-methyl-1-naphthylazo]-quinoline
3-{4-{2-[bis(3-diethylaminopropyl)amino]-ethylamino}-1-naphthylazo}-quinoline
2-[4-(2-diethylaminoethylamino)-1-naphthylazo]-quinoline
3-{6-ethoxy-4-[2-(isopropylmethylamino)-ethylamino]-1-naphthylazo}-quinoline
3-[4-(6-diethylaminohexylamino)-1-naphthylazo]-quinoline
3-{4-[3-(hexahydro-1-azepinyl)-propylamino]-1-naphthylazo}-quinoline
8-(2-diethylaminoethylamino)-5-(3-quinolylazo)-1-naphthalenesulfonic acid
3-{4-[2-(1-methyl-2-piperidinyl)-ethylamino]-1-naphthylazo}-quinoline
3-{4-{[1-(diethylaminomethyl)-cyclohexylmethyl]-amino}-1-naphthylazo}-quinoline
4-{2-[4-(3-quinolylazo)-1-naphthylamino]-ethyl}-1-piperazineethanol The other intermediate 1-naphthylamine compounds are prepared according to the procedures described under Examples 1 through 15 herein.

*Example 13*

4-amino-2,3-dimethyl-1-phenyl-3-pyrazolin-5-one (10.2 g., 0.05 mole) is diazotized and coupled into 12.8 g. (0.05 mole) of 1-(2-diethylaminoethylamino)-6-methoxynaphthalene according to the procedure outlined under Example 6 herein for the preparation of 1-diethylamino-3-[4-(3-pyridylazo) - 1 - naphthylamino]-2-propanol, trihydrochloride. Crystallization of the crude dye from a 2-propanol-methanol mixture gives the desired 4-[4-(2-diethylaminoethylamino)-7-methoxy - 1 - naphthylazo]-2,3-dimethyl-1-phenyl-3-pyrazolin-5-one, dihydrochloride, as blue crystals, of formula,

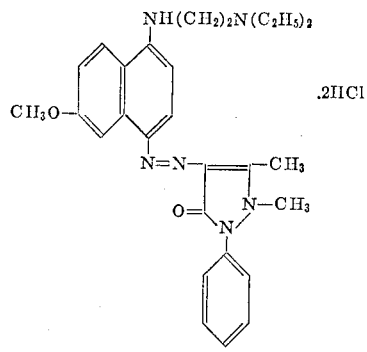

which in hydrated form melt at 200–202° C.

Utilizing the preparative methods described under Examples 1 through 15 herein, the following related compounds can be prepared, starting from the appropriate 1-naphthylamine and pyrazole intermediates:

3-{4-{4-[2-(allylethylamino)-ethylamino]-1-naphthylazo}-3-methyl-5-oxo-2-pyrazolin-1-yl}-4-chlorobenzenesulfonic acid, hydrochloride
4-{4-[2,2-dimethyl-3-(1-pyrrolidinyl)-propylamino]-1-naphthylazo}-5-hydroxy-3-methyl-1-pyrazoleethanol, dihydrochloride
4-[4-(2-diethylaminoethylamino)-1-naphthylazo]-2,3-dimethyl-1-phenyl-3-pyrazolin-5-one
1-methyl-4-{2-[4-(4-pyrazolylazo)-1-naphthylamino]-ethyl}-homopiperazine
4-[7-chloro-4-(4-diethylamino-1-methylbutylamino)-1-naphthylazo]-3,5-dimethylpyrazole
4-{4-[2-(ethylmethylamino)-ethylamino]-1-naphthylazo}-5-hydroxy-1-p-sulfophenyl-3-pyrazolecarboxylic acid
4-[4-(3-dimethylamino-2,2-dimethylpropylamino)-1-naphthylazo]-2,3-dimethyl-1-phenyl-3-pyrazolin-5-one
5-[4-(3-diethylaminocyclohexylamino)-1-naphthylazo]-3,4-dimethyl-1-phenylpyrazole
4-{4-{2-[(2-ethoxyethyl)(2-hydroxyethyl)amino]-ethylamino}-1-naphthylazo}-5-hydroxy-1-p-sulfophenyl-3-pyrazolecarboxylic acid
2,3-dimethyl-4-{4-{2-[4-(2-piperidinoethyl)-piperidino]-ethylamino}-1-naphthylazo}-1-phenyl-3-pyrazolin-5-one
m-{4-[4-(2-diisopentylaminoethylamino)-1-naphthylazo]-5-hydroxy-3-methyl-1-pyrazolyl}-benzenesulfonic acid
3(or 5)-{4-{2-[methyl(2-piperidinoethyl)amino]-ethylamino}-1-naphthylazo}-4-pyrazolecarboxylic acid.
4-[4-(3-diethylamino-2-hydroxypropylamino)-1-naphthylazo]-2,3-dimethyl-1-phenyl-3-pyrazolin-5-one
8-(3-dimethlaminopropylamino)-4-(2,3-dimethyl-5-oxo-1-phenyl-3-pyrazolin-4-ylazo)-2-naphthalenesulfonic acid 1-(2 - diethylaminoethylamino)-6-methoxynaphthalene, B.P. 195–196° C./2 mm., $n_D^{25}$ 1.5904, employed as a starting material for the above procedure, can be prepared from 6-methoxy-1-naphthylamine and 2-diethyl- aminoethylchloride hydrochloride in accordance with the method set forth under Example 1 herein for the preparation of 1-(2-diethylaminoethylamino)-naphthalene. The other intermediate 1-naphthylamine compounds can be prepared according to the methods outlined under Examples 1 through 15 herein.

*Example 14*

To a solution of 9.75 g. (0.025 mole) of N-(2-diethylaminoethyl)-N-(4-amino - 1 - naphthyl)-trifluoroacetamide, monohydrochloride, in 100 ml. of ice water and 4.5 ml. of concentrated hydrochloric acid is added 25 ml. of 1 molar sodium nitrite solution over a period of 2 minutes. The resulting red solution is stirred for 4 minutes and added in one portion to a solution of 10.51 g. (0.025 mole) of 8-(2-diisobutylaminoethylamino)-6-methoxyquinoline, dihydrochloride, monohydrate, in 100 ml. of water, 10 ml. of concentrated hydrochloric acid and 100 g. of ice. The maroon reaction mixture is stirred at 0–5° C. for 2 hours, 15 ml. of concentrated amonium hydroxide is added and the maroon solid which separates is collected by filtration and washed with water. Upon drying in vacuo, the crude intermediate trifluoroacetamide of formula,

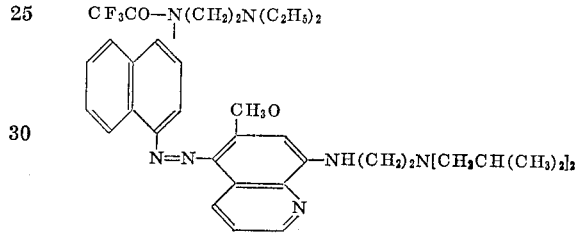

melts at 50–70° C.

The above amide (16.7 g.) is dissolved in 400 ml. of methanol, 15 ml. of 6 N aqueous sodium hydroxide is added, and the mixture is stirred at 40° C. under nitrogen for 5 days. The mixture is cooled, and the deep maroon crystals which separate are collected by filtration and washed successively with cold methanol and water. Crystallization from 95% ethanol gives the desired 5-[4-(2-diethylaminoethylamino) - 1 - naphthylazo] - 8 - (2-diisobutylaminoethylamino)-6-methoxyquinoline, of formula,

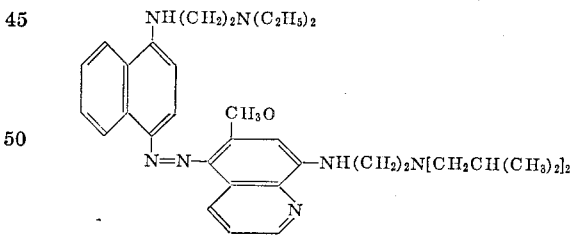

M.P. 92–94° C. (dec.).

By similar procedures, the following related compounds can be prepared, starting from the appropriate N-(dialkylaminoalkyl)-N-(4 - amino-1-naphthyl)-trifluoroacetamide and aminoquinoline via the N-[4-(quinolylazo)-1-naphthyl] - N - (dialkylaminoalkylamino)-α,α,α-trifluoroacetamides:

2-{8-(2-diisobutylaminoethylamino)-5-[4-(2-diisopropylaminoethylamino)-1-naphthylazo]-6-quinolyloxy}-ethanol
4-{3-{5-[4-(2-diethylaminoethylamino)-1-naphthylazo]-6-methoxy-8-quinolylamino}-propyl}-1-piperazineethanol
1-{2-{6-methoxy-5-[4-(3-piperidinopropylamino)-1-naphthylazo]-8-quinolylamino}ethyl}-4-methylpiperazine
8-(4-amino-1-methylbutylamino)-5-[4-(2-diethylaminoethylamino)-1-naphthylazo]-6-methoxyquinoline
5-[4-(2-diethylaminoethylamino)-1-naphthylazo]-8-(4-diethylamino-1-methylbutylamino)-6-methoxyquinoline 5-[4-(2-diethylaminoethylamino)-1-naphthylazo]-6-
  ethoxy-8-[3-(1-piperazinyl)-propylamino]-quinoline
6-methoxy-5-{4-[2-(4-methyl-1-piperazinyl)-ethyl-
  amino]-1-naphthylazo}-8-[3-(4-methyl-1-piperazinyl)-
  propylamino]-quinoline
6-methoxy-8-[1-methyl-4-(4-methyl-1-piperazinyl)-
  butylamino]-5-{4-[2-(1-pyrrolidinyl)-ethylamino]-
  1-naphthylazo}-quinoline The intermediate N - (4-quinolylazo-1-naphthyl)-N-(dialkylaminoalkyl) - α,α,α - trifluoroacetamides are prepared from the appropriate aminoquinoline and N-dialkylaminoalkyl-N-(4 - amino-1-naphthyl)-α,α,α-trifluoroacetamide compounds in accordance with the method described above for the preparation of N-(2-diethylaminoethyl)-N-{4-[8-(2-diisobutylaminoethylamino) - 6 - methoxy-5-quinolylazo]-1-naphthyl}-2,2,2-trifluoroacetamide.

Example 15

N - (2 - diethylaminoethyl) - N - (4 - amino - 1-napthyl)-trifluoroacetamide, monohydrochloride (9.75 g., 0.025 mole), is diazotized according to the procedure described under Example 2 herein. To this cold diazonium salt solution is then added 400 g. of ice, followed by the slow addition of a warm solution of 3.2 g. (0.025 mole) of barbituric acid in 4.2 ml. (0.025 mole) of 6 N aqueous sodium hydroxide, 2.1 g. (0.025 mole) of sodium bicarbonate and 200 ml. of water. The resulting golden orange suspension is stirred for 1 hour at 0° C., a mixture of 25 ml. (0.025 mole) of 1 M sodium bicarbonate and 4.2 ml. (0.025 mole) of 6 N aqueous sodium hydroxide is added, and the mixture is allowed to warm slowly to room temperature. Stirring is continued for 48 hours and the brown gelatinous precipitate is collected by filtration. This is resuspended in water, stirred for 18 hours and treated with an excess of Dry Ice. The suspended solid is collected by filtration, washed with water and dried. Crystallization from an ethanol-dimethylformamide mixture gives the desired 5 - [4 - (2 - diethylaminoethylamino) - 1 naphthylazo]-barbituric acid, of formula,

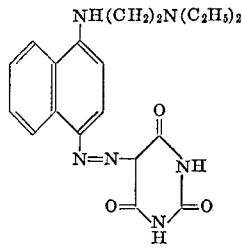

as reddish-black crystals, M.P. 209–213° C.

By similar procedures, the following related compounds can be prepared, starting from the appropriate 1-(dialkylaminoalkylamino)-naphthalene via the N-[4-(pyrimidylazo) - 1 - naphthyl] - N - (dialkylaminoalkylamino)-α,α,α-trifluoroacetamides:

5-[4-(2-diethylaminoethylamino)-1-naphthylazo]-2-
  thiobarbituric acid
5-{4-[2-(isopropylmethylamino)-ethylamino]-1-naph-
  thylazo}-2-methyl-4,6-pyrimidinediol
2-amino-5-{4-{2-[bis(2-ethoxyethyl)-amino]-ethyl-
  amino}-1-naphthylazo}-4,6-pyrimidinediol
5-[4-(2-diethylaminoethylamino)-1-naphthylazo]-1,3-
  dimethylbarbituric acid
6-amino-5-[4-(2,2-dimethyl-3-piperidinopropylamino)-
  1-naphthylazo]-uracil
5-{4-{3-[4-(3-diethylaminopropyl)-1-piperazinyl]-pro-
  pylamino}-1-naphthylazo}-barbituric acid
1,3-diisopropyl-5-[4-(2-dimethylaminoethylamino)-1-
  naphthylazo]-barbituric acid
2,6-diamino-5-[4-(3-diallylaminopropylamino)-1-
  naphthylazo]-4-pyrimidinol
5-{7-chloro-[4-(2-diethylaminoethylamino)-1-nap-
  thylazo]}-barbituric acid
2,6-diamino-5-[4-(2-diethylaminoethylamino)-1-
  naphthylazo]-4-pyrimidinol
5-{4-[2-(1-methyl-2-piperidyl)-ethylamino]-1-
  naphthylazo}-barbituric acid
5-{4-[2-(2-diethylaminoethoxy)-ethylamino]-1-
  naphthylazo}-barbituric acid The intermediate N - [4 - (pyrimidylazo) - 1 - naphthyl] - N - (dialkylaminoalkylamino) - α,α,α - trifluoroacetamides are prepared in a similar manner from the appropriate pyrimidine and N-dialkylaminoalkyl-N-(4-amino-1-naphthyl)-α,α,α-trifluoroacetamide compounds.

Example 16

A solution of 9.4 g. (0.052 mole) of 6-amino-2H-1,4-benzothiazin-3(4H)-one in 50 ml. of water, 50 ml. of ethanol and 30 ml. of concentrated hydrochloric acid is cooled to −5° C. and diazotized by the addition of 3.6 g. (0.052 mole) of sodium nitrite in 20 ml. of water. After 5 minutes, the diazonium salt is added with stirring to a solution of 12.6 g. (0.052 mole) of 1-(2-diethylaminoethylamino)-naphthalene in a mixture of 1 l. of water and 50 ml. of concentrated hydrochloric acid which had previously been cooled to 0° C. The resulting purple mixture is stirred for 2 hours, and the bright orange-red base precipitated by the addition of an excess of concentrated ammonium hydroxide. The crude dye is collected by filtration and thoroughly triturated with several portions of hot water. Crystallization from 2-propanol gives the desired 6-[4-(2-diethylaminoethylamino) - 1 - naphthylazo] - 2H - 1,4 - benzothiazin-3(4H)-one, of formula,

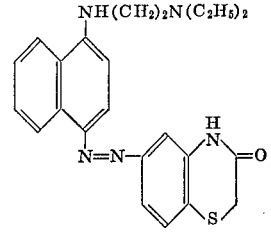

as red luminous crystals, M.P. 213–214° C.

In similar manner, the following related compounds can be prepared by diazotizing the appropriate aminobenzothiazine or aminophenothiazine and coupling the diazonium compounds thus obtained with the corresponding 1-naphthylamine:

6-{4-{2-[4-(2-diethylaminoethyl)-piperidino]-ethyl-
  amino}-1-naphthylazo}-2H-1,4-benzothiazine
7-[4-(2-diethylaminoethylamino)-1-naphthylazo]-2-
  (trifluoromethyl)-phenothiazine
6-[4-(1-methyl-4-piperidylamino)-1-naphthylazo]-2H-
  1,4-benzothiazin-3(4H)-one
3-{7-[4-(2-diethylaminoethylamino)-1-naphthylazo]-6-
  (2-dimethylaminoacetamido)-2-ethyl-3-methyl-2H-
  1,4-benzothiazin-4(3H)-yl}-1,2-propanediol
6-[7-chloro-4-(2-diethylaminoethylamino)-1-naph-
  thylazo]-2H-1,4-benzothiazin-3(4H)-one
3-[4-(2-diethylamino-1-methylethylamino)-1-naph-
  thylazo]-10-ethylphenothiazine
7-[4-(2-diethylaminoethylamino)-1-naphthylazo]-6-(N-
  methylmethanesulfonamido)-2H-1,4-benzothiazine-
  4(3H)-ethanesulfonic acid, 1-oxide, monosodium
  salt
3-[4-(2-diethylaminoethylamino)-1-naphthylazo]-
  phenothiazine
10-(3-dimethylaminopropyl)-7-{4-[2-(isopropylmethyl-
  amino)-ethylamino]-1-naphthylazo}-2-(trifluoro-
  methyl)-phenothiazine
4-{2-[4-(3,4-dihydro-3-oxo-2H-1,4-benzothiazin-6-
  ylazo)-1-naphthylamino]-ethyl}-1-piperazine-
  ethanol 10-ethyl-3-{4-[2-(1-pyrrolidinyl)-ethylamino]-1-naphthylazo}-phenothiazine, 5,5-dioxide 6-[4-(2-methyl-3-piperidinopropylamino)-1-naphthylazo]-2H-1,4-benzothiazin-3(4H)-one The other intermediate 1-(dialkylaminoalkylamino)-naphthalene intermediates are prepared according to the procedures described under Examples 1 through 15 herein.

Example 17

5-amino-8-quinolinol (10.0 g., 0.048 mole) is diazotized and coupled into 12.4 g. (0.048 mole) of 2-{ethyl[2-(1-naphthylamino)-ethyl]-amino}-ethanol according to the procdure outlined under Example 3 herein for the preparation of 5-{4-{2-[(2-diisopropylaminoethyl)-methylamino}-1-naphthylazo]}-indazole. The crude dye base is dissolved in 1 l. of ethanol, the solution is filtered, and the desired 2-{ethyl{2-[4-(8-hydroxy-5-quinolyazo)-1-naphthylazo]-ethyl}-amino}-ethanol, dihydrochloride, of formula,

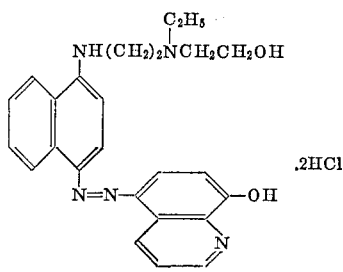

is caused to precipitate by the addition of 50 ml. of 4 N ethanolic hydrogen chloride. The salt is collected by filtration, dried in vacuo, and allowed to equilibrate in the air. The brown hydrated solid melts at 190–192° C.

Utilizing the preparative methods outlined under Examples 1 through 15 herein, the following related compounds can be prepared starting from the appropriate 1-naphthylamine compound and aminoquinoline:

3-{4-[2-(5-ethyl-2-methylpiperidino)-ethylamino]-1-naphthylazo}-quinoline

8-[4-(2-diethylaminoethylamino)-1-naphthylazo]-α-(diethylaminomethyl)-2-phenyl-4-quinolinemethanol 5-{4-{2-[bis(2-methoxyethyl)-amino]-ethylamino}-1-naphthylazo}-quinoline 3-[4-(2-diethylaminoethylamino)-5-nitro-1-naphthylazo]-quinoline 1-{2-[4-(8-quinolylazo)-1-naphthylamino]-ethyl}-1-azaspiro-[4,5]decane 2,2'-{3-[5-phenylazo-8-quinolylazo]-1-naphthylamino]-propylamino}diethanol 2-{8-[4-(3-diethylamino-2-ethoxypropylamino)-1-naphthylazo]-6-quinolyloxyethanol 3-{4-[2-(allylethylamino)-ethylamino]-1-naphthylazo}-quinoline 8-{4-[5-(dimethylaminomethyl)tetrahydrofurfurylamino]-1-naphthylazo}-5-nitroquinoline 3-{4-[2-(4-methyl-1-homopiperazinyl)-ethylamino]-1-naphthylazo}-quinoline 6-[4-(3-diethylamino-2-methylpropylamino)-7-methoxy-1-naphthylazo]-5,8-diethoxy-4-methylcarbostyril 8-[4-(2-diethylamino-2-methylpropylamino)-1-naphthylazo]-quinoline 2-{ethyl[2-(1-naphthylamino)-ethyl]-amino}-ethanol, B.P. 170–172° C./0.2 mm., $n_D^{25}$ 1.6109, employed as a starting material in the above procedure, is prepared from N-(2-bromoethyl)-1-naphthylamine, hydrobromide and N-ethylethanolamine according to the method described under Example 5 herein for the preparation of 1,1-diisopropyl-4-methyl-7-(1-naphthyl)-diethylenetriamine. The other intermediate 1-(dialkylaminoalkylamino)-naphthalenes employed herein can be prepared from the appropriate 1-naphthylamine or 1-naphthol according to the procedures described under Examples 1 through 15.

Example 18

5-aminouracil (9.5 g., 0.075 mole) is diazotized and coupled into 21.3 g. (0.075 mole) of 1-(5-diethylaminopentylamino)-naphthalene according to the procedure outlined under Example 1 herein for the preparation of 5-[4-(2-diethylaminoethylamino)-1-naphthylazo]-uracil. Crystallization of the crude dye from a dimethylacetamide-water mixture gives the desired 5-[4-(5-diethylaminopentylamino)-1-naphthylazo]-uracil, of formula,

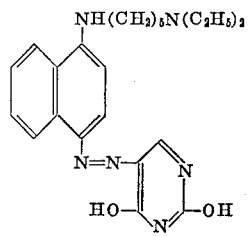

as deep red crystals, M.P. 170° C. (dec.).

Utilizing the preparative methods described under Examples 1 through 15 herein, the following related compounds can be prepared, starting from the appropriate 1-(dialkylaminoalkylamino)-naphthalene and 5-aminouracil:

5-[4-(3-diethylamino-2-hydroxypropylamino-1-naphthylazo]-uracil, salt with ½ formula weight 4,4'-methylenebis(3-hydroxy-2-naphthoic acid)

8-(2-diethylaminoethylamino)-5-(2,4-dihydroxy-5-pyrimidinylazo)-2-naphthalenesulfonic acid 5-{4-{2-[ethyl(2-hydroxyethyl)-amino]-ethylamino}-1-naphthylazo}-uracil, cholate 5-{4-{[1-(diethylaminomethyl)-cyclohexylmethyl]-amino}-1-naphthylazo}-uracil, 8-chlorotheophyllinate 5-[4-(8-diethylaminooctylamino)-1-naphthylazo]-uracil, phosphate 5-[4-(2-diethylaminoethylamino)-6-ethoxy-1-naphthylazo]-uracil, malonate 5-{4-[2-(3-diethylaminopropylthio)-ethylamino]-1-naphthylazo}-uracil, succinate 5-{4-[2,2-dimethyl-3-(1-pyrrolidinyl)-propylamino]-1-naphthylazo}-uracil, β-resorcylate 5-[4-(2-diethylaminoethylamino)-7-nitro-1-naphthylazo]-uracil, citrate 5-{4-[2-(decahydro-1-quinolyl)-ethylamino]-1-naphthylazo}-uracil, salt with 4-biphenylcarboxylic acid 5-{4-[2-(4-methyl-1-piperazinyl)-ethylamino]-1-naphthylazo}-uracil, adipate 5-[4-(2-dihexylaminoethylamino)-1-naphthylazo]-uracil, salicylate 5-{4-[2-(1-azaspiro[4,5]decan-1-yl)-ethylamino]-1-naphthylazo}-uracil, salt with 3-hydroxy-2-naphthoic acid 1-(5-diethylaminopentylamino)-naphthalene, B.P. 198–200° C./1.8 mm., $n_D^{24.5}$ 1.5740, employed as a starting material for the above procedure, can be prepared from 1-naphthylamine and 5-diethylaminopentylchloride hydrochloride in accordance with the method set forth under Example 1 herein for the preparation of 1-(2-diethylaminoethylamino)-naphthalene. Other intermediate 1-(dialkylaminoalkylamino)-naphthalenes can be prepared from a 1-naphthylamine or 1-naphthol compound according to the procedures outlined in Examples 1 through 15 herein.

Example 19

3-aminopyridine (9.3 g., 0.1 mole) is diazotized and coupled into 24.2 g. (0.1 mole) of 1-(2-diethylaminoethylamino)-naphthalene according to the procedure outlined under Example 6 herein for the preparation of 1-diethylamino-3-[4-(3-pyridylazo)-1-naphthylamino]-2- propanol, trihydrochloride. The maroon solid thus obtained, M.P. 139–141° C., is the desired 3-[4-(2-diethylaminoethylamino) - 1 - naphthylazo]-pyridine, trihydrochloride, of formula,

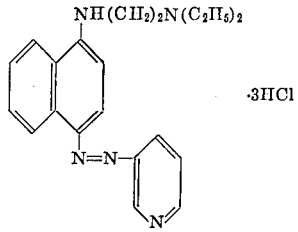

containing 3½ moles of water of hydration.

Utilizing the preparative methods described under Examples 1 through 15 herein, the following related compounds can be prepared, starting from the appropriate 1-naphthylamine and aminopyridine precursors:

2-[4-(2-diethylaminoethylamino)-1-naphthylazo]-pyridine, trihydrochloride
4-(2-diethylaminoethyl)-1-{2-[4-(3-pyridylazo)-1-naphthylamino]-ethyl}-piperidine
4-[4-(2-diethylaminoethylamino)-1-naphthylazo]-pyridine, trihydrochloride
3-[4-(4-diethylamino-1-methylbutylamino)-1-naphthylazo]-pyridine
3-[4-(3-diethylaminocyclohexylamino)-1-naphthylazo]-pyridine
3-[4-(6-diethylaminohexylamino)-1-naphthylazo]-pyridine
3-[4-(3-diethylamino-2,2-dimethylpropylamino)-1-naphthylazo]-pyridine
1-{5-[4-(3-pyridylazo)-1-naphthylamino]-pentyl}-piperidine
3-[4-(2-dimethylamino-1-methylethylamino)-1-naphthylazo]-pyridine
3-{4-{2-{[2-(2-diethylaminoethoxy)ethyl]-ethylamino}-ethylamino}-1-naphthylazo}-pyridine
3-{4-[2-(isopropylmethylamino)-ethylamino]-1-naphthylazo}-pyridine
3-{4-[2-(hexahydro-4-methyl-1,4-diazepin-1-yl)-ethylamino]-1-naphthylazo}-pyridine The other substituted 1-naphthylamines employed herein are prepared according to procedures similar to those described under Examples 1 through 15.

Example 20

2-aminodibenzothiophene (4.7 g., 0.024 mole) is diazotized and coupled into 6.1 g. (0.024 mole) of N-butyl-N-methyl-N'-1-naphthylethylenediamine according to the procedure described under Example 1 herein. The crude red dye is washed thoroughly with cold water, dissolved in a hot methanol-acetone mixture, and poured with stirring into water containing a few drops of ammonium hydroxide. The finely divided precipitate thus obtained is coagulated by heating, collected by filtration, and crystallized from 2-propanol. This is the desired N-butyl-N' -[4 - (dibenzothiophene - 2 - ylazo) - 1 - naphthyl]-N-methylethylenediamine, of formula,

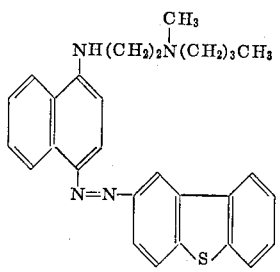

M.P. 120–121° C.

Utilizing preparative procedures similar to those described under Examples 1 through 15 herein, the following related compounds can be prepared, starting from the appropriately substituted 1-naphthylamine compound and hydroxy or amino dibenzothiophene or thiaraphthene:

3-[4-(2-diethylaminoethylamino)-1-naphthylazo]-dibenzothiophene
5-[4-(2-diethylaminoethylamino)-6-methoxy-1-naphthylazo]-thianaphthene
3-{4-[2,3-bis(diethylamino)propylamino]-1-naphthylazo}-dibenzothiophene, 5-oxide
1-{2-[4-(4-amino-7-thianaphthenylazo)-1-naphthylamino]-ethyl}-1-azaspiro[4.5]decane
2-[4-(4-diethylaminopentylamino)-1-naphthylazo]-dibenzothiophene, 5,5-dioxide
5-{4-[2-(hexahydro-2-methyl-1-pyridazinyl)-ethylamino]-1-naphthylazo}-2-thianaphthenecarboxylic acid
2-{4-{2-[methyl(1-methyl-4-piperidyl)-amino]-ethylamino}-1-naphthylazo}-3-thianaphthen-3-ol
5-{4-{2-[2-(2-dimethylaminoethoxy)-ethoxy]-ethylamino}-1-naphthylazo}-thianaphthene
5-{4-[2-(2-diethylaminoethyl)-cyclopentylamino]-1-naphthylazo}-thianaphthene, 1,1-dioxide
1-{2-[4-(1-bromo-4-dibenzothiophenylazo)-1-naphthylamino]-ethyl}-piperidine
N'-[4-(6-amino-7-thianaphthenylazo)-1-naphthyl]-N-ethyl-N-hexyl-1,3-propanediamine
1-{2-[4-(8-ethoxy-2-dibenzothiophenylazo)-1-naphthylamino]ethyl}-4-ethylpiperazine The starting material, N-butyl-N-methyl-N'-1-naphthylenediamine, B.P. 142–144° C./0.1 mm., $n_D^{25}$ 1.5800, is prepared from 1-naphthylamine and 2-(butylmethylamino)-ethyl chloride, hydrochloride, according to the procedure outlined under Example 1 for the preparation of 1 - (2 - diethylaminoethylamino) - naphthalene. The other substituted 1-naphthylamines employed are prepared according to procedures similar to those outlined under Examples 1 through 15.

Example 21

5-aminouracil (6.4 g., 0.05 mole) is diazotized and coupled into 15.7 g. (0.05 mole) of 1,1,4-triethyl-7-(1-naphthyl)-diethylenetriamine according to the procedure outlined under Example 4 herein for the preparation of 8 - [4 - (3 - diethylamino - 2,2 - dimethylpropylamino)-1-naphthylazo]-5,6-dimethoxyquinoline, trihydrochloride. Crystallization of the crude dye from a methanol-2-propanol mixture gives the desired 5-{4-{2-[(2-diethylaminoethyl) - ethylamino] - ethylamino} - 1 - naphthylazo}-uracil, trihydrochloride, of formula,

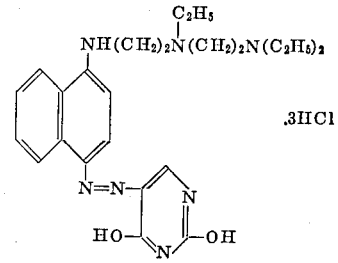

as dark blue crystals, M.P. 164–167° C.

Utilizing the preparative methods described under Examples 1 through 15 herein, the following related compounds can be prepared, starting from the appropriate 1-naphthylamine and pyrimidine intermediates:

4,6-diamino-5-[4-(2-diethylaminoethylamino)-1-naphthylazo]-pyrimidine
2,4-diamino-5-[4-(2-diethylaminoethylamino)-1-naphthylazo]-6-ethylpyrimidine
2,4-bis(diethylamino)-5-[4-(1-methyl-3-piperidylmethylamino)-1-naphthylazo]pyrimidine
2,4-diamino-5-{4-[2-(isopropylmethylamino)-ethylamino]-1-naphthylazo}-pyrimidine 2-amino-5-[7-chloro-4-(2-diethylaminoethylamino)-1-naphthylazo]-4-piperidinopyrimidine 2,4,6-triamino-5-{4-[2-(4-methyl-1-piperazinyl)-ethylamino]-1-naphthylazo}-pyrimidine 4-amino-5-[4-(2-diethylaminoethylamino)-1-naphthylazo]-2-(4-piperidinobutylamino)-pyrimidine 2-(2-diethylaminoethylamino)-5-[4-(2-diethylaminoethylamino)-1-naphthylazo]-4-methoxypyrimidine 4-diethylamino-5-{4-[2-(isopropylmethylamino)-ethylamino]-1-naphthylazo}-2-(5-piperidinopentylamino)-pyrimidine 4-diethylamino-2-(4-diethylaminobutylamino)-5-[4-(2-diethylaminoethylamino)-1-naphthylazo]-pyrimidine 2-amino-4-anilino-5-[4-(2-diethylaminoethylamino)-1-naphthylazo]-pyrimidine 4-amino-2-(4-diethylamino-1-methylbutylamino)-5-[4-(4-diethylamino-1-methylbutylamino)-1-naphthylazo]-6-methylpyrimidine 2,4-bis(3-piperidinopropylamino)-5-[4-(3-piperidinopropylamino)-1-naphthylazo]-pyrimidine 1,1,4 - triethyl - 7 - (1 - naphthyl)-diethylenetriamine, B.P. 145–148° C./0.1 mm., $n_D^{25}$ 1.5715, employed as a starting material in the above procedure, is prepared from N-(2-bromoethyl)-1-naphthylamine, hydrobromide and N,N,N'-triethylethylenediamine according to the method described under Example 3 herein for the preparation of 1,1 - diisopropyl - 4 - methyl - 7 - (1 - naphthyl) - diethylenetriamine. The other intermediate 1-(dialkylaminoalkylamino)-naphthalenes employed herein can be prepared from the appropriate naphthalene compound according to the procedures described under Examples 1 through 15.

*Example 22*

5-amino-1,4-dihydroxyphthalazine (17.7 g., 0.1 mole is diazotized and coupled into 24.3 g. (0.1 mole) of 1-(2 - diethylaminoethylamino)-naphthalene according to the procedure outlined under Example 3 herein for the preparation of 5-{4-{2-[(2-diisopropylaminoethyl)-methylamino} - 1 - naphthylazo]}-indazole. Crystallization of the crude dye from a dimethylacetamide-2-propanol mixture gives the desired 5-[4-(2-diethylaminoethylamino)-1-naphthylazo]-1,4-phthalazinediol, of formula,

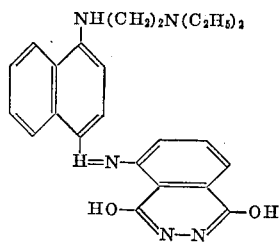

as greenish-black crystals, M.P. 211–213° C.

Utilizing the preparative methods described under Examples 1 through 15 herein, the following related compounds can be prepared, starting from the appropriate 1-naphthylamine and aminophthalazine or aminophenazine precursors:

5-{4-{2-[2-(2-piperidinoethyl)-piperilino]-ethylamino}-1-naphthylazo}-1,4-phthalazinediol 2-[4-(2-diethylaminoethylamino)-1-naphthylazo]-phenazine 6-{6-chloro-4-[2-(1-pyrrolidinyl)-ethylamino]-1-naphthylazo}-1,2,3,4-tetrahydro-2,3-dimethyl-1,4-phthalazinedione 3-diethylamino-7-[4-(2-diethylaminoethylamino)-1-naphthylazo]-5-phenylphenazinium chloride, hydrochloride 6-4-2-[ethyl(2-piperidinoethyl)-amino]-ethylamino-1-naphthylazo-1,4-phthalazinediol 3-amino-7-[4-(2-diethylaminoethylamino)-1-naphthylazo]-2,8-dimethyl-5-phenylphenazinium chloride, hydrochloride 5-{4-{2-[(2-hydroxyethyl)methylamino]-ethylamino}-1-naphthylazo}-1,4-phthalazinediol 6-[4-(2-diethylaminoethylamino)-1-naphthylazo]-1,4-benzo[g]phthalazine 5-[4-(4-diethylamino-1-methylbutylamino)-1-naphthylazo]1,4-dimethoxyphthalazine 2-[4-(3-diethylamino-2,2-dimethylpropylamino)-1-naphthylazo]-8-dimethylamino-3-methyl phenazine 2,3-dihydro-2-methyl-5-{4-[2-(1-methyl-2-piperidyl)-ethylamino]-1-naphthylazo}-1,4-phthalazinedione 7-{4-[3-(4-ethyl-1-piperazinyl)-propylamino]-1-naphthylazo}-2-phenazinol 5-{4-[4-(diethylaminomethyl)-cyclohexylmethylamino]-1-naphthylazo}-2,3-dihydro-1,4-phthalazinedione 7-[4-(3-diisopropylaminopropylamino)-6-methoxy-1-naphthylazo]-5-phenyl-3(5H)-phenazinone 3-{4-[2-(2-dimethylaminoethylthio)-ethylamino]-1-naphthylazo}-5-methylphenazinium chloride The intermediate 1-(dialkylaminoalkylamino)-naphthalenes employed herein are prepared from 1-naphthylamine or 1-naphthol according to the procedures described under Examples 1 through 15.

*Example 23*

5-amino-8-methylquinoline (5.3 g., 0.03 mole) is diazotized and coupled into 7.6 g. (0.03 mole) of 4-(2-diethylaminoethyl)-1-[2-(1-naphthylamino)-ethyl]-piperidine according to the procedure outlined under Example 6 herein for the preparation of 1-diethylamino-3-[4-(3-pyridylazo)-1-naphthylamino]-2-propanol, trihydrochloride. Crystallization of the crude dye from a mixture of 2-propanol and methanol gives the desired 5-{4-{2-[4-(2-diethylaminoethyl)-piperidino]-ethylamino}-1 - naphthylazo}-8-methylquinoline, trihydrochloride, of formula,

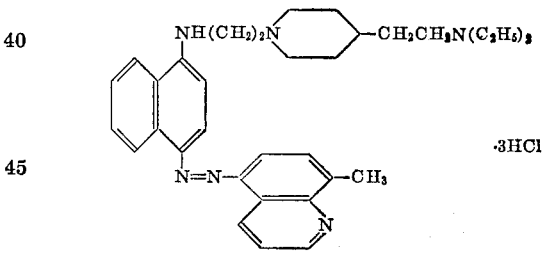

as a deep purple solid, M.P. 145–147° C.

Utilizing the preparative methods described under Examples 1 through 15 herein, the following related compounds can be prepared, starting from the appropriate substituted 1-naphthylamine and aminoquinoline compound:

6-{4-[3-(4-methyl-1-piperazinyl)-2,2-dimethylpropylamino]-1-naphthylazo}-quinoline 3-[4-(3-dimethylamino-2-methylpropylamino)-6-methyl-1-naphthylazo]-quinoline 3-[4-(4-diethylamino-2-isopropyl-1-methylbutylamino)-1-naphthylazo]-quinoline 5-[4-(3-diethylaminopropylamino)-1-naphthylazo]-7-piperidinomethyl-8-quinolinol 8-{4-[2-hydroxy-3-(methylpropylamino)-propylamino]-1-naphthylazo}-6-quinolinol 5-(2-diethylaminoethylamin)-8-(3-quinolylazo)-2-naphthoic acid 1-{2-[4-(3-quinolylazo)-1-naphthylamino]-ethyl}-3-piperidinemethanol 6-ethoxy-5-methoxy-8-}4-[2-(2-piperidinoethoxy)-ethylamino]-1-naphthylazo}-quinoline 3-{4-[2-(4-dimethylaminopiperidino)-ethylamino]-1-naphthylazo}-quinoline 5-(2-diethylaminoethylamino)-8-(5,6-dimethoxy-8-quinolylazo)-2-naphthol 8-{4-{[4-diethylaminomethyl)-cyclohexylmethyl]amino}-1-naphthylazo}-5-methoxyquinoline
4-{4-[2-(cyclopentylmethylamino)-ethylamino]-1-naphthylazo}-quinoline 4-(2-diethylaminoethyl)-1-[2-(1-naphthylamino)-ethyl]-piperidine, B.P. 208–209° C./0.2 mm., $n_D^{25}$ 1.5795, employed as a starting material in the above procedure, is prepared from N-(2-bromoethyl)-1-naphthylamine, hydrobromide and 4-(2-diethylaminoethyl)-piperidine according to the method outlined under Example 3 herein for the preparation of 1-1-diisopropyl-4-methyl-7-(1-naphthyl)-diethylenetriamine. The other substituted 1-naphthylamine intermediates employed herein can be prepared from the appropriate 1-naphthylamine or 1-naphthol compound according to the procedures described under Examples 1 through 15.

Example 24

3-aminopyridine (4.7 g., 0.05 mole) is diazotized and coupled into 13.4 g. (0.05 mole) of 1-[3-(1-naphthylamino)-propyl]-piperidine according to the procedure outlined under Example 3 herein for the preparation of 5-{4-{2-[(2-diisopropylaminoethyl)-methylamino] - ethylamino}-1-naphthylazo}-indazole. Crystallization of the crude dye from 2-propanol gives the desired 1-{3-[4-(3-pyridylazo) - 1 - naphthylamino]-propyl} - piperidine, of formula,

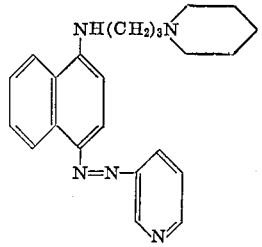

as maroon crystals, M.P. 130–123° C.

Utilizing the preparative methods described under Examples 1 through 15 herein, the following related compounds can be prepared, starting from the appropriate substituted 1-naphthylamine and aminopyridine:

5-[4-(2-diethylaminoethylamino)-1-naphthylazo]-2-methoxypyridine.
2-chloro-5-[4-(2-diethylaminoethylamino)-1-naphthylazo]-pyridine.
decahydro-1-{2-[4-(3-pyridylazo)-1-naphthylamino]-ethyl}-quinoline.
4-{5-[4-(2-morpholinoethylamino)-1-naphthylazo]-2-pyridyl}-morpholine.
3-{4-{2-{{2-[2-dimethylaminoethyl)-methylamino]-ethyl}-methylamino}-ethylamino]-1-naphthylazo}-pyridine.
1-methyl-2-{2-[4-(3-pyridylazo)-1-naphthylamino]-ethyl}-piperidine.
3-{4-[5-(diethylaminomethyl)-tetrahydrofurfurylamino]-1-naphthylazo}-pyridine.
3-[5-chloro-4-(2-diethylaminoethylamino)-1-naphthylazo]-pyridine.
3-[4-(2-diethylaminoethylamino)-6-ethoxy-1-naphthylazo]-pyridine.
1-{2-[4-(3-pyridylazo)-1-naphthylamino]-ethyl}-1-azaspiro[4.5]decane.
3-[4-(2-dimethylaminoethylamino)-1-naphthylazo]-pyridine, trihydrochloride.
2-{{2-[4-(2-methyl-5-pyridylazo)-1-naphthylamino]-ethyl}-pentylamino}-ethanol, trihydrochloride.

1-[3-(1-naphthylamine)-propyl]-piperidine, employed as a starting material in the above procedure, is prepared as follows: N-(3-hydroxypropyl)-1-naphthylamine is allowed to react with hydrobromic acid according to the method outlined under Example 3 herein for the preparation of N-(2-bromoethyl)-1-naphthylamine, hydrobromide. The intermediate N-(3-bromopropyl)-1-naphthylamine, hydrobromide, thus obtained melts at 152–154° C. This compound is subsequently allowed to react with piperidine according to the procedure described under Example 3 herein for the preparation of 1,1-diisopropyl-4-methyl-7-(1-naphthyl)-diethylenetriamine to give the desired intermediate, 1-[3-(1-naphthylamino)-propyl]-piperidine, as off white crystals, M.P. 70–72° C.

The other intermediate 1-(dialkylaminoalkylamino)-naphthalenes employed herein can be prepared from the appropriate 1-naphthylamine or 1-naphthol according to the procedures described under Examples 1 through 15.

Example 25

5-aminobenzotriazole (13.4 g., 0.1 mole) is diazotized and coupled into 22.8 g. (0.1 mole) of $N^1,N^1$-dimethyl-$N^2$-1-naphthyl-1,2-propanediamine according to the procedure outlined under Example 3 herein for the preparation of 5 - {4 - {2 - [(2-diisopropylaminoethyl)-methylamino}-1-naphthylazo}-indazole. Crystallization of the crude dye from ethanol gives the desired 6-[4-(2-dimethylamino - 1 - methylethylamino)-1-naphthylazo]-1H-benzotriazole, of formula,

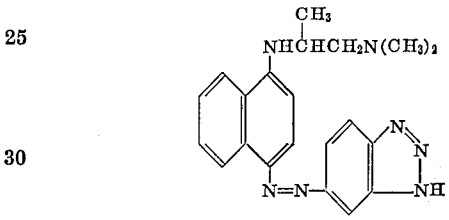

as orange-red crystals, M.P. 197–199° C.

Utilizing the preparative methods described under Examples 1 through 15 herein, the following related compounds can be prepared, starting from the appropriate substituted 1-naphthylamine and aminotriazole, aminobenzotriazole, or aminotetrazole precursors:

6[4-(2-diethylaminoethylamino)-1-naphthylazo]-1H-benzotriazole
6-amino-7-[4-(2-diethylaminoethylamino)-1-naphthylazo]-1H-benzotriazole
5-{4-{2-]4-(2-morpholinoethyl)-piperidino]-ethylamino}-1-naphthylazo}-1H-benzotriazole
4-[4-(3-dimethylaminopropylamino)-6-phenyl-1-naphthylazo]-1-methyl-1H-benzotriazole
4-amino-7-{4-[2-diethylamino-1-(methoxymethyl)-ethylamino]-1-naphthylazo}1H-benzotriazole
1-{2-[4-(s-triazol-3-ylazo)-1-naphthylamino]-ethyl}-4-piperidinol
4-[4-(3-dimethylaminopropylamino)-5-sulfo-1-naphthylazo]-1H-benzotriazole-1-acetic acid
5-{4-[2,2-dimethyl-3-(1-pyrrolidinyl)-propylamino]-1-naphthylazo}-s-triazole-3-carboxylic acid.
5-[4-(2-diethylaminoethylamino)-1-naphthylazo]-1H-tetrazole
6-{4-{3-[bis(3-diethylaminopropyl)-amino]-propylamino}-1-naphthylazo}-1H-benzotriazole
3-[4-(2-diethylaminoethylamino)-1-naphthylazo]-s-triazole
5-[6-chloro-4-(2-diethylaminoethylamino)-1-naphthylazo]-1-methyl-1H-tetrazole
5-amino-4-[4-(2-diethylaminoethylamino)-1-naphthylazo]-6-methyl-2-phenyl-2H-benzotriazole
3-[6-chloro-4-(2-diethylaminoethylamino)-1-naphthylazo]-5-imino-1-phenyl-$\Delta^2$-1,2,4-triazoline
6-{4-[5-(isopropylmethylamino)-pentylamino]-1-naphthylazo}-5-hydroxy-1H-benzotriazole-4-carboxylic acid
1-{{2-[4-(1H-benzotriazol-5-ylazo)-1-naphthylamino]-ethyl}-ethylamino}-2-methyl-2-propanol $N^1,N^1$ - dimethyl - $N^2$ - 1-naphthyl-1,2-propanediamine, B.P. 118–120° C./0.2 mm., employed as a starting material in the above procedure, is prepared from 1-naphthylamine and 2-dimethylamino-1-methylethylchloride hydrochloride in accordance with the method set forth under Example 1 herein for the preparation of 1-(2-diethylaminoethylamino)-naphthalene.

The other intermediate 1-(dialkylaminoalkylamino)-naphthalenes employed herein can be prepared from the appropriate 1-naphthol or 1-naphthylamine precursors according to the procedures described under Examples 1 through 15.

*Example 26*

2,4-dimethoxy-5-aminopyrimidine (15.5 g., 0.09 mole) is diazotized and coupled into 24.3 g. (0.09 mole) of N,N-diisopropyl-N'-1-naphthylethylenediamine according to procedure described under Example 1 herein. The red crystalline dye that separates in the desired 5-[4-(2-diisopropylaminoethylamino) - 1-naphthylazo]-2,4-dimethoxypyrimidine, of formula,

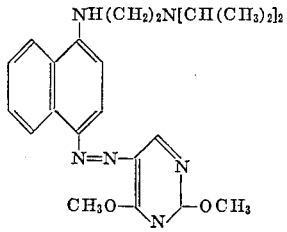

Crystallization of the crude dye from acetone gives red needles, M.P. 157–158° C.

In like manner, the following related compounds can be prepared, starting from equivalent quantities of the appropriate aminopyrimidine and 1-(dialkylaminoalkylamino)-naphthalene compounds:

5-[4-(2-diethylaminoethylamino)-1-naphthylazo]-2,4-dimethoxypyrimidine, salt with (5,6,7,8-tetrahydro-1-methyl-2-naphthyloxy) acetic acid 2,4-diethoxy-5-{4-{2-{4-[2-(4-methyl-1-piperazinyl)-ethyl]-piperidino}-ethylamino}-1-naphthylazo}-pyrimidine 1-[4-(2,4-diphenoxy-5-pyrimidinylazo)-1-naphthylamino]-3-dipropylamino-2-propanol, pyromellitate 5-{4-[2-(isopropylmethylamino)-ethylamino]-1-naphthylazo}-2,4-dimethylpyrimidine, salt with 1,5-naphthalenedisulfonic acid 5-[6-bromo-4-(2-diethylaminoethylamino)-1-naphthylazo]-2-methylpyrimidine 5-{4-{2-[(2-diisopropylaminoethyl)-methylamino]-ethylamino}-1-naphthylazo}-2,4-dimethoxypyrimidine, hydrochloride 1-{2-[4-(2,4-dimethoxy-5-pyrimidinylazo)-1-naphthylamino]-ethyl}-3-piperidinol 5-{4-[2-(cyclopentylmethylamino)-ethylamino]-1-naphthylazo}-4,6-dimethoxy-2-methylpyrimidine 5-{4-[5-(dimethylaminomethyl)-tetrahydrofurfurylamino]-1-naphthylazo}-4-methoxy-2-methylpyrimidine, terephthalate 5-[4-(4-diethylamino-1-methylbutylamino)-1-naphthylazo]-2,4-dimethoxypyrimidine, sulfate 4-chloro-5-{4-[2-diethylamino-1-(diethylaminoethyl)-ethylamino]-1-naphthylazo}-6-methoxy-2-methylpyrimidine 2,4-dimethoxy-5-{4-[2-(tetrahydro-1-azepinyl)-ethylamino]-1-naphthylazo}-pyrimidine The starting material, N,N-diisopropyl-N'-1-naphthylethylene diamine, is obtained as a yellow oil, B.P. 178–179° C./0.9 mm., $n_D^{25}$ 1.57.82, by the condensation of 1-naphthylamine and 2-diisopropylaminoethylchloride, hydrochloride according to the procedure outlined under Example 1 herein for the preparation of 1-(2-diethylaminoethylamino)-naphthalene.

The other intermediate 1-(dialkylaminoalkylamino)-naphthalenes employed herein can be prepared according to the procedures described under Examples 1 through 15.

*Example 27*

N - (2 - diethylaminoethyl) - N - (4 - amino - 1 - naphthyl)-trifluoroacetamide, monohydrochloride (19.5 g., 0.05 mole) is diazotized at 0° C. according to the procedure described under Example 14 herein. Subsequently, a solution of 8.7 g., 0.05 mole) of 3-methyl-1-phenyl-5-pyrazolone in 200 ml. of water, 8.4 ml. of 6 N sodium hydroxide, and 4.2 g. of sodium bicarbonate is slowly added at 0–5° C. to the diazonium salt solution, 4.2 g. of sodium bicarbonate is added, and the mixture stirred at room temperature for 18 hours. The orange precipitate is collected by filtration, washed with water, dried, and crystallized from acetone. The intermediate N - (2 - diethylaminoethyl) - 2,2,2 - trifluoro - N - [4-(3-methyl - 5 - oxo - 1 - phenyl - 2 - pyrazolin - 4 - ylazo)-1 - naphthyl] - acetamide thus obtained, of formula,

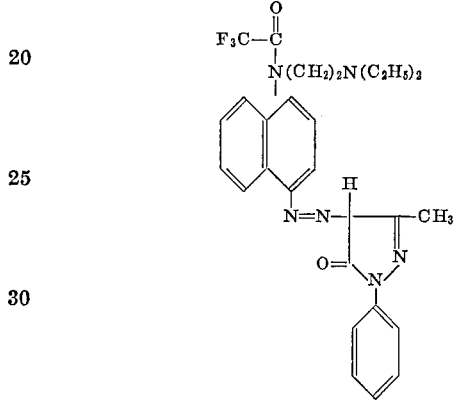

melts at 154–155° C.

A portion of the above amide (10 g.) is dissolved in 800 ml. of acetone. Water (10 ml.) and 30 ml. (0.06 mole) of 2 N sodium hydroxide solution are added, and the resulting mixture is stirred for 20 hours at room temperature. The mixture is filtered, and the filtrate evaporated to dryness in vacuo. The residue is extracted with ether and the combined ether extracts are washed successively with dilute ammonium hydroxide and saturated sodium chloride solution and dried over anhydrous magnesium sulfate. The ether solution is evaporated until crystallization begins, and the product is collected by filtration. Crystallization from 2-propanol gives the desired 4 - [4 - (2 - diethylaminoethylamino) - 1 - naphthylazo] 3 - methyl - 1 - phenyl - 2 - pyrazolin - 5 - one, of formula,

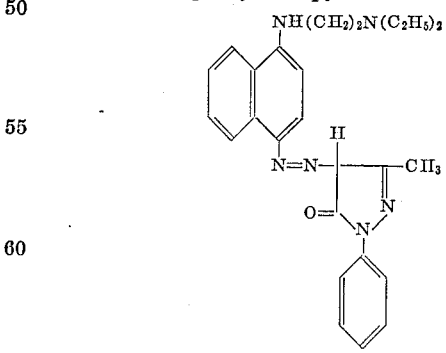

as brown iridescent needles, M.P. 154–155° C.

By similar procedures, the following related compounds can be prepared, starting from the appropriate N - (dialkylaminoalkyl) - N - (4 - amino - 1 - naphthyl)-trifluoroacetamide and pyrazole compound via the N - [4-(pyrazolylazo) - 1 - naphthyl] - N - (dialkyllaminoalkylamino) - α,α,α - trifluoroacetamide precursors:

1-{3-[4-(3,5-diamino-1-phenyl-4-pyrazolylazo)-1-naphthylamino]-propyl}-piperidine.

3,5-diamino-4-{4-[2-(isopropylmethylamino)-ethylamino]-7-chloro-1-naphthylazo}-pyrazole.

3,5-diamino-4-[4-(2-diethylaminoethylamino)-1-naphthylazo]-1-methylpyrazole.

3,5-diamino-4-[4-(3-diethylamino-2,2-dimethylpropylamino)-1-naphthylazo]-1-phenylpyrazole.

3,5-diamino-4-[4-(2-diethylaminoethylamino)-6-methoxy-1-naphthylazo]-1-methylpyrazole.

3,5-diamino-4-{4-{2-[bis(2-ethoxyethyl)-amino]-ethylamino}-1-naphthylazo}-pyrazole.

3,5-diamino-4-[4-(2-diethylaminoethylamino)-1-naphthylazo]-1-phenylpyrazole.

1-{3-[4-(3,5-diamino-4-pyrazolylazo)-1-naphthylamino]-propyl}-piperidine.

1-anilino-4-[4-(2-diethylaminoethylamino)-1-naphthylazo]-5-oxo-2-pyrazoline-3-carboxylic acid.

4-[4-(5-diethylaminopentylamino)-1-naphthylazo]-1,3-diphenyl-5-pyrazol.

p-{4-[4-(2-diethylaminoethylamino)-1-naphthylazo]-5-hydroxy-3-methyl-1-pyrazolyl}benzenesulfonamide.

4-{4-{3-[4-(2-dimethylaminoethyl)-piperidino]-propylamino}-1-naphthylazo}-5-oxo-1-phenyl-2-pyrazoline-3-carboxylic acid.

The intermediate N-[4-pyrazolylazo-1-naphthyl)-N-(dialkylaminoalkyl) - α,α,α - trifluoroacetamides are prepared from the appropriate pyrazole compound and N-dialkylaminoalkyl - N - (4 - amino - 1 - naphthyl) - α,α,α-trifluoroacetamide in accordance with the methods described under Examples 2, 9, 14, and 29 herein.

Example 28

7-aminobenzo[f]quinoline (7.8 g., 0.04 mole) is diazotized and coupled into 9.1 g. (0.04 mole) of N-ethyl-N-methyl-N'-1-naphthylethylenediamine according to the procedure described under Example 3 herein. Crystallization of the red dye thus obtained from boiling 2-propanol gives the desired 7-{4-[2 - (ethylmethylamino) - ethylamino]-1-naphthylazo}-benzo[f]quinoline, of formula,

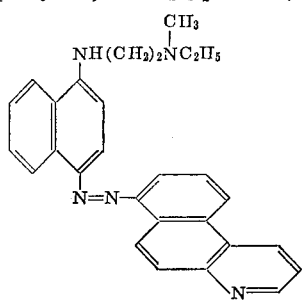

as maroon crystals, M.P. 182–184° C.

Utlizing procedures similar to those described under Examples 1 through 15 herein, the following related compounds can be prepared, starting from an appropriately substituted 1-naphthylamine and hydroxy or amino benzoquinoline or phenanthridine compound.

4-{2-{1-{2-[4-(7-benzo[f]quinolinylazo) - 1 - naphthylamino]-ethyl}-4-piperidinyl}-ethyl}-1-piperazineethanol 10-{4-[2-(ethylpropylamino)-ethylamino]-6-methoxy - 1-naphthylazo}-6-methylphenanthridine 8-[4-(2-diethylaminoethylamino)-1-naphthylazo] - benzo[f]quinoline 5-{4-{3-[(3-diethylaminopropyl) - ethylamino] - propylamino}-1-naphthylazo}-benzo[f]quinoline 6-[4-(4-diethylaminocyclohexylamino)-1 - naphthylazo]-4-methylbenzo[h]quinolin-2(1H)-one 3-[4-(2-diethylaminoethylamino) - 1 - naphthylazo] - 2-methylbenzo[h]quinolin-4-ol 2-(2-diethylaminoethylamino)-1-{4-[3 - (isopropylmethylamino)-propylamino]-7-methyl - 1 - naphthylazo} - 6-methylphenanthridine 5-(2-diethylaminoethylamino)-6 - (4 - diethylaminoethylamino-1-naphthylazo)-benzo[f]quinoline The starting material, N-ethyl-N-methyl-N'-1-naphthylethylenediamine, is a viscous yellow oil, B.P. 146–147° C./0.4 mm., $n_D^{25}$ 1.5990. This intermediate can be prepared from 1 - naphthylamine and 2 - (methylethylamino)-ethylchloride, hydrochloride according to the procedure described under Example 1 herein for the preparation of 1-(2 - diethylaminoethylamino)-naphthaline. The other substituted 1-naphthylamines employed herein are prepared according to procedures similar to those described under Examples 1 through 15.

Example 29

A solution of 11.7 g. (0.03 mole) of N-(2-diethylaminoethyl)-N-(4-amino-1-naphthyl)-trifluoroacetamide, monohydrochloride, is diazotized according to the procedure described in Example 2 herein and coupled into a solution of 7.0 g. (0.03 mole) of N-(2-diethylaminoethyl)-1,2,3,4-tetrahydroquinoline in 15 ml. of concentrated hydrochloric acid, 100 ml. of water and 150 g. of ice. After stirring for 2 hours at 0–5° C., 19.5 ml. of concentrated ammonium hydroxide and 100 ml. of water are added and the precipitate that separates is extracted with ether. The combined ether extracts are washed with water and then with saturated sodium chloride solution and dried over anhydrous magnesium sulfate. The ether is removed in vacuo, and the intermediate trifluoroacetamide is dissolved in 300 ml. of ethanol and is stirred with 30 ml. (0.060 mole) of 2 N sodium hydroxide in methanol and 30 ml. of water under nitrogen at room temperature for 24 hours. The mixture is treated with excess Dry Ice and 500 ml. of water and concentrated in vacuo to 500 ml. The red supernatant is decanted from the sticky red dye which separates and the dye is treated with 250 ml. of 2-propanol and 12 ml. (0.024 mole) of a 2 N 2-propanol-hydrogen chloride mixture. One liter of anhydrous ether is then added slowly with stirring, depositing a red dye which crystallizes after 4 hours. Recrystallization from a methanol-ethyl acetate mixture gives the desired 1-(2-diethylaminoethyl)-6-[4-(2 - diethylaminoethylamino)-1-naphthylazo]-1,2,3,4-tetrahydroquinoline, dihydrochloride, of formula,

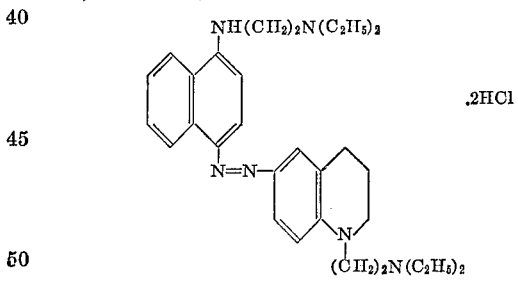

M.P. 195–198–5° C.

In like manner, the following related compounds can be prepared, starting from the appropriate 1-(dialkylaminoalkyl)-N-(4 - amino-1-naphthyl) - trifluoroacetamide and 1,2,3,4 - tetrahydroquinoline, indoline, 1,2,3,4 - tetrahydro-1,3-quinazoline, 3,4-dihydro-2H-1,4-benzoxazine, 2,3-dihydro-1H-naphth[2,1]-p-oxazine, 1,2,3,4 - tetrahydroquinoxaline, or 1,2,3,4-tetrahydrobenzo[h]quinoline via the N-[4 - (heterocyclicazo-1-naphthyl]-N-(dialkylaminoalkylamino)-α,α,α-trifluoroacetamides:

6-[4-(2-diethylaminoethylamino)-1-naphthylazo]-2,3 - dihydro-1H-naphth[2,1]-p-oxazine, hydrochloride 6-[4-(2-diethylaminoethylamino)-1-naphthylazo] - 1,2,3,4-tetrahydroquinoline, hydrochloride 5-[4-(2-diethylaminoethylamino)-1-naphthylazo] - indoline, hydrochloride 7-[4-(2-diethylaminoethylamino)-1-naphthylazo]-3,4 - dihydro-2H-1,4-benzoxazine, hydrochloride 6-[4-(3-piperidinopropylamino)-1-naphthylazo]-3,4 - dihydro-1(2H)-quinolineethanol, hydrochloride 5-{4-[2-(isopropylmethylamino)-ethylamino] - 1 - naphthylazo}-1-methylindoline, hydrochloride 1-(2-ethoxyethyl)-1,2,3,4-tetrahydro-6-[4-(2 - piperidinoethylamino)-1-naphthylazo]-quinoline, hydrochloride 6-[4-(2-diethylaminoethylamino)-1-naphthylazo] - 1,2,3,4-tetrahydro-1,3-quinazolinediethanol, hydrochloride 5-[4-(2-diethylaminoethylamino)-7-methoxy - 1 - naphthylazo]-2-methylindoline, hydrochloride 5-chloro-1-(2-diethylaminoethyl)-8-[4 - (2-diethylaminoethylamino)-1-naphthylazo] - 1,2,3,4 - tetrahydro - 6-methylquinoline, hydrochloride 3-{6-[4-(2-diethylaminoethylamino)-1 - naphthylazo]-1,2,3,4-tetrahydro-2,7-dimethyl-1-quinolyl}-1,2 - propanediol, hydrochloride 5-[6-chloro-4-(3 - diethylamino - 2,2 - dimethylpropylamino)-1-naphthylazo]-1-(2 - diethylaminoethyl) - indoline, hydrochloride 6-[4-(2-diethylaminoethylamino)-1-naphthylazo] - 1,2,3,4-tetrahydroquinoxaline, hydrochloride 6-[4-(2-diethylaminoethylamino)-1-naphthylazo] - 1,2,3,4-tetrahydrobenzo[h]quinoline, hydrochloride 6-{4-[2-(hexahydro - 1 - azepinylethylamino] - 1 - naphthylazo}-1,2,3,4-tetrahydrolepidine, hydrochloride 6-[4-(2-diethylaminoethylamino)-1-naphthylazo] - 1,2,3,4-tetrahydro-1,4,-dimethylquinoxaline, hydrochloride The other N-[4-(heterocyclicazo)-1-naphthyl]-N-(dialkyaminoalkylamino)-α,α,α-trifluoroacetamides are prepared in a similar manner from the appropriate aminoheterocyclic compounds and N-dialkylaminoalkyl-N-(4-amino-1-naphthyl)-α,α,α-trifluoroacetamides.

Example 30

3-amino-10-ethylphenothiazine, 5,5-dioxide (0.85 g., 0.0031 mole) is diazotized and coupled into 0.84 g. (0.0031 mole of N,N,N',N'-tetramethyl-2-(1-naphthylamino)-1,3-propanediamine according to the procedure outlined under Example 6 herein for the preparation of 1-diethylamino - 3 - [4 - (3 - pyridylazo) - 1 - naphthylamino]-2-propanol, trihydrochloride. Purification of the crude dye from a mixture of acetone, ether, and ethanolic hydrogen chloride gives the desired 3-{4-[2-dimethylamino - 1 - (dimethylaminomethyl) - ethylamino] - 1-naphthylazo}-10-ethylphenothiazine, 5,5-dioxide, trihydrochloride, of formula,

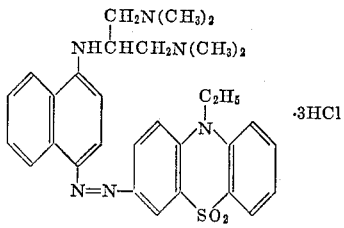

as a purple-brown hydrated solid, M.P. 195–197° C.

Utilizing the preparative methods outlined under Examples 1 through 15 herein, the following related compounds can be prepared, starting from the appropriate substituted 1-naphthylamine and hydroxy or aminoheterocyclic compound:

2-[4-(2-diethylaminoethylamino)-1-naphthylazo]-dibenzo[b,f] [1,4,5]-thiadiazepine, 11,11-dioxide.

3-hydroxy-2-{4-[2-(isopropylmethylamino)-ethylamino]-1-naphthylazo}-phenazoxonium hydroxide, inner salt.

7-{4-[3-diethylamino-1-(2-diethylaminoethyl)-propylamino]-1-naphthylazo}-5H-[1]benzothiapyrano[2,3-c]pyridin-5-one.

8-{4-{2-[2-(1-pyrrolidinyl)-ethyl]-piperidino}-ethylamino}-1-naphthylazo}-4,9-thiophanthrenedione.

8-(2-diethylaminoethylamino)-5-(10-oxo-10H-[1]benzothiapyrano[3,2-b]-pyridin-8-ylazo)-1-naphthoic acid.

3-{4-[2-diethylaminoethyl)-cyclopentylaminol]-1-naphthylazo}-7-dimethylamino-phenazathionium chloride.

3-imino-7-{4-{2-[4-(1-methyl-4-piperidyl)-piperidino]-ethylamino}-1-naphthylazo}-3H-isophenoxazine.

8-[4-(2-diethylaminoethylamino)-5-ethoxy-1-naphthylazo]-10H-[1]-benzothiapyrano[3,2-b]pyridine.

8-[4-(4-diethylamino-1,2-dimethylbutylamino)-1-naphthylazo]-10H-[1]-benzothiapyrano[3,2-c]pyridin-10-one.

6-{4-[3-(3-diethylaminopropylthio)-propylamino]-1-naphthylazo}-4,9-thiophanthrenedione.

7-[4-(2-diethylaminoethylamino)-1-naphthylazo]-2,3-dihydro-2,6-dimethyl-1H-pyrrolo[3,4-c]pyridine.

3-diethylamino-7-{4-[3-(3-diethylaminopropoxy)-propylamino]-1-naphthylazo}-2-methylphenazoxonium chloride.

9-[4-(2-diethylaminoethylamino)-1-naphthylazo]-pyrido[1,2-a]benzimidazol-8-ol.

N,N,N',N'-tetramethyl-2-(1-naphthylamino)-1,3 - propanediamine, B.P. 137–138° C./0.3 mm., $n_D^{25}$ 1.5836, employed as a starting material in the above preparation, is prepared from 1-naphthol and 1,3,-bis(dimethylamino)-2-propylamine according to the procedure outline under Example 8 herein for the preparation of 1-(3-dimethylaminopropylamino)-napthalene. The other intermediate 1-naphthylamines employed herein can be prepared from the appropriate 1-naphthol or 1-naphthylamine precursors according to the procedure described under Examples 1 through 15.

Example 31

5-amino-2-butoxypyridine (16.6 g., 0.1 mole) is diazotized and coupled into 24.2 g. (0.1 mole) of 1-(2-diethylaminoethylamino)-naphthalene according to the procedure described under Example 3 herein for preparation of 5 - {4 - {2 - [(2 - diisopropylaminoethyl)-methylamino]-ethylamino}-1 - naphthylazo} - inadzole. Crystallization of the crude dye from ethanol gives the desired 2-butoxy - 5 - [4 - (2 - diethylaminoethylamino) - 1 - naphthylazo]-pyridine, of formula,

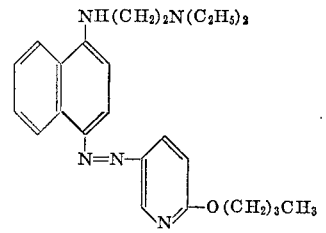

as orange-red crystals, M.P. 92–94° C.

Utilizing the preparative methods described under Examples 1 through 15 herein, the following related compounds can be prepared, starting from the appropriate substituted 1-naphthylamine and aminopyridine or hydroxypyridine compound:

3-{4-[2-(1-propyl-2-pyrrolidinyl)-ethylamino]-1-naphthylazo}-pyridine.

2-benzyloxy-5-[4-(2-diisopentylaminoethylamino)-1-naphthylazo]-pyridine.

5-[6-chloro-4-(2-diethylaminoethylamino)-1-naphthylazo]-2-propoxypyridine.

3-{4-[2-(2,5-dimethyl-1-pyrrolidinyl)-ethylamino]-1-naphthylazo}-pyridine.

3-{4-[2-(2-diethylaminoethylthio)-ethylamino]-1-naphthylazo}-pyridine.

8-(2-diethylaminoethylamino-5-(3-pyridylazo)-2-naphthalenesulfonic acid.

1-methyl-4-{2-[4-(3-pyridylazo)-1-naphthylamino]-ethyl}-piperazine.

5-[4-(8-diethylaminooctylamino)-1-naphthylazo]-2-diimethylaminopyridine.

3-[4-(2-dihexylaminoethylamino)-1-naphthylazo]-pyridine.

8-(6-ametamido-3-pyridylazo)-5-(2-diethylaminoethylamino)-2-naphthoic acid.

3-{4-[1-(diethylaminomethyl)-cyclohexylmethylamino]-1-naphthylazo}-pyridine.

5-(2-diethylaminoethylamino)-8-(6-methoxy-3-pyridylazo)-2-naphthol.

The other intermediate 1-(dialkylaminoalkylamino)-naphthalenes employed herein can be prepared from the appropriate 1-naphthol or 1-naphthylamine precursors according to the procedures described under Examples 1 through 15.

Example 32

8-aminoquinoline (5.8 g., 0.04 mole) is diazotized and coupled into 10.8 g. (0.04 mole) of 1-[2-(1-naphthylamino)-ethyl]-4-piperidino according to the procedure described under Example 3 herein for the preparation of 5 - {4 - {2 - [(2 - diisopropylaminoethyl) - methylamino]-ethylamino}-1-naphthylazo}-indazole. Crystallization of the crude dye from acetonitrile gives the desired 1-{2-[4-(8 - quinolylazo) - 1 - naphthylamino] - ethyl} - 4 - piperidinol, of formula,

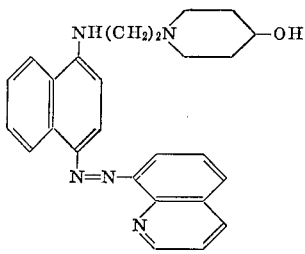

as red crystals, M.P. 168.5° C. (dec.).

Utilizing the preparative methods described under Examples 1 through 15 herein, the following related compounds can be prepared, starting from the appropriate aminoquinoline and substituted 1-naphthylamine precursors:

8-(2-diethylaminoethylamino)-5-[4-(2-diethylaminoethylamino)-1-naphthylazo]-quinoline.
3-{4-{2-[2-(2-diethylaminoethyl)-piperidino]-ethylamino}-1-naphthylazo}-quinoline.
3-{4-[2-(4-methyl-1-piperazinyl)-ethylamino]-1-naphthylazo}-quinoline.
7-{6-bromo-4-[3-(1-pyrrolidinyl)-propylamino]-1-naphthylazo}-quinoline.
7-{4-{2-[4-(2-diethylaminoethyl)-1-piperazinyl]-ethylamino}-1-naphthylazo}-8-hydroxy-5-quinolinesulfonic acid.
5-[4-(2-diisopropylaminoethylamino)-5-methyl-1-naphthylazo]-6-methylquinoline.
8-amino-5-[4-(2-diethylaminoethylamino)-1-naphthylazo]-quinoline.
3-{4-{3-[(tetrahydrofurfuryl)-methylamino]-propylamino}-1-naphthylazo}-quinoline.
3-[4-(6-piperidinohexylamino)-1-naphthylazo]-quinoline.
8-[2-(isopropylmethylamino)-ethylamino]-5-(3-quinolylazo)-2-naphthol.
5-amino-6-[4-(2-diethylaminoethylamino)-1-naphthylazo]-quinoline.
6-[4-(2,3-dipiperidinopropylamino)-1-naphthylazo]-quinoline.

1-[2-(1-naphthylamino)-ethyl]-4-piperidinol, M.P. 104–106° C., employed as a starting material in the above procedure, is prepared from N-(2-bromoethyl)-1-naphthylamine, hydrobromide and 4-piperidinol according to the method described under Example 3 herein for the preparation of 1,1-diisopropyl-4-methyl-7-(1-naphthyl)-diethylenetriamine. The other intermediate 1-(dialkylaminoalkylamino)-naphthalenes employed herein can be prepared from the apppropriate naphthalene compound according to the procedure described under Examples 1 through 15.

Example 33

A solution of 5.03 g. (0.034 mole) of 2-aminobenzothiazole in 10 ml. of formic acid is added slowly at approximately 10° C. to a mixture of 40 ml. of sulfuric acid and 35 ml. of water. This mixture is cooled to —5° C. and to it is added a solution of 2.31 g. (0.034 mole) of sodium nitrite in 20 ml. of water while maintaining the temperature at —10° to 0° C. After the addition is complete, stirring is continued for one-half hour at —10 to —5° C. Subsequently, this diazonium salt mixture is added slowly with stirring to a solution of 8.97 g. (0.034 mole) of 1-[2-(1-naphthylamino)-ethyl]-hexahydroazepine in 200 ml. of enthanol. Stirring is continued at —10 to 0° C. for 3 hours, the reaction mixture is diluted to a volume of 2 l. with water, and sufficient sodium hydroxide solution is added to make the mixture strongly alkaline. The mixture is extracted with several portions of chloroform and the combined chloroform extracts are dried and concentrated on the steam bath. The viscous residue is washed successively with several portions of petroleum ether (B.P. 30–60° C.) and hot water and is crystallized from an acetonitrile-water mixture. The blue-green crystals thus obtained, M.P. 150–153° C., are the desired 2{4-[2-(hexahydro-1-azepinyl)- ethylamino]-1-naphthylazo}-benzothiazole, of formula,

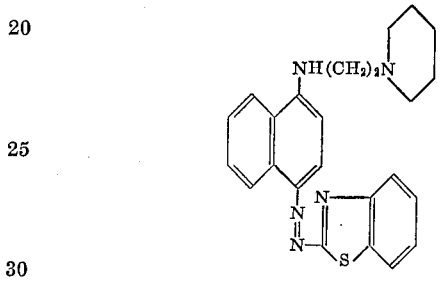

Utilizing the preparative methods outlined under Examples 1 through 15 herein, the following related compounds can be prepared, starting from the appropriate substituted 1-naphthylamine and aminobenzothiazole, aminobenzoxazole, aminonaphthothiazole, or aminonaphthooxazole:

2-[4-(2-diethylaminoethylamino)-1-naphthylazo]-benzothiazole.
2-{4-[2-ethylmethylamino)-ethylamino]-1-naphthylazo}-naphtho[1,2]thiazole.
2-{2-[4-(6-ethoxy-2-benzothiazolylazo)-1-naphthylamino]-ethyl}-ethylamino-ethanol.
1-{2-[4-(6-chloro-2-benzothiazolylazo)-1-naphthylamino]-ethyl}-3-piperidinol.
2-{4-[2(2-diethylaminoethoxy)-ethylamino]-1-naphthylazo}-naphtho[1,2]oxazole.
2-[4-(2-diethylaminoethylamino)-7-methoxy-1-naphthylazo]-benzoxazole.
2-{4-{2-[bis(3-diethylaminoproply)-amino]-ethylamino}-1-naphthylazo}-6-ethylsulfonylbenzothiazole.
2-[4-(2-diethylaminopropylamino)-1-naphthylazo]-6-ethoxybenzoxazole.
2-[4-(2-diethylaminoethylamino)-1-naphthylazo]-N-methyl-6-benzothiazolesulfonamide.
2-{4-[2-(1-pyrrolidinyl)-ethylamino]-1-naphthylazo}-6-benzothiazolepropanol.
2-[4-(2-diethylaminoethylamino)-1-naphthylazo]-6,7,8,9-tetrahydro-naphtho[2,1]thiazole.
6-acetamido-2[4-(3-diethylamino-2-methylpropylamino)-1-naphthylazo]-benzothiazole.

1-[2-(1 - naphthylamino) - ethyl] - hexahydroazepine, B.P. 164–166° C./0.1 mm., $n_D^{25}$ 1.6062, employed as a starting material in the above preparation, is prepared from N-(2-chloroethyl)-hexahydroazepine, hydrochloride and 1-naphthylamine according to the procedure given under Example 1 herein for the preparation of 1-(2-diethylaminoethylamino)-naphthalene. The other intermediate 1-naphthylamines employed herein can be prepared from the appropriate 1-naphthol or 1-naphthylamine precursors according to the procedures described under Examples 1 through 15.

Example 34

3-amino-9-ethylcarbazole (21.0 g., 0.1 mole) is diazotized and coupled into 28.4 g. (0.1 mole) of N¹,N¹-diethyl-N⁴-1-naphthyl-1,4-pentanediamine according to the procedure described under Example 1 herein. The maroon dye thus obtained is the desired 3-[4-(4-diethylamino-1-methylbutylamino)-1-naphthylazo] - 9 - ethylcarbazole, of formula,

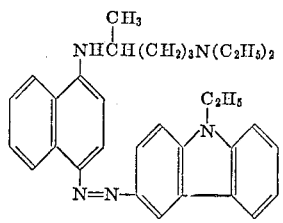

Utilizing the preparative methods outlined under Examples 1 through 15 herein, the following related compounds can be prepared, starting from the properly substituted 1-naphthylamine and appropriate carbazole, indole, oxindole, or pyrrole compound:

3-[4-(2-diethylaminoethylamino)-1-naphthylazo]-9-ethylcarbazole.
3-[4-(2-diethylaminoethylamino)-7-methoxy-1-naphthylazo]-9-ethylcarbazole.
6-[4-(2-diethylaminoethylamino)-1-naphthylazo]-1,2,3,4-tetrahydrocarbazole.
9-(2-diethylaminoethyl)-3-[4-(2-diethylaminoethylamino)-1-naphthylazo]-carbazole.
6-[4-(3-diethylamino-2,2-dimethylproplyamino)-1-naphthylazo]-oxindole.
6-[4-(3-piperidinopropylamino)-1-naphthylazo]-1,2,3,4-tetrahydrocarbazole.
2-[4-2-morpholinoethylamino)-1-naphthylazo]-carbazole.
2-[4-(2-diethylaminoethylamino)-1-naphthylazo]-pyrrole.
4-{4-[2-(isopropylmethylamino)-ethylamino]-1-naphthylazo}-3,5-dimethylpyrrole-2-carboxylic acid.
2-{ethyl{2-[4-(9-ethyl-3-carbazolylazo)-1-naphthylamino]-ethyl}-amino}-ethanol.
1-{2-[4-(2-pyrrolylazo)-1-naphthylamino]-ethyl}-pyrrolidine.
1-{2-4-(2-methyl-5-indolylazo)-1-naphthylamino]-ethyl}-4-methylpiperazine.
9-ethyl-3-{4-{2-[(2-diisopropylaminoethyl)-methylamino-ethylamino]-1-naphthylazo}-carbazole.
7-[4-(5-diethylaminopentylamino)-1-naphthylazo]-2-indolecarboxylic acid.
3-amino-6-[4-(2-diethylaminoethylamino)-1-naphthylazo]-carbazole.
7-[4-(2-hydroxy-3-piperidinopropylamino)-1-naphthylazo]-2-carbazolesulfonic acid.

N¹,N¹-diethyl-N⁴-1-naphthyl-1,4-pentanediamine, employed as a starting material in the above procedure, is prepared according to the following method: a mixture of 72 g. (0.5 mole) of 1-naphthylamine, 80 g. (0.51 mole) of 5-diethylamino-2-pentanone, 400 ml. of xylene and 1 g. of p-toluenesulfonic acid is boiled under reflux for 18 hours and the water which is formed is removed through a water separator. The reaction mixture is concentrated in vacuo on the steam bath and the residue is dissolved in 300 ml. of methanol and hydrogenated in a Parr hydrogenation apparatus in the presence of 2 g. of palladium on carbon catalyst at an initial hydrogen pressure of 54 p.s.i.g. Additional quantities of palladium and platinum oxide catalyst are added during the reduction as required. The hydrogenation is complete after 6 hours. The catalyst is collected by filtration and the solvent removed in vacuo. Distillation of the residue through a 7-inch Vigreux column in vacuo gives the desired N¹,N¹-diethyl-N⁴-1-naphthyl-1,4-pentanediamine as a yellow oil, B.P. 149–151° C./0.2 mm., $n_D^{25}$ 1.5730.

The other intermediate 1-naphthylamine compounds are prepared according to the procedures described under Examples 1 through 15 herein.

Example 35

8-aminoquinoline (14.4 g., 0.1 mole) is diazotized and coupled into 24.2 g. (0.1 mole) of 1-(2-diethylaminoethylamino)-naphthalene according to the procedure described under Example 6 herein for the preparation of 1 - diethylamino - 3 - [4 - (3 - pyridylazo) - 1 - naphthylamino]-2-propanol, trihydrochloride. Crystallization of the crude dye from 2-propanol containing a few drops of a hydrogen chloride-2-propanol mixture gives the desired 8 - [4 - (2 - diethylaminoethylamino) - 1 - naphthylazo]-quinoline, dihydrochloride, of formula

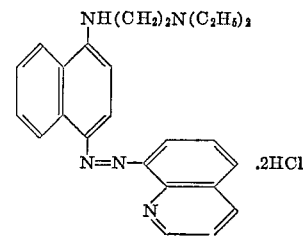

as a purple-green solid, M.P. 156–158° C., containing 3½ moles of water.

Utilizing the preparative methods described under Examples 1 through 15 herein, the following related compounds can be prepared, starting from the appropriate substituted 1-naphthylamine and aminoquinoline compound:

3-{4-{2-[3-(1-methyl-2-pyrrolidinyl)piperidino]-ethylamino}-1-naphthylazo}-quinoline.
3-[-5-chloro-4-(2-diethylaminoethylamino)-1-naphthylazo]-quinoline.
3-{4-[2-(4-methoxypiperidino)-ethylamino]-1-naphthylazo}-quinoline.
6-[4-(2-diisobutylaminoethylamino)-1-naphthlyazo]-2-(2-morpholinoethylamino)-lepidine.
3-{4-[2-(2,6-dimethylmorpholino)-ethylamino]-1-naphthylazo}-quinoline.
3-[4-(2-diethylaminoethylamino)-6-phenyl-1-naphthylazo]-quinoline.
3-{4-[2-[bis-(2-methylally)-amino]-ethylamino}-1-naphthylazo}-quinoline.
8-{4-[2-decahydro-1-quinolyl)-ethylamino]-1-naphthylazo}-6-methoxyquinoline.
6-amino-5-[4-(2-diethylaminoethylamino)-1-naphthylazo]-quinoline.
3-{7-ethoxy-4-[2-(3-methylpiperidino)-ethylamino]-1-naphthylazo}-quinoline.
2-{(2-ethoxyethyl)-{2-[4-(3-quinolylazo)-1-naphthylamino]-ethyl}-amino}-ethanol.
3-{4-[2-(hexahydro-2-methyl-1-pyridazinyl)-ethylamino]-1-naphthylazo}-quinoline.

The other intermediate 1-naphthylamines employed herein can be prepared from the appropriate 1-naphthol or 1-naphthylamine precursors according to the procedures described under Examples 1 through 15.

Example 36

5-aminouracil (2.54 g., 0.02 mole) is diazotized and coupled into 6.49 g. (0.02 mole) of N,N-diethyl-N'-1-naphthyl-1,1-cyclohexanebis (methylamine) according to the procedure given under Example 1 herein for the preparation of 5-[4-(2-diethylaminoethylamino)-1-naphthylazo]-uracil. Crystallization of the crude dye from ethanol containing a few drops of ammonium hydroxide gives the desired 5{-4-[1-(diethylaminomethyl)-cyclohexylmethylamino]-1-naphthylazo}uracil, of formula

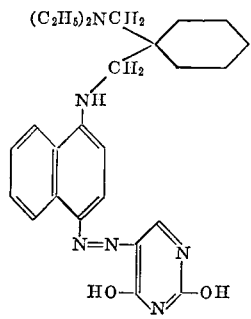

as red crystals, M.P. 219° C. (dec.).

Utilizing the preparative methods described under Examples 1 through 15 herein, the following related compounds can be prepared, starting from the appropriate amino or hydroxypyrimidine compound and substituted 1-naphthylamine precursors:

2,4,6-triamino-5-[4-(2-diethylaminoethylamino)-1-napththylazo]-pyrimidine.
4-amino-5-[4-(3-diethylamino-2,2-dimethylpropylamino)-1-naphthylazo]-2-pyrimidinol.
6-amino-5-[4-(2-diethylaminoethylamino)-1-naphthylazo]-uracil.
2-amino-5-[4-(8-diethylaminooctylamino)-1-naphthylazo]-4,6-pyrimidinediol.
2,6-diamino-5-[4-(2-diethylaminoethylamino)-1-naphthylazo]-4-pyrimidinethiol.
4,6-diamino-5-[4-(2-methyl-3-piperidinopropylamino)-1-naphthylazo]-2-pyrimidinol.
4,6-diamino-5-[4-(2-diethylaminoethylamino)-1-naphthylazo]-2-(methylthio)-pyrimidine.
5-[4-(2-diethylaminoethylamino)-1-naphthylazo]-cytidine.
4,6-diamino-5-[4-(2-diethylaminoethylamino)-1-naphthylazo]-2-pyrimidinethiol.
4-{2-amino-5-[4-(2-diethylaminoethylamino)-1-naphthylazo]-4-pyrimidinylamino}-α-piperidino-o-cresol.
5-[4-(2-diethylaminoethylamino)-1-naphthylazo]-6-imino-3-phenylhydrouracil.
2,4-dianilino-5-[4-(3-piperidinopropylamino)-1-naphthylazo]-pyrimidine.

N,N - diethyl - N' -1 - naphthyl - 1,1 - cyclohexanebis(methylamine), employed as a starting material in the above preparation, is synthesized as follows: tetrahydrobenzaldehyde (226 g., 2.05 moles), diethylamine hydrochloride (185 g., 1.69 moles), paraformaldehyde (78 g., 2.6 moles) and 125 ml. of ethanol are boiled under reflux for 2 hours. An additional 78 g. of paraformaldehyde are added and reflux is continued for 6 hours. The reaction mixture is poured into 2 l. of water and extracted with ether. The combined ether extracts are discarded and the water layer is made alkaline by the addition of sodium hydroxide. The oily layer which separates is extracted with ether and the combined ether extracts are dried over anhydrous potassium carbonate. The ether is removed on the steam bath and the residue is distilled in vacuo to give the intermediate diethylaminomethyltetrahydrobenzaldehyde, of formula

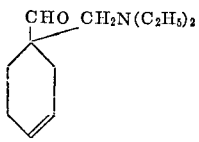

as a yellow oil, B.P. 59–60° C./10.1 mm. $n_D^{25}$ 1.4780. This intermediate is then condensed with 1-naphthylamine and hydrogenated according to the procedure outlined under Example 4 herein for the preparation of N,N-diethyl-2,2 - dimethyl-N'-1-naphthyl-1,3-propanediamine. The desired intermediate, N,N - diethyl - N' - 1 - naphthyl-1,1-cyclohexanebis(methylamine) is obtained as a viscous yellow oil, B.P. 161–162° C./0.07 mm.

The other intermediate 1-naphthylamines employed herein can be prepared from the appropriate 1-naphthol or 1-naphthylamine precursors according to the procedures described under Examples 1 through 15.

*Example 37*

2-methoxy - 5 - aminopyridine (3.72 g., 0.03 mole) is diazotized and coupled into 10.35 g. (0.03 mole) of decahydro - 1 - [2 - (1 - naphthylamino) - ethyl] - quinoline, monohydrochloride, according to the procedure outlined under Example 1 herein for the preparation of 5-[4-(2-diethylaminoethylamino)-1-naphthylazo] - uracil. Crystallization of the crude dye from 2-propanol gives the desired decahydro - 1 - {2 - [4 - (6 - methoxy - 3 - pyridylazo)-1-naphthylamino]-ethyl}-quinoline, of formula

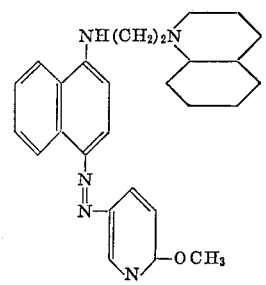

as yellow-orange crystals, M.P. 193.5–196° C. (dec.).

Utilizing the preparative methods described under Examples 1 through 15 herein, the following related compounds can be prepared, starting from the appropriate substituted 1-naphthylamine and aminopyridine precursors:

1 - methyl - 4 - {methyl{2 - [4 - (3 - pyridylazo)-1-naphthylamino]-ethyl}-amino}-piperidine.
5 - {4 - [2 - (isopropylmethylamino) - ethylamino] - 6-methyl-1-naphthylazo}-2-nitropyridine.
hexahydro - 1 - methyl - 2 - {2-[4-(3-pyridylazo) - 1-naphthylamino]-ethyl}-pyridazine.
octahydro - 2 - {2 - [4 - (3 - pyridylazo) - 1 - naphthylamino]-ethyl}cyclopenta[c]pyrrole.
2,2' - {2 - [4 - (3 - pyridylazo)-1 - naphthylamino]ethylimino}-diethanol.
3-[5 - bromo - 4 - (2 - diethylaminoethylamino) - 1-naphthylazo]-pyridine.
1 - methyl - 1' - {2 - [4 - (3 - pyridylazo) - 1 - naphthylamino]-ethyl} - 2,2' - bipiperidine.
4 - {[4 - (6 - ethoxy - 3 - pyridylazo) - 1 - naphthylamino]-methyl}-1-methylpiperidine.
5 - [4 - (2 - diethylaminoethylamino) - 1 - naphthylazo]-2-pyridinol.
3 - [4 - (2 - diethylaminoethylamino) - 1 - naphthylazo]-2,6-dihydroxyisonicotinic acid.
3 - [4 - (3 - piperidinopropylamino) - 1 - naphthylazo]-2,4,6-pyridinetriol.
3 - [4 - (2 - diethylaminoethylamino) - 1 - naphthlyazo]-2-oxonipecotic acid, ethyl ester.

Decahydro - 1 - [2 - (1 - naphthylamino) - ethyl]-quinoline, hydrochloride, employed as a starting material in the above preparation, is prepared from N-(2-bromoethyl)-1-naphthylamine, hydrobromide, and decahydroquinoline according to the following procedure: N-(2-bromoethyl)-1-naphthylamine, hydrobromide (173 g., 0.5 mole) is suspended in 500 ml. of concentrated ammonium hydroxide and the free base is extracted with several portions of xylene. The xylene extracts are dried over anhydrous sodium sulfate, the drying agent is removed by filtration, and the xylene solution is diluted to 750 ml. Decahydroquinoline (137.2 g., 1.0 mole) and 1.5 l. of xylene are added, and the mixture boiled under reflux for 12 hours. The reaction mixture is cooled, 1 l. of 50% aqueous sodium hydroxide is added, and the layers are separated.

The xylene layer is washed successively with 10% sodium hydroxide solution and water and is dried over anhydrous sodium sulfate. The xylene is removed on the steam bath and the residue is distilled in vacuo to remove the excess decahydroquinoline. The residue is dissolved in 200 ml. of 2-propanol and the solution is treated with decolorizing charcoal followed by an excess of a 2-propanol-hydrogen chloride mixture. The precipitate which forms is collected by filtration, washed with 2-propanol, and crystallized from a methanol-2-propanol mixture. The colorless crystals thus obtained, M.P. 252–254° C., are the desired intermediate, decahydro - 1 - [2 - (1 - naphthylamino)-ethyl]-quinoline, monohydrochloride.

The other intermediate 1-naphthylamines employed herein can be prepared from the appropriate 1-naphthol or 1-naphthylamine precursors according to the procedures described under Examples 1 through 15.

Example 38

1-thianthrenamine (0.89 g., 0.0038 mole) is diazotized and coupled into 1.03 g. (0.0038 mole) of 1-[2,2-dimethyl-3-(1-naphthylamino)-propyl]-piperidine according to the procedure outlined under Example 3 herein for the preparation of 5-{4-{2-[(2 - diisopropylaminoethyl)-methylamino] - ethylamino} - 1 - naphthylazo} - indazole. Crystallation of the crude dye from a dimethylacetamide-water mixture gives the desired 1-{2,2-dimethyl - 3 - [4 - (1-thianthrenylazo) - 1 - naphthylamino]-propyl}-piperidine, of formula

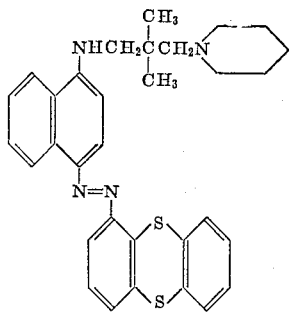

as deep maroon crystals, M.P. 80° C. (dec.).

Utilizing the preparative methods described under Examples 1 through 15 herein, the following related compounds can be prepared, starting from the appropriate substituted 1-naphthylamine and amino-4,5-benzodioxole, amino - 1,3 - benzodioxane, amino - 1,4 - benzodioxane, amino - 1,3 - benzoxathiole, aminophenoxathiin, or aminothianthrene:

N,N - diethyl - N' - [4 - (1 - thianthrenylazo)-1-naphthyl]-ethylenediamine.
1 - {6 - chloro - 4 - [2 - (isopropylmethylamino)-ethylamino]-1-naphthylazo}-3-phenoxathiincarboxylic acid.
N,N - diethyl - 2,2 - dimethyl - N' - [4 - (2 - phenoxathiinylazo) - 1 - naphthyl] - 1,3 - propanediamine.
N',N' - diethyl - N² - [4 - (2 - thianthrenylazo) - 1-naphthyl]-1,2-propanediamine.
1,1,4 - triethyl - 7 - [4 - (2 - phenoxathiinylazo) - 1-naphthyl]-diethylenetriamine, 10,10-dioxide.
N,N - diethyl - N' - [4 - (3,4 - methylenedioxyphenylazo) - 1 - naphthyl] - ethylenediamine.
N' - [4 - (1,4 - benzodioxane - 6 - ylazo) - naphthyl] - N,N-diethylethylenediamine.
8 - [4 - (2 - diethylaminoethylamino) - 1 - naphthylazo]-2-phenoxathiinol, 10,10-dioxide.
1 - diethylamino - 3 - [4 - (4,5 - methylenedioxy - o-tolyazo) - 1 - naphthylamino]-2-propanol.
N,N - diisopropyl - N' - [4 - (4 - phenoxathiinylazo) - 1-naphthyl]-ethylenediamine.
N' - [4 - (1,3 - benzodioxane - 6 - ylazo) - 1 - naphthyl]-N,-diethylethylenediamine.
4 - {2 - [4 - (7 - methoxy - 1,4 - benzodioxan - 6 - ylazo)-1 - naphthylamino] - ethyl} - 1 - piperazineethanol.
4 - [4 - (2 - diethylaminoethylamino) - 1 - naphthylazo]-1,3 - benzoxathiol - 5 - ol, 3,3, - dioxide.

1-[2,2-dimethyl - 3 - (1-naphthylamino)-propyl]-piperdine, M.P. 76–77° C., employed as a starting material in the above procedure, is prepared from β-piperidinopivaldehyde and 1-naphthylamine according to the procedure outlined under Example 4 herein for the preparation of N,N-diethyl - 2,2 - dimethyl-N'-1-naphthyl-1,3-propanediamine. The other substituted 1-naphthylamine intermediate employed herein can be prepared from the appropriate 1-naphthylamine or 1-naphthol compound according to the procedure described under Examples 1 through 15.

Example 39

4-aminoantipyrine (6.1 g., 0.03 mole) is diazotized and coupled into 12.3 g. (0.03 mole) of 4-[2-(1-naphthylamino)-ethyl] - 1-piperazineethanol, trihydrochloride, according to the procedure outlined under Example 3 herein for the preparation of 5-{4-{2-[(2-diisopropylaminoethyl) - methylamino] - ethylamino} - naphthylazo}-indazole. Crystallization of the crude dye from 2-propanol gives the desired 4-{4-{2-[4-(2-hydroxyethyl) - 1 - piperazinyl] - ethylamino} - 1 - naphthylazo} - 2,3 - dimethyl-1-phenyl-3-pyrazolin-5-one, of formula

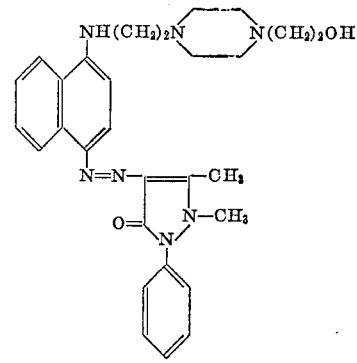

as fibrous yellow-orange crystals, M.P. 180.5–181.5° C.

Utilizing the preparative methods described under Examples 1 through 15 herein, the following related compounds can be prepared, starting from the appropriate substituted 1-naphthol or 1-naphthylamine and pyrazole compounds:

1-(2,5-dichlorophenyl)-3-methyl-4-[4-(1-methyl-4-piperidinylamino)-1-naphthylazo]-2-pyrazolin-5-one.
m-{4-[4-(2-diethylaminoethylamino)-1-naphthylazo]-5-hydroxy-3-methyl-1-pyrazolyl}-N-2-hydroxyethyl-N-methylbenzenesulfonamide.
5-hydroxy-4-{4-{2-{[2-(2-methoxyethoxy)-ethyl]-methylamino}-ethylamino}-1-naphthylazo}-3-pyrazolecarboxylic acid, ethyl ester.
2-{4-[4-(2-diethylaminoethylamino)-1-naphthylazo]-3-methyl-5-oxo-2-pyrazolin-1-yl}-6-methyl-7-benzothiazolesulfonic acid.
1-{3-{7-bromo-4-[1-(p-chlorophenyl)-3-methyl-4-pyrazolylazo]-1-naphthylamino}-2-methylpropyl}-piperidine.
2,5-dichloro-4-{4-[4-(2-diethylaminoethylamino)-1-naphthylazo]-3-methyl-5-oxo-2-pyrazolin-1-yl}-benzenesulfonic acid.
4-{4-[2,2-dimethyl-3-(4-methyl-1-piperazinyl)-propylamino]-1-naphthylazo}-5-hydroxy-1-(p-nitrophenyl)-3-pyrazolecarboxylic acid.
6-{4-{4-{2-[ethyl(3-methoxypropyl)-amino]-ethylamino}-1-naphthylazo}-5-hydroxy-3-methyl-1-pyrazolyl}-1,3-naphthalenedisulfonic acid.
3-amino-4-[4-(2-diethylaminoethylamino)-1-naphthylazo]-5-pyrazolol.
3-{4-[4-(2-diethylaminoethylamino)-1-naphthylazo]-5-hydroxy-3-methyl-1-pyrazolyl}-dibenzenesulfonamide.

3-amino-4-[4-(2-diethylaminoethylamino)-1-naphthyl-azo]-1-phenyl-2-pyrazolin-5-one.

p-{4-{4-[2-(isopropylmethylamino)-ethylamino]-1-naphthylazo}-5-hydroxy-3-methyl-1-pyrazolyl}-benzene-sulfonic acid.

4-[4-(2-diethylaminoethylamino)-1-naphthylazo]-5-hydroxy-3-methyl-1-pyrazolecarboxamidine.

1-(2-imidazolin-2-yl)-4-{4-[2-(isopropylmethylamino)-ethylamino]-1-naphthylazo}-3-methyl-5-pyrazolol.

4-[2-(1-naphthylamino)-ethyl] - 1 - piperazineethanol, trihydrochloride, M.P. 207–211° C., employed as a starting material in the above preparation is prepared from N-(2-bromoethyl) - 1-naphthylamine, hydrobromide, and 1-piperazineethanol according to the procedure described under Example 37 herein for the preparation of decahydro-1-[2-(1 - naphthylamino) - ethyl] - quinoline, hydrochloride. The other intermediate 1-naphthylamines employed herein can be prepared from the appropriate 1-naphthol or 1-naphthylamine precursors according to the procedures described under Examples 1 through 15.

Example 40

5-amino-2,1,3-benzothiadiazole (1.5 g., 0.01 mole) is diazotized and coupled into 2.4 g. (0.01 mole) of 1-(2-diethylaminoethylamino)-naphthalene according to the procedure outlined under Example 3 herein for the preparation of 5-{4-{2 - [(2 - diisopropylaminoethyl) - methylamino]-ethylamino} - 1 - naphthylazo}-indazole. Crystallization of the crude dye from a methanol-2-propanol mixture gives red crystals of the desired 5-[4-(2-diethylaminoethylamino) - 1 - naphthylazo]-2,1,3-benzothiadiazole, of formula

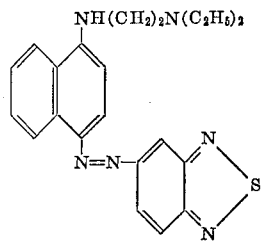

Utilizing the preparative methods described under Examples 1 through 15 herein, the following related compounds can be prepared, starting from the appropriate substituted 1-naphthylamine and benzothiadiazole, benzisothiazole, or thieno[3,2-b]-pyridine compound:

5-{4-[2-(hexylmethylamino)-ethylamino]-1-naphthylazo}-1,2,3-benzothiadiazole.

4-[4-(2-diethylaminoethylamino)-1-naphthylazo]-2,1,3-benzothiadiazole.

5-{4-[2-(ethylisopropylamino)-ethylamino]-1-naphthylazo}-1,2-benzisothiazole.

6-[4-(2-dimethylamino-1-methylethylamino)-1-naphthylazo]-1,2-benzisothiazolin-3-one, 1,1-dioxide.

6-{4-{2-[(2-ethoxyethyl)ethylamino]-ethylamino}-1-naphthylazo}-1,2,3-benzothiadiazole.

3-{4-[2-(1-pyrrolidinyl)-ethylamino]-1-naphthylazo}-thieno[3,2-b]-pyridine.

4-amino-7-[4-(3-diethylamino-2,2-dimethylpropylamino)-1-naphthylazo]-1,2,3-benzothiadiazole.

5-[4-(2-diethylaminoethylamino)-6-methoxy-1-naphthylazo]-3-phenyl-1,2-benzisothiazole.

5-amino-4-[4-(2-diethylaminoethylamino)-1-naphthylazo]-1,2,3-benzothiadiazole.

1-[4-(2,1,3-benzothiadiazol-5-ylazo)-1-naphthylamino]-3-diethylamino-2-propanol.

4-{4-[2-(isopropylmethylamino)-ethylamino]-1-naphthylazo}-2,1,3-benzothiadiazole.

6-{4-{2-{4-[2-(1-pyrrolidinyl)-ethyl]-piperidino}-ethylamino}-1-naphthylazo}-1,2-benzisothiazolin-3-one, 1,1-dioxide.

The other intermediate 1-naphthylamines employed herein can be prepared from the appropriate 1-naphthol or 1-naphthylamine precursors according to the procedures described under Examples 1 through 15.

Example 41

3-aminopyridine (5.7 g., 0.06 mole) is diazotized and coupled into 14.4 g. (0.06 mole) of 1-methyl-4-(1-naphthylamino)-piperidine according to the procedure specified under Example 3 herein for the preparation of 5-{4-{2 - [(2 - diisopropylaminoethyl) - methylamino] - ethylamino}-1-naphthylazo}-indazole. Crystallization of the crude dye from 2-propanol gives the desired 1-methyl-4-[4 - (3 - pyridylazo) - 1 - naphthylamino] - piperidine, of formula

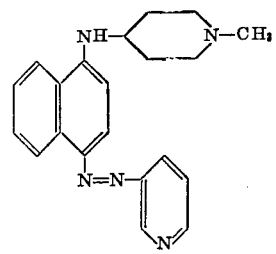

as orange-red crystals, M.P. 169.5–171° C.

Utilizing the preparative methods outlined under Examples 1 through 15 herein, the following related compounds can be prepared, starting from the appropriate aminopyridine and substituted 1-naphthylamine precursors:

2 - {(2 - ethoxyethyl)-{2-[4-(3-pyridylazo)-1-naphthylamino]-ethyl}-amino}-ethanol.

3 - {4 - [(2-hexahydro-1-indolinyl)-ethylamino]-1-naphthylazo}-picolinic acid.

3 - {4 - {2 - [bis(2 - dimethylaminoethyl)-amino]-ethylamino}-1-naphthylazo}-4-(phenylthio)-pyridine.

5 - [4 - (1-ethyl-4-piperidylamino)-1-naphthylazo]-2-pyridinol.

3 - {4 - {2-{[2-(2-ethoxyethoxy)ethyl]-ethylamino}-ethylamino}-1-naphthylazo}-pyridine.

2 - {5 - bromo - 4 - [2-(3-methoxy-1-pyrrolidinyl)-ethylamino]-1-naphthylazo}-pyridine.

5 - [4 - (2-diethylaminoethylamino)-7-methoxy-1-naphthylazo]-2-methoxypyridine.

α - Methyl - 1 - {2-[4-(3-pyridylazo)-1-naphthylamino]-ethyl}-3-piperidinemethanol.

2 - {2 - {methyl{2-[4-(3-pyridylazo)-1-naphthylamino]-ethyl}-amino}-ethoxy}-ethanol.

2 - chloro - 5-{4-{2-{[2-(2-diethylaminoethoxy)-ethyl]-ethylamino}-ethylamino}-1-naphthylazo}-pyridine.

3 - {4 - {2 - [bis(2 - methylallyl)-amino]-ethylamino}-1-naphthylazo}-pyridine.

1,1' - {3 - [4-(3-pyridylazo)-1-naphthylamino]-propyliminobis(trimethylene)}-dipiperidine.

3 - {4 - [2-(isopropylmethylamino)-ethylamino]-6-methyl-1-naphthylazo}-pyridine.

1 - methyl - 4-(1-naphthylamino)-piperidine, B.P. 144–146° C./0.2 mm., employed as a starting material in the above preparation, is prepared from 1-methyl-4-piperidone and 1-naphthylamine according to the procedure described under Example 34 herein for the preparation of $N^1,N^1$ - diethyl - $N^4$-1-naphthyl-1,4-pentanediamine. The other intermediate 1-naphthylamines employed herein can be prepared from the appropriate 1-naphthol or 1-naphthylamine precursors according to the procedures described under Examples 1 through 15.

Example 42

3-aminoquinoline (2.9 g., 0.02 mole) is diazotized and coupled into 7.7 g. (0.02 mole) of 1,1,7,7-tetraethyl-4-[2-(1-naphthylamino)-ethyl]-diethylenetriamine according to the procedure outlined under Example 6 herein for the preparation of 1-diethylamino - 3-[4 - (3 - pyridylazo)-1- naphthylamino}-2-propanol, trihydrochloride. Crystallization of the crude dye from a methanol-2-propanol mixture containing a few drops of ethanolic hydrogen chloride gives the desired 3-{4-{2-[bis(2-diethylamino-ethyl)-amino] - ethylamino} - 1-naphthylazo}quinoline, pentahydrochloride, of formula,

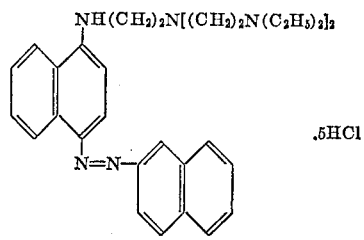

as a reddish-purple hydrated solid, M.P. 155–163° C. (dec.).

Utilizing the preparative methods described under Examples 1 through 15 herein, the following related compounds can be prepared, starting from the appropriate aminoquinoline and substituted 1-naphthylamine precursors:

3 - {4 - [2 - (1 - azaspiro[4.4]non-1-yl)-ethylamino]-1-naphthylazo}-quinoline.
7 - {4 - [2-(2-piperidinoethoxy)-ethylamino]-1-naphthylazo}-quinoline.
8 - [4 - (3-diethylamino-2-methoxypropylamino)-1-naphthylazo]5,6-dimethoxyquinoline.
5 - [4 - (2-methyl-2-piperidinopropylamino)-1-naphthylazo]-quinoline.
3 - {7 - chloro-4-(2-diethylaminoethylamino)-1-naphthylazo}-quinoline.
1 - {2 - [4 - (5 - phenylazo - 8-quinolylazo)-1-naphthylamino]-ethyl}-3-piperidinemethanol.
3 - [4 - (m - diethylaminoanilino)-1-naphthylazo]-quinoline.
3 - [4 - (2-diethylaminoethylamino)-6-methoxy-1-naphthylazo]-quinoline.
3 - {4 - {2 -[2-(2-diethylaminoethoxy)-ethoxy]-ethyl-amino}-1-naphthylazo}-quinoline.
1 - {ethyl{2 - [4 - (3 - quinolylazo) - 1-naphthylamino]-ethyl}-amino}-2-propanol.
8 - chloro - 6-{4-{2-[ethyl(2-hydroxy-3-methoxypropyl)-amino] - ethylamino} - 1 - naphthylazo}-4-methylcarbostyril.
5 - (3 - quinolylazo)-8-(2-diethylaminoethylamino)-1-naphthol.

1,1,7,7 - tetraethyl-4-[2-(1-naphthylamino)-ethyl]-diethylenetriamine, B.P. 176–177° C./0.1 mm., $n_D^{25}$ 1.5563, employed as an intermediate in the above procedure, is prepared from N-(2-bromoethyl)-1-naphthylamine, hydrobromide and 1,1,7,7 - tetraethyldiethylenetriamine according to the method described under Example 3 herein for the preparation of 1,1-diisopropyl-4-methyl-7-(1-naphthyl)-diethylenetriamine. The other intermediate 1-naphthylamines employed herein can be prepared from the appropriate 1-naphthol or 1-naphthylamine precursors according to the procedures described under Examples 1 through 15.

Example 43

5-amino-1,2-benzisothiazole (1.5 g., 0.01 mole) is diazotized and coupled into 2.4 g. (0.01 mole) of 1[2-1-naphthylamino)-ethyl]-pyrrolidine according to the procedure outlined under Example 3 herein for the preparation of 5 - {4 - {2-[(2-diisopropylaminoethyl)-methylamino]-ethylamino}-1-naphthylazo}-indazole. Crystallization of the crude dye from a methanol-2-propanol mixture gives orange-red crystals of the desired 5-{4-[2-(1-pyrrolidin-yl) - ethylamino] - 1-naphthylazo}-1,2-benzisothiazole, of formula,

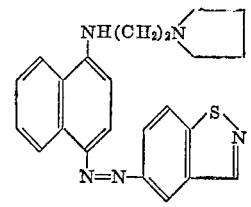

Utilizing the preparative methods described under Examples 1 through 15 herein, the following related compounds can be prepared, starting from the appropriate substituted 1-naphthylamine and benzothiazole, benzisothiazole, benzoxazole, or naphthoxazole:

6 - [4 - (2-diethylaminoethylamino)-1-naphthylazo]-benzothiazole.
3 - methyl - 6-[4-(1-methyl-4-piperidylamino)-1-naphthylazo]-2-benzoxazolinone.
2 - {{2 - [4-(2-chloro-6-benzothiazolylazo)-1-naphthylamino]-ethyl}-pentylamino}-ethanol.
4 - {4 - [2 - (allylethylamino)-ethylamino]-1-naphthylazo}-benzothiazole.
5 - [6 - chloro-4-(2-diethylaminoethylamino)-1-naphthylazo]-2-benzoxazolinone.
4 - [4 - (7-diethylaminoheptylamino)-1-naphthylazo]-6-methoxy-2-benzothiazolecarboxylic acid.
4 - {4 - [2 - (cyclopentylmethylamino)-ethylamino]-1-naphthylazo}-2-methylbenzoxazole.
1 - {3 - [4 - (2-acetamido-5-benzothiazolylazo)-1-naphthylamino]-2,2-dimethylpropyl}-4-methylpiperazine.
9 - [4 - (2-diethylaminoethylamino)-1-naphthylazo]-8-hydroxynaphth[1,2]-oxazoline-2-thione.
4 - amino - 7-[4-(2-diethylaminoethylamino)-1-naphthylazo]benzothiazole.
2 - amino - 6-{4-[2-(4-methylpiperidino)-ethylamino[-1-naphthylazo}-benzothiazole.
6 - {4 - [2 - hydroxy-3-(isopropylmethylamino)-propylamino]-1-naphthylazo}-2-benzoxazolinone.

The starting material, 1-[2-(1-naphthylamino)-ethyl]-pyrrolidine, B.P. 142–143° C./0.1 mm., $n_D^{25}$ 1.6183, is prepared from 1-naphthylamine and N-(2-chloroethyl)-pyrrolidine, hydrochloride, according to the procedure outlined under Example 1 herein for the preparation of 1-(2-diethylaminoethylamino)-naphthalene. The other intermediate 1-naphthylamines employed herein can be prepared from the appropriate 1-naphthol or 1-naphthylamine precursors according to the procedures described under Examples 1 through 15.

Example 44

To a solution of 7.3 g. (0.05 mole) of 2-aminopyridine, 1-oxide, hydrochloride in 300 ml. of water containing 13 ml. (0.15 mole) of concentrated hydrochloric acid is added a solution of 3.5 g. (0.05 mole) of sodium nitrile in 50 ml. of water while maintaining the temperature at −3 to 2° C. Stirring is continued at this temperature for one-half hour and the yellow diazonium salt solution is added portionwise to a solution of 12.1 g. (0.05 mole) of N,N - diethyl - 2 - methyl-N′-1-naphthyl-1,3-propanediamine in 200 ml. of 95% ethanol, keeping the temperature between −5 and 5° C. After one-half hour, the reaction mixture is diluted with water to a volume of 3 l., made strongly alkaline with concentrated sodium hydroxide, and the oily precipitate is extracted with several portions of chloroform. The combined chloroform extracts are washed with water, dried over anhydrous potassium carbonate, and concentrated on the steam bath. Crystallization of the crude dye thus obtained from a methanol-acetonitrile mixture gives the desired 2-[4-(3- dimethylamino - 2 - methylpropylamino)-1-naphthylazo]-pyridine, 1-oxide, of formula,

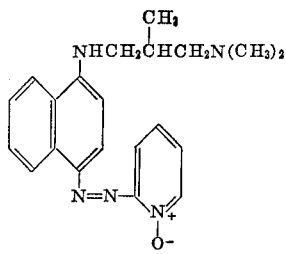

as green crystals with a red luster, M.P. 185–186° C. (dec.).

Utilizing procedures similar to those described in Examples 1 through 15 herein, the following related compounds can be prepared, starting from the appropriately substituted 1-naphthylamine and aminopyridine-1-oxide or aminoquinoline-1-oxide compounds:

4 - [4 - (2 - diethylaminoethylamino) - 1 - naphthylazo]-quinoline, 1-oxide.

3-{4-[2-(isopropylmethylamino)-ethylamino]-1-naphthylazo}-pyridine, 1-oxide.

3-{4-{2-[(2-ethoxyethyl) - ethylamino] - ethylamino}-1-naphthylazo}-quinoline, 1-oxide.

1 - {3 - [7 - methoxy - 4 - (2 - methyl - 4 - pyridylazo)-1-naphthyl]-propyl}-piperidine, 1-oxide.

3 - [4 - (2 - diethylaminoethylamino) - 1 - naphthylazo]-quinoline, 1-oxide.

2 - [4 - (2 - diethylaminoethylamino) - 1 - naphthylazo]-pyridine, 1-oxide.

4 - amino - 6 - [4 - (2 - diethylaminoethylamino)-1-naphthylazo]-quinoline, 1-oxide.

4 - [6 - chloro - 4 - (3 - diethylamino - 2,2 - dimethylpropylamino)-1-naphthylazo]-pyridine, 1-oxide.

3 - {4 - {2 - [4 - (2 - piperidinoethyl) - piperidino] - ethylamino}-1-naphthylazo}-quinoline, 1-oxide.

2 - [4 - (2 - diethylaminoethylamino) - 1 - naphthylazo]-pyridine, 1-oxide.

4 - [4 - (2 - diethylaminoethylamino) - 1 - naphthylazo]-pyridine, 1-oxide.

3 -{4 - [2 - isopropylmethylamino) - ethylamino]-1-naphthylazo}-quinoline, 1-oxide.

The starting material, N,N-diethyl-2-methyl-N'-1-naphthyl-1,3-propanediamine, can be prepared as follows: in a 2-l. 3-necked flask fitted with a mechanical stirrer, condenser and dropping funnel is placed a suspension of 36 g. (0.75 mole) of 50% sodium hydride in oil dispersion in 200 ml. of xylene. A solution of 72 g. (0.5 mole) of 1-naphthylamine in 300 ml. of xylene is then added, and the mixture is stirred and boiled under reflux for 2 hours, during which time the thick green sodium salt precipitates. The reaction mixture is allowed to cool to room temperature. Meanwhile, 100 g. (0.58 mole) of 3-dimethylamino-2-methylpropylchloride, hydrochloride is suspended in 200 ml. of concentrated ammonium hydroxide and the base which separates is extracted with three 100 ml. portions of xylene. The combined extracts are dried over anhydrous sodium sulfate, the drying agent is collected by filtration, and the xylene filtrate is cautiously added with stirring to the sodium hydride-naphthylamine mixture. The addition is not exothermic. After the addition is complete, the mixture is stirred and boiled under reflux for 20 hours. The deep brown reaction mixture is cooled to room temperature and 200 ml. of water is cautiously added with stirring. The aqueous layer which separates is discarded and the organic layer is washed with two 200 ml. portions of water to remove any undissolved salts. The xylene extracts are dried over anhydrous potassium carbonate, the drying agent is collected by filtration, the solvent is removed and the residue distilled in vacuo through an 8-inch Vigreux column. The desired N,N-diethyl-2-methyl-N'-1-naphthyl-1,3-propanediamine is obtained as a yellow oil, B.P. 117–118° C./0.15 mm., which solidifies in the receiver.

Alternatively, the alkylation may be carried out in the presence of sodium amide according to the following procedure: in a 2 l. 3-necked flask fitted with a mechanical stirrer, condenser, thermometer and addition funnel is placed 40 g. (1 mole) of sodium amide and 500 ml. of dry toluene. A solution of 72 g. (0.5 mole) of 1-naphthylamine in 300 ml. of toluene is then dripped into the mixture with mechanical stirring. The addition is not exothermic. The reaction mixture is then boiled under reflux for 1 hour, whereupon a thick greenish-black gum precipitates along the sides of the flask. A solution of 0.58 mole of 3-dimethylamino-2-methylpropylchloride in 200 ml. of toluene, prepared as described above, is then added at room temperature to the sodium amide-naphthylamine mixture; the addition is mildly exothermic. When the addition of the halide is complete, the reaction mixture is stirred and boiled under reflux for 3 hours. Upon cooling, 300 ml. of water is cautiously added and the product is worked up as described above to give the desired N,N-diethyl-2-methyl-N'-1-naphthyl-1,3-propanediamine as a yellow oil, B.P. 124–125° C./0.3 mm.

The other intermediate 1-(dialkylaminoalkylamino)-naphthalenes employed herein can be prepared from the appropriate naphthalene compound according to the procedures described under Examples 1 through 15 herein.

*Example 45*

3-aminoacridine (1.94 g., 0.01 mole) is diazotized and coupled into 2.82 g. (0.01 mole) of N-cyclohexyl-N-methyl-N'-1-naphthylethylenediamine according to the procedure outlined under Example 3 herein for the preparation of 5-{4-{2-[(2-diisopropylaminoethyl)-methylamino]-ethylamino}-1-naphthylazo}-indazole. Crystallization of the crude dye from an acetonitrile-water mixture gives the desired 3-{4-[2-(2-cyclohexylmethylamino)-ethylamino]-1-naphthylazo}-acridine, of formula,

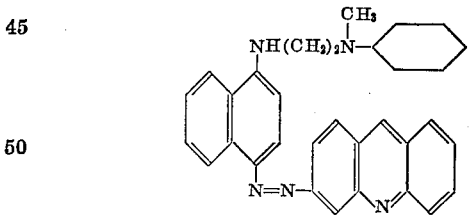

as orange-red crystals.

Utilizing the preparative methods described under Examples 1 through 15 herein, the following related compounds can be prepared, starting from the appropriate substituted 1-naphthylamine and aminoacridine compound:

3,6-diamino-4-[4-(2-diethylaminoethylamino)-1-naphthylazo]-acridine.

2-{4-{2-[4-(2-diethylaminoethyl)-1-piperazinyl]-ethylamino}-1-naphthylazo}-1,4-dimethoxy-9-acridanone.

4-[4-(2-diethylaminoethylamino)-1-naphthylazo]-3,6-bis(dimethylamino)-acridine.

4-[4-(2,3-dipiperidinopropylamino)-1-naphthylazo]-acridine.

1-(2-diethylaminoethylamino)-4-[4-(2-dimethylaminoethylamino)-1-naphthylazo]-acridine.

2,2'-{2-{4-[9-(2-diethylaminoethylamino)-7-methoxy-3-acridinylazo]-1-naphthylamino}-ethylimino}-diethanol.

9-{4-{2-[4-(2-piperidinoethyl)-piperidino]-ethylamino}-1-naphthylazo}-acridine.

3-chloro-9-(3-diethylaminopropylamino)-6-[4-(2-diethylaminoethylamino)-1-naphthylazo]-acridine, 1-oxide.

6-{7-methoxy-4-[2-(3-methoxy-1-pyrrolidinyl)-ethylamino]-1-naphthylazo}-9-oxo2-acridansulfonic acid.

6-chloro-2-{4-{2-[(2-diethylaminoethyl)-ethylamino]-ethylamino}-1-naphthylazo}-acridine.

1-diethylamino-3-{6-[4-(2-diethylaminoethylamino)-1-naphthylazo]-2,3-dimethoxy-9-acridinylamino}-2-propanol.

3,6-diamino-4-[4-(5-dimethylaminopentylamino)-1-naphthylazo]-2,7-dimethylacridine.

N-cyclohexyl - N - methyl - N' - 1-naphthylethylenediamine, B.P. 167–168° C./0.2 mm., $n_D^{25}$ 1.5984, employed as a starting material in the above procedure, is prepared from N-(2-bromoethyl)-1-naphthylamine, hydrobromide, and N-methylcyclohexylamine according to the procedure described under Example 3 herein for the preparation of 1,1-diisopropyl-4-methyl - 7 - (1-naphthyl)-diethylenetriamine. The other intermediate 1-naphthylamines employed herein can be prepared from the appropriate 1-naphthol or 1-naphthylamine precursors according to the procedures described under Examples 1 through 15.

*Example 46*

Sodium nitrate (3.0 g., 0.043 mole) is added portionwise to 20 ml. of concentrated sulfuric acid, with stirring, and the temperature of the reaction mixture is allowed to rise to 65° C. The resulting solution is cooled to 5° C. and is treated dropwise, with stirring, with 40 ml. of a mixture of 6 ml. of propionic acid and 34 ml. of acetic acid while allowing the temperature to rise to 15° C. The reaction is maintained at this temperature during the remainder of the addition. The above nitrosyl sulfuric acid mixture is cooled to 0° to —5° C. and treated with 6.0 g. (0.041 mole) of 2-amino-5-nitro-1,3,4-thiadiazole portionwise, with stirring, after which 40 ml. of a propionic-acetic acid mixture prepared as described above are added while maintaining the temperature of the reaction mixture between 0° C. and —5° C. The reaction mixture thus obtained is then stirred at 0° C. to —5° C. for 2 hours and excess nitrite present is destroyed by the addition of urea. The clear diazonium solution thus obtained is added, with stirring, at 0° C. to —5° C. to a solution of 9.8 g. (0.041 mole) of 1-(2-diethylaminoethylamino)-naphthalene in a mixture of 10 ml. of propionic acid and 60 ml. of acetic acid. After a short time, the reaction mixture is made neutral to Congo Red paper by adding sodium acetate portionwise and the coupling reaction is allowed to proceed for 1 hour. The reaction mixture is diluted with 2 l. of 1% sodium hydroxide and allowed to stir at room temperature for 16 hours. The precipitated azo compound is collected by filtration and wash thoroughly with water. Crystallization of the crude dye from an acetonitrile-water mixture gives shimmering crystals of the desired 5-[4-(2-diethylamino)-1-naphthylazo]-2-nitro - 1,3,4 - thiazole, of formula,

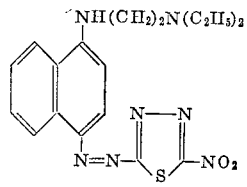

Utilizing the preparative methods outlined under Examples 1 through 15 herein, the following related compounds can be prepared, starting from the appropriate substituted naphthylamine precursor and aminothiadiazole or aminotriazole:

2-[4-(2-diethylaminoethylamino)-1-naphthylazo]-5-methyl-1,3,4-thiadiazole.

3-{4-[2-(1-pyrrolidinyl)-ethylamino]-1-naphthylazo}-s-triazole.

2-[4-(2-dimethylamino-1-methylethylamino)-1-naphthylazo]-5-nitro-1,3,4-thiadiazole.

5-[4-(2-diethylaminoethylamino)-1-naphthylazo]-s-triazole-3-carboxylic acid.

2-nitro-5-[4-(3-piperidinopropylamino)-1-naphthylazo]-1,3,4-thiadiazole.

3-[4-(2-diethylaminoethylamino)-1-naphthylazo]-5-phenyl-s-triazole.

2-[4-(1-methyl-4-piperidylamino)-1-naphthylazo] - 1,3,4-thiadiazole.

2-[4-(3-diethylamino-2,2-dimethylpropylamino)-1-naphthylazo]-5-phenyl-1,3,4-thiadiazole.

3-[4-(2-diethylaminoethylamino)-1-naphthylazo]-1,2,5-thiadiazole.

2-[4-(2-diethylaminoethylamino)-1-naphthylazo] s-triazole.

2-{4-[2-(1-methyl-2-piperidyl)-ethylamino]-1-naphthylazo}-5-styryl-1,3,4-thiadiazole.

2-[4-(4-diethylaminocyclohexylamino)-1-naphthylazo]-5-nitro-1,3,4-thiadiazole.

The other intermediate 1-naphthylamines employed herein can be prepared from the appropriate 1-naphthol or 1-naphthylamine precursors according to the procedures described under Examples 1 through 15.

*Example 47*

A solution of 11.5 g. (0.1 mole) of 5-amino-3-methyl-1,2,4-thiadiazole in 250 ml. of 50% sulfuric acid is cooled to —5° C. and diazotized by the portionwise addition of 6.9 g. (0.1 mole) of sodium nitrite dissolved in 50 ml. of ice water. When diazotization is complete, the diazonium salt mixture is added to the solution of 33.1 g. (0.1 mole) of N,N-bis(2-ethoxyethyl)-N'-1-naphthylethylenediamine in 1 l. of water containing 50 ml. of concentrated hydrochloric acid, maintaining the temperature at 0° C. during the addition. The deep purple mixture is stirred at 0–5° C. for 4 hours and is made alkaline with concentrated ammonium hydroxide. The supernatant is decanted from the red base, and the residue is washed thoroughly with water and crystallized from an acetonitrile- water mixture to give the desired 5-{4-{2-[bis(2-ethoxyethyl)-amino]-ethylamino}1 - naphthylazo}-3-methyl-1,2,4-thiadiazole, of formula,

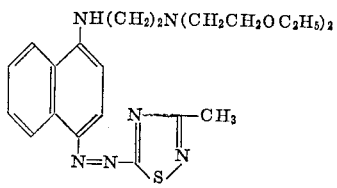

Utilizing the preparative methods outlined under Examples 1 through 15 herein, the following related compounds can be prepared, starting from the appropriate substituted 1-naphthylamine precursors and aminothiadiazole, aminooxadiazole, aminoimidazole, or aminoisoxazole:

5-[4-(2-diisopropylaminoethylamino)-1-naphthylazo]-3-methyl-1,2,4-thiadiazole.

5-[4-(2-diethylaminoethylamino)-1-naphthylazo]-3-methyl-1,2,4-oxadiazole.

4-{4-[2-(ethylmethylamino)-ethylamino]-1-naphthylazo}-5-methylimidazole.

5-[4-(2-diethylaminoethylamino)-7-methoxy-1-naphthylazo]-3-phenyl-1,2,4-thiadiazole.

2-ethyl-5-[4-(2-morpholinoethylamino)-1-naphthylazo]-4-imidazolecarboxylic acid, ethyl ester.

4-[4-(3-diethylamino-2-methylpropylamino)-1-naphthylazo]-5-methyl-1,2,3-thiadiazole.

4-[4-(2-diethylaminoethylamino)-1-naphthylazo]-1,5-dimethylimidazole.

2-{ethyl{2-[4-(1,2,3-thiadiazol-5-ylazo)-1-naphthylamino]-ethyl}-amino}-ethanol.

4-[4-(3-dimethylaminopropylamino)-1-naphthylazo]-2-phenyl-5-imidazolecarboxylic acid, ethyl ester.

1-methyl-4-{2-[4-(1,2,4-thiadiazol-3-ylazo)-1-naphthylamino]-ethyl}-piperazine.

5-[7-chloro-4-(2-diethylaminoethylamino)-1-naphthylazo]-3-methoxy-1,2,4-thiadiazole.

5-[4-(2-diethylaminoethylamino)-1-naphthylazo]-3,4-dimethylisoxazole.

N,N - bis(2 - ethoxyethyl) - N' - 1 - naphthylethylenediamine, B.P. 157–158° C./0.07 mm., $n_D^{25}$ 1.5598, employed as a starting material in the above procedure, is prepared from 1-(2-bromoethyl)-1-naphthylamine, hydrobromide and bis(2-ethoxyethyl)-amine according to the procedure described under Example 3 herein for the preparation of 1,1-diisopropyl-4-methyl-7-(1-naphthyl)-diethylenetriamine. The other intermediate 1-naphthylamines employed herein can be prepared from the appropriate 1-naphthol or 1-naphthylamine precursors according to the procedures described under Examples 1 through 15.

Example 48

1-amino-4-methyl-10-thiaxanthenone (4.8 g., 0.02 mole) is diazotized and coupled into 4.8 g. (0.02 mole) of 1-(2-diethylaminoethylamino)-naphthalene according to the procedure outlined under Example 1 herein for the preparation of 5-[4-(2-diethylaminoethylamino)-1-naphthylazo]-uracil. Crystallization of the crude dye from acetonitrile gives red crystals of the desired 1-[4-(2-diethylaminoethylamino) - 1 - naphthylazo] - 4 - methyl-10-thiaxanthenone, of formula,

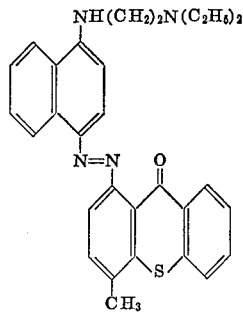

Utilizing the preparative methods described under Examples 1 through 15 herein, the following related compounds can be prepared, starting from the appropriate substituted 1-naphthylamine and aminothiaxanthene, aminoxanthene, aminobenzopyran, aminocoumarin, or aminoflavone compound:

1-(2-diethylaminoethylamino)-4-[4-(2-diethylaminoethylamino)-1-naphthylazo]-10-thiaxanthenone.

1-{4-{2-[4-(1-methyl-4-piperidyl)-piperidino]-ethylamino}-1-naphthylazo}-4-methyl-9-xanthenone.

7-[4-(2-diethylaminoethylamino)-6-methoxy-1-naphthylazo]-2-oxo-2H-1-benzopyran-3-carboxylic acid.

1-{2-[4-(4-methyl-1-thiaxanthenylazo)-1-naphthylamino]-ethyl}-piperidine.

6-[4-(2-diethylaminoethylamino)-1-naphthylazo]-coumarin.

6-{4-{2-[(2-hydroxyethyl)methylamino]-ethylamino}-1-naphthylazo}-flavone.

1-(2-dibutylaminoethylamino)-4-[4-(2-diethylaminoethylamino)-1-naphthylazo]-10-thiaxanthenone.

3-[4-(2-diethylaminoethylamino)-1-naphthylazo]-4-hydroxycoumarin.

3-[4-(3-dimethylamino-2-hydroxypropylamino)-1-naphthylazo]-9-xanthenone.

8-[4-(2-diethylaminoethylamino)-1-naphthylazo]-7-hydroxy-3-methoxyflavone.

1-{4-[2-(isopropylmethylamino)-ethylamino]-1-naphthylazo}-4-methylxanthene.

The other intermediate 1-naphthylamines employed herein can be prepared from the appropriate 1-naphthol or 1-naphthylamine precursors according to the procedures described under Examples 1 through 15.

Example 49

7-aminocinnoline (1.45 g., 0.01 mole) is diazotized and coupled into 2.54 g. (0.01 mole) of N-allyl-N-ethyl-N¹-1-naphthylethylenediamine according to the procedure outlined under Example 1 herein for the preparation of 5-[4-(2-diethylaminoethylamino)-1-naphthylazo]-uracil. Crystallization of the crude dye from a methanol-isopropanol mixture gives red crystals of the desired 7-{4-[2-allylethylamino)-ethylamino]-1-naphthylazo}-cinnoline, of formula,

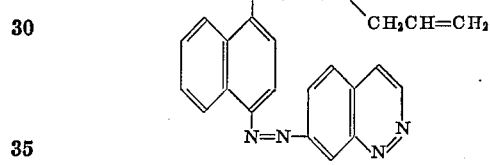

Utilizing the preparative methods described under Examples 1 through 15 herein, the following related compounds can be prepared, starting from the appropriate substituted 1-naphthylamine and aminocinnoline, aminopyrazine, aminonaphthimidazole, aminopyridazine, and aminobenzocinnoline compound:

2-[4-(2-diethylaminoethylamino)-1-naphthylazo]-3-methylpyrazine.

6-[4-(4-diethylamino-1-methylpentylamino)-1-naphthylazo]-cinnoline.

4-methyl-8-[4-octahydro-1H-quinolizin-1-yl-methylamino)-1-naphthylazo]-cinnoline.

1-[4-(6-chloro-4-pyridazinylazo)-1-naphthylamino]-2-methyl-3-dipropylamino-2-propanol.

3-[4-(2-diethylaminoethylamino)-1-naphthylazo]-benzo[c]cinnoline.

3-[4-(5-diethylamino-1-methylpentylamino)-1-naphthylazo]-6-methylpyridazine.

2-{4-[2-(3-isogranatanin-3-yl)-ethylamino]-1-naphthylazo}-pyrazine.

1-[4-(1-methyl-3-piperidylmethylamino)-1-naphthylazo]-benzo[c]cinnoline.

4-[4-(benzo[c]cinnolin-2-ylazo)-1-naphthylamino]-1-diethylamino-2-butanol.

3-{4-[2-(4-dimethylaminopiperidino)-ethylamino]-1-naphthylazo}-2-pyrazinecarboxylic acid.

5-[4-(2-diethylaminoethylamino)-1-naphthylazo]-2-methyl-1H-naphth-1,2]imidazole.

6-methyl-2-phenyl-4-{4-{2-[2-(piperidinomethyl)-piperidino]-ethylamino}-1-naphthylazo}-3(2H)-pyridazinone.

N-allyl-N - ethyl-N¹-1-naphthylethylenediamine, B.P. 147–148° C./0.07 mm., $n_D^{25}$ 1.5941, employed as a starting material in the above procedure, is prepared from N-(2-bromoethyl)-1-naphthylamine, hydrobromide, and allyethylamine according to the procedure described under Example 3 herein for the preparation of 1,1-diisopropyl-4-methyl-7-(1-naphthyl)-diethylenetriamine. The other intermediate 1-naphthylamines employed herein can be prepared from the appropriate 1-naphthol or 1-napthylamine precursors according to the procedures described under Examples 1 through 15.

Example 50

2-amino-3-nitro-5-acetylthiophene (3.72 g., 0.02 mole) is diazotized and coupled into 4.84 g. (0.02 mole) of N-isopropyl-N-methyl-N'-1-naphthylethylenediamine according to the procedure described under Example 11 herein for the preparation of 1-{2-[4-(2-thiazolylazo)-1-naphthylamino]-ethyl}-piperidine. Crystallization of the crude dye from an acetonitrile-water mixture gives the desired 5-{4-[2-isopropylmethylamino)-ethylamino] - 1 - napthylazo}-4-nitro-2-thienyl methyl ketone, of formula,

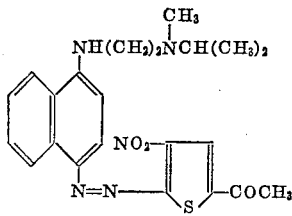

Utilizing the preparative methods described under Examples 1 through 15 herein, the following related compounds can be prepared, starting from the appropriate substituted naphthylamine precursor and amino or hydroxythiophene compound:

5-ethyl-2-methyl-1-{2-[4-(3-nitro-5-trifluoromethyl-2-thienylazo)-1-naphthylamino]-ethyl}-piperidine.
N,N-diethyl-2,2-dimethyl-N' - [4-(3,5-bis(methylsulfonyl)-2-thienylazo)-1-naphthyl]-1,3-propanediamine.
N'-[4-(5-benzoyl-3-nitro-2-thienylazo)-1-naphthyl]-N',N'-diethylethylene-diamine.
N'-[4-(5-amino-2-thienylazo)-1-naphthyl]-N,N-diethylethylenediamine.
5-[4-(1-methyl-2-pyrrolidinylmethylamino)-1-naphthylazo]-2-thiophene-sulfonic acid.
N'-[4-(5-acetamido-2-thienylazo)-1-naphthyl]-N,N-diethylethylenediamine.
1-{2-[4-(5-ethylsulfonyl-3-nitro-2-thienylazo)-1-naphthylamino]-ethyl}-3-piperidinol.
2-[4-(2-diethylaminoethylamino)-1-naphthylazo]-4,5-dihydro-3(2H)-thiophenone, 1-oxide.
5-[4-(2-diethylaminoethylamino)-1-naphthylazo]-2-thiophenol.
1,1-dimethyl-2-[4-(5-phenyl-3-thienylazo)-1-naphthyl]-1,2-propanediamine.
5-[4-(4-diethylamino-1-methylbutylamino)-1-naphthylazo]-2-thiophenecarboxylic acid, ethyl ester.
5-{4{2-[ethyl(3-hydroxypropyl)amino]-ethylamino}-1-naphthylazo}-2-thiophenearsonic acid.

N-isoproypl - N-methyl-N'-1-naphthylethylenediamine, B.P. 131–132° C./0.1 mm. $n_D^{25}$ 1.5909, employed as a starting material in the above preparation, is prepared from 1-naphthylamine and 2-(isopropylmethylamino)-ethyl chloride, hydrochloride, according to the procedure outlined under Example 1 for the preparation of 1-(2-diethylaminoethylamino)-naphthalene. The other substituted 1-naphthylamines employed herein are prepared according to the procedures described under Examples 1 through 15.

Example 51

3-aminopyridine (4.7 g., 0.05 mole) is diazotized and coupled into 13.4 g. (0.05 mole) of 1-methyl-2-[1-naphthylamino)-ethyl]-piperidine according to the procedure outlined under Example 6 herein for the preparation of 1-diethylamino-3-[4-(3-pyridylazo) - 1 - naphthylamino]-2-propanol, trihydrochloride. Crystallization of the crude dye from a 2-propanol-ether mixture containing a few drops of ethanolic hydrogen chloride gives the desired 1-methyl-2-{2-[4 - (3 - pyridylazo) - 1 - naphthylamino]-ethyl}-piperidine, trihydrochloride, of formula,

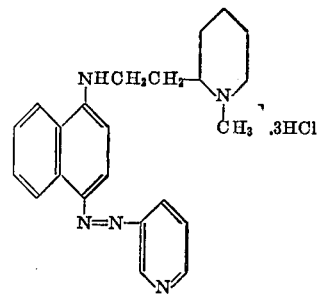

as a reddish-purple solid.

Utilizing the prepared methods described under Examples 1 through 15 herein, the following related compounds can be prepared, starting from the appropriate substituted 1-naphthylamine and aminonitrogen heterocyclic compound:

Octahydro-2-{2-[4-(3-pyridylazo) - 1 - naphthylamino]-ethyl}-1H-pyrido-[1,2-c]-pyrimidine.
5-[4-(4-diethylaminotetrahydrofurfurylamino)-1-naphthylazo]-2,4-dimethylpyrimidine.
5-ethyl-2-(2-piperidinoethyl)-1-{2-[4-(3-pyridylazo)-1-naphtylamino]-ethyl}piperidine.
5-{4-{2-[3-(1-hydroxyethyl)piperidino]-ethylamino}-1-naphthylazo}-6-methyl-2,3,4-pyridinetricarboxylic acid.
5-{4-{2-{(2-diethylaminoethyl)-[(1-methyl-2-pyrrolidinyl)-methyl]amino}-ethylamino}-1-naphthylazo}-2-methoxypyridine.
Octahydro-2-{2-[4-(3-pyridylazo)-1-naphthylamino]-ethyl}-2H-pyrido-[1,2]pyrazine.
1-{[4-(6-ethoxy-2-pyridylazo)-1-naphthylamino]methyl}-octahydro-1H-quinolizine.
1-{1{[4-(6-butoxy-3-pyridylazo)-1-naphthylamino]-methyl}-cyclohexylmethyl}-piperidine.
2,6-dihydroxy-3-{4-{3-{methyl[3-methylthio)-propyl]amino}-propylamino}-1-naphthylazo}-4-pyridinecarboxylic acid, methyl ester.
2-{2-{4-[5-(aminomethyl)-4-(methoxymethyl)-2-methyl-3-pyridylazo]-1-naphthylamino}ethyly}-octahydro-1H-isoquinoline.
5-{4-{2-[(2-hydroxyethyl)(2-piperidinoethyl)amino]-ethylamino}-1-naphthylazo}-2,6-dihydroxy-4-pyrimidinesulfonic acid.
2,2,6,6-tetramethyl-4-(3-piperidinopropoxy)-1-{3-[4-(3-pyridylazo)-1-naphthylamino]-propyl}-piperidine.
1,2,2,5,5-pentamethyl-4-{2-[4-(3-pyridylazo)-1-naphthylamino]-ethyl}-homopiperazine.
3-methoxy-6-{4-{2-[2-(2-morpholinoethyl)-piperidino]-ethylamino}-1-naphthylazo}-pyridazine.
1-butyl-3-{6-{4-[(1-ethyl-2-piperidylmethyl)-amino]-1-naphthylazo}-3-pyridylsulfonyl}-urea.
2-benzyl-1-(2-diethylaminoethyl)-5-{4-[2-(2,5-dimethyl-1-pyrrolidinyl)-ethylamino]-1-naphthylazo}-benzimidazole.

1-Methyl-2-[2-(1-naphthylamino) - ethyl] - piperidine, B.P. 198–199° C./1.3 mm., employed as a starting material in the above procedure, is prepared from 1-naphthylamine and 2-(2-chloroethyl)-1-methylpiperidine according to the procedure outlined under Example 44 herein for the preparation of N,N-diethyl-2-methyl-N'-1-naphthyl-1,3-propanediamine. The other intermediate 1-naphthylamine intermediates employed herein can be prepared from the appropriate 1-naphthylamine or 1-naphthol compound according to the procedure described under Examples 1 through 15.

Example 52

2-aminothiazole (5.0 g., 0.05 mole) is diazotized and coupled into 14.1 g. (0.05 mole) of 1-[2-(1-naphthylamino)-ethyl]-4-methylhomopiperazine according to the procedure outlined under Example 11 herein for the preparation of 1-{2-[4-(2-thiazolylazo) - 1 - naphthylamino]-ethyl}-piperidine. Crystallization of the crude dye from a 2-propanol-water mixture gives the desired 1-{2-[4-(2 - thiazolylazo) - 1 - naphthylamino] - ethyl}-4-methylhomopiperazine, of formula

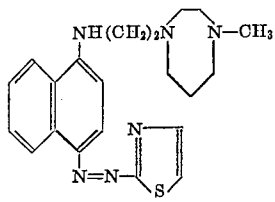

as brilliant green crystals.

Utilizing the preparative methods described under Examples 1 through 15 herein, the following related compounds can be prepared, starting from the appropriate substituted 1-naphthylamine and aminoheterocyclic compound:

1-{2-{5-ethyl-1-{2-[4-(2-thiazolylazo)-1-naphthylamino]-ethyl}-2-piperidyl}-ethyl}-hexahydroindoline.
2-{2-[4-(5-benzothiazolylazo)-1-naphthylamino]-ethyl}-octahydro-1H-pyrido[1,2-c]-pyrimidine.
6-(methylsulfonyl)-2-{4-[(tetrahydro-4-piperidinofurfuryl)amino]-1-naphthylazo}-benzothiazole.
2-{2-[3-(1-hydroxyethyl)-piperidino]-ethylamino}-1-naphthylazo}-6-benzothiazoleëthanol.
2-{2-{4-{2-[(1-methyl-2-pyrrolidinylmethyl) (3-dimethylaminopropyl)-amino]-ethylamino}-1-naphthylazo}-5-thiazolyl}-pyridine.
2-{2-[4-(5-benzothiazolylazo)-1-naphthylamino]-ethyl}-2H-pyrido[1,2]pyrazine.
5-{4-[(octahydro-1H-quinolizin-1-ylmethyl)amino]1-naphthylazo}-2,1,3-benzothiadiazole.
5-{4-[1-(1-pyrrolidinylmethyl)-cyclohexylamino]-1-naphthylazo}-1,2-benzisothiazole.
2-{4-{2-[ethyl(2-(ethylthio)-ethyl)-amino]-ethylamino}-1-naphthylazo}-4-(butylsulfonyl)-5-nitrothiazole.
Octahydro-2-{2-{4-[6-(methylsulfonyl)-2-benzothiazolylazo]-1-naphthylamino}-ethyl}-1H-isoquinoline.
2-{(2-diethylaminoethyl)-{2-{4-[4-(methylsulfonyl)-5-nitro-2-thiazolylazo]-1-naphthylamino}-ethyl}amino}-ethanol.
4-(2-diethylaminoethoxy)-2,2,6,6-tetramethyl-1-{3-[4-(5-nitro-2-thiazolylazo)-1-naphthylamino]-propyl}-piperidine.
4-{2-[4-(4,9-dioxo-5-thiophanthrenylazo)-1-naphthylamino]-ethyl}-1-ethyl-2,2,5,5-tetramethylhomopiperazine.
4-{4-{2-{2-[2-(1-pyrrolidinyl)-ethyl]piperidino}-ethylamino}-1-naphthylazo}-2,1,3-benzothiadiazole.
4-amino-7-{4-[(1-ethyl-2-pyrrolidinylmethyl)-amino]-1-naphthylazo}-2,1,3-benzothiadiazole.
2-{4-[2-(2,6-dimethylpiperidino)-ethylamino]-1-naphthylazo}-dibenzo-[b,f][1,4,5]thiadiazepine, 11,11-dioxide.

1-[2-(1 - naphthylamino)-ethyl]-4-methylhomopiperazine, employed as an intermediate in the above procedure, is prepared from N-(2-bromoethyl)-1-naphthylamine, hydrobromide, and 1-methylhomopiperazine according to the procedure described under Example 3 herein for the preparation of 1,1-diisopropyl-4-methyl-7-(1-naphthyl)-diethylenetriamine. The other intermediate 1-naphthylamines employed herein can be prepared from the appropriate 1-naphthol or 1-naphthylamine precursors according to the procedures described under Examples 1 through 15.

Example 53

6-aminoindazole (13.3 g., 0.1 mole) is diazotized and coupled into 32.5 g. (0.1 mole) of 2-(2-dimethylaminoethyl)-1-[2-(1-naphthylamino)-ethyl]-piperidine according to the procedure outlined under Example 3 herein for the preparation of 5-{4-{2-[(2-diisopropylaminoethyl)-methylamino] - ethylamino}-1-naphthylazo}-indazole. Crystallization of the crude dye from 2-propanol gives the desired 6-{4-{2-[2-(2-dimethylaminoethyl) - piperidino]-ethylamino}-1-naphthylazo}-indazole, of formula,

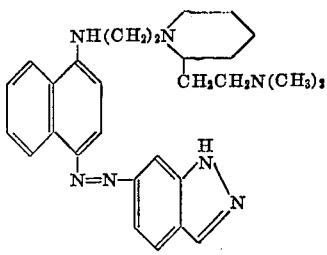

as orange-red crystals.

Utilizing the preparative methods described under Examples 1 through 15 herein, the following related compounds can be prepared, starting from the appropriate substituted 1-naphthylamine and aminonitrogenheterocyclic compound:

6-{4-[2-(2,6-dimethylmorpholino)-ethylamino]-1-naphthylazo}2,3-diphenylindole.
3,5-dimethyl-4-{2-[4-(3-pyridylazo)-1-naphthylamino]-ethyl}-morpholine.
Octahydro-9a-{methyl{2-[4-(3-pyridylazo)-1-naphthylamino]-ethyl}amino}-9aH-quinolizine.
3-{4-{2-[bis(2-methylallyl)-amino]-ethylamino}-1-naphthylazo}-pyridine.
3-[4-(2-dicyclopentylaminoethylamino)-1-naphthylazo]-as-triazine.
6-{4-[(1-methyl-2-pyrrolidinylmethyl)-amino]-1-naphthylazo}2-p-tolyl-as-triazine-3,5(2H,4H)-dione.
5-[4-(2-diethylaminocyclohexylamino)-1-naphthylazo]-6-methyl-3,4-pyridinedimethanol.
3-{4-[(1-methyl-3-pyrrolidinylmethyl)amino]-1-naphthylazo}-1,2,4-benzotriazine.

2-(2-dimethylaminoethyl) - 1 - [2 - (1 - naphthylaminoethyl]-piperidine, B.P. 170–171° C./0.07 mm., $n_D^{25}$ 1.5875, employed as a starting material in the above procedure, is prepared from N-(2-bromoethyl)-1-naphthylamine, hydrobromide, and 2-(2-dimethylaminoethyl)-piperidine according to the procedure described under Example 3 herein for the preparation of 1,1-diisopropyl-4 - methyl-7-(1-naphthyl)-diethylenetriamine. The other intermediate 1-naphthylamines employed herein can be prepared from the appropriate 1-naphthol or 1-naphthylamine precursors according to the procedures described under Examples 1 through 15.

Example 54

8-aminoquinoline (7.2 g., 0.05 mole) is diazotized and coupled into 12.8 g. (0.05 mole) of 1-[2-(1-naphthylamino)-ethyl]-piperazine according to the method outlined under Example 4 herein for the preparation of 8-[4-(3-diethylamino - 2,2 - dimethylpropylamino)-1-naphthylazo]-5,6-dimethoxyquinoline, trihydrochloride. Purification of the crude dye from 2-propanol gives the desired 8-{4-[2-(1-piperazinyl)-ethylamino]-1-naphthylazo}-quinoline, trihydrochloride, of formula,

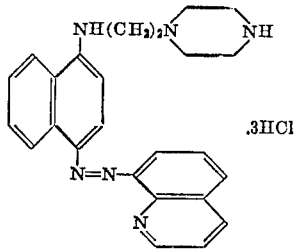

as a hydrated deep maroon crystalline solid, M.P. 210° C. (dec.).

Utilizing the preparative methods described under Examples 1 through 15 herein, the following related compounds can be prepared, starting from the appropriate substituted 1-naphthylamine and aminonitrogenheterocyclic compound:

1-methyl-5-{4-[(1-methyl-2-piperidinoethyl)-amino]-1-naphthylazo}-indole.
6-{4-[(2-diidopropylamino-1-methylethyl)amino]-1-naphthylazo}-8-methoxy-4,5-dimethyl-2(1H)quinolone.
6-{4-[2-(hexahydro-1-azepinyl)-1-methylethylamino]-1-naphthylazo}-1,4-dihydro-2-methyl-4-oxo-3-quinolinecarboxylic acid.
9-(2-diethylaminoethyl)-3-{4-{[1-methyl-2-(1-pyrrolidinyl)ethyl]amino}-1-naphthylazo}carbazole.
3-{4-{2-{{2-[(2-diethylaminoethyl)ethylamino]-ethyl}-ethylamino}-ethylamino}-1-naphthylazo}-quinoline.
5-{4-[2-(3-azabicyclo[3.3.1]nonan-3-yl)-ethylamino]-1-naphthylazo}-6-methylcinchomeronic acid, dimethyl ester.
6-{4-[2-(diethylaminomethyl)-cyclohexylamino]-1-napthylazo}-1,4-dihydro-2,3-quinoxalinedione.
6-{4-[2-(dimethylaminomethyl)-cyclopentylamino]-1-naphthylazo}-1,3-dihydro-2,4-quinazolinedione.
3-{4-[2-(dimethylaminomethyl)-cycloheptylamino]-1-naphthylazo}-pyridine.
6-{4-[3-(diethylaminomethyl)-1-methyl-4-piperidylamino]-1-naphthylazo}-4-phenyl-2(1H)-quinolone.
1,2,3,5,6-pentamethyl-4-{2-[4-(3-pyridylazo)-1-napthylamino]-ethyl}-piperazine.
2-{2-{4-{2-[4-(3-pyridylazo-1-naphthylamino]-ethyl}-1-piperazinyl}-ethoxy}-ethanol.
6-{4-[2-(1-ethyl-4-piperidyl)-ethylamino]-1-naphthylazo}-2,4(1H,3H)-quinazolinedione.
1-pentyl-4-{3-[4-(3-pyridylazo)-1-naphthylamino]-propyl}-piperazine.

1-[2-(1-naphthylamino)-ethyl]-piperazine, B.P. 170–173° C./0.25 mm., $n_D^{25}$ 1.7023, employed as an intermediate in the above procedure, is prepared from 1-naphthol and 1-(2-aminoethyl)-piperazine according to the procedure outlined under Example 8 herein for the preparation of 1-(3-dimethylamino-propylamino)-naphthalene. The other intermediate 1-naphthylamines employed herein can be prepared from the appropriate 1-naphthol or 1-naphthylamine precursors according to the procedures described under Examples 1 through 15.

*Example 55*

3-aminodibenzofuran (18.3 g., 0.1 mole) is diazotized and coupled into 30.8 g. (0.1 mole) of 1-[2-(1-naphthylamino)-ethyl]-1-azaspiro[4.5]-decane according to the procedure described under Example 1 herein for the preparation of 5-[4-(2-diethylaminoethylamino)-1-naphthylazo]-uracil. Crystallization of the crude dye from 2-propanol gives the desired 1-{2-[4-(3-dibenzofuranyl-azo)-1-naphthylamino]-ethyl}-1-azaspiro[4.5]-decane, of formula,

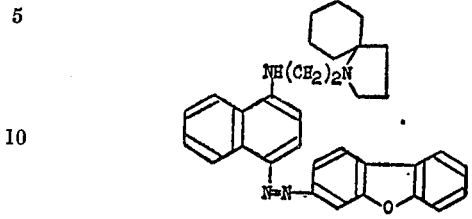

as red crystals.

Utilizing the preparative methods described under Examples 1 through 15 herein, the following related compounds can be prepared, starting from the appropriate substituted 1-naphthylamine and hydroxy or aminoheterocyclic compound:

2-(2-dimethylaminoethyl)-5-ethyl-1-{2-[4-(5-phenyl-2-thienylazo)-1-naphthylamino]-ethyl}-piperidine.
1,2,3,4-tetrahydro-6-methyl-9-{4-[2-(octahydro-1H-pyrido[1,2-c]-pyrimidin-2-yl)-ethylamino]-1-naphthylazo}-10-thiaxanthenone.
4-dimethylaminotetrahydro-2-{1-[4-(4-phenyl-2-thienylazo)1-naphthylamino]-ethyl}-furan.
1-{2-[4-(6-chromanylazo)-1-naphthylamino]-ethyl}-α-methyl-3-piperidine-methanol.
9-{4-{2-[(3-dimethylaminopropyl)-(1-methyl-3-piperidyl)amino]-ethylamino}-1-naphthylazo}-1,2,3,4-tetrahydro-6-methyl-10-thiaxanthenone.
8-methyl-5{4-[2-(octahydro-2H-pyrido-[1,2]pyrazin-2-yl)-ethylamino]-1-naphthylazo}-thiachromone.
Octahydro-3-{{4-[3-(methylsulfonyl)-5-nitro-2-thienylazo]-1-naphthylamino}methyl}-1H-quinolizine.
5-{4-[1-(diisopropylaminomethyl)-cyclohexylamino]-1-naphthylazo}-8-methyl-4-thiachromanone.
4-{2-[4-(6-chromanylazo)-1-naphthylamino]ethyl}-thiamorpholine.
8-methyl-5-{4-[2-(octahydro-2(1H)-isoquinolyl)-ethylamino]-1-naphthylazo}-thiachromone.
1-{4-{2-[(2-dibutylaminoethyl)-(2-hydroxyethyl)amino]-ethylamino}-1-naphthylazo}-4-methyl-9-xanthenone.
1-{4-{2-[4-(2-diethylaminoethylamino)2,2,6,6-tetramethylpiperidino]-ethylamino}-1-naphthylazo}-4-methyl-10-thiaxanthenone.
1,2,2,5,5-pentamethyl-4-{2-{4-[5-(methylsulfonyl)-3-nitro-2-thienylazo]-1-naphthylamino}-ethyl}-homopiperazine.
1,2,3,4-tetrahydro-6-methyl-9-{4-{2-[2-(2-piperidinoethyl)-piperidino]-ethylamino}-1-naphthylazo}-benzo[5,6]thiapyrano[3,2-c]thiapyran-10-one.
5-{4-[2-(1-butyl-2-piperidyl)-ethylamino]-1-naphthylazo}-N-ethyl-4-nitro-2-thiophenesulfonamide.
1-{2-{4-[3,5-bis(methylsulfonyl)-2-thienylazo]-1-naphthylamino}ethyl}-2,4,6-trimethylpiperidine.

1-[2-(1-naphthylamino)-ethyl-1-azaspiro[4.5]-decane, employed as an intermediate in the above procedure, is prepared from N-(2-bromoethyl)-1-naphthylamine, hydrobromide, and 1-azaspiro[4,5]-decane according to the procedure described under Example 3 herein for the preparation of 1,1-diisopropyl-4-methyl-7-(1-naphthyl)-diethylenetriamine. The other intermediate 1-naphthylamines employed herein can be prepared from the appropriate 1-naphthol or 1-naphthylamine precursors according to the procedures described under Examples 1 through 15.

*Example 56*

To an aqueous solution of 2.30 g. (0.0030 mole) of 2-(4,6-disulfo-1,3,2-benzodioxastibiol-2-yloxy)-1-phenol-3,5-disulfonic acid, pentasodium salt, heptahydrate there is added an aqueous solution of 2.57 g. (0.0050 mole) of 3 - [4 - (2 - diethylaminoethylamino) - 1 - naphthylazo]-pyridine, trihydrochloride, trihydrate. After stirring for a few minutes the supernatent solution is removed from the material which separates. This residue is washed with methanol, powdered, and dried in vacuo. This material, M.P. 215° C. (dec.), is a salt which contains the above pyridine compound and the above disulfonic acid in a molar ratio of about five to four.

We claim:

1. A member selected from the group consisting of a free base of formula

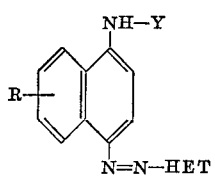

and addition salts thereof with pharmaceutically acceptable acids; wherein

R represents a member selected from the group consisting of hydrogen, chloro, bromo, lower alkyl and lower alkoxy;

Y represents a member selected from the group consisting of

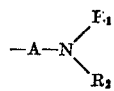

and

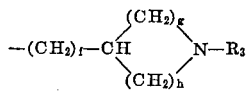

wherein A represents a member selected from the group consisting of alkylene containing between 2 and 8 carbon atoms inclusive, and alkylene containing more than 2 and less then 7 carbon atoms in which one of the methylene groups not attached to the nitrogen atoms of

is replaced by a member selected from the group consisting of —O—, —S—, =CHOH, =COH(lower alkyl), =N(lower alkyl) and =CH(lower dialkylaminoalkyl);

$R_1$ and $R_2$ each represent a member selected from the group consisting of (a) alkyl, alkoxyalkyl, hydroxyalkyl and cycloalkyl each containing fewer than 7 carbon atoms and (b) alkyl, methallyl, and lower dialkylaminoalkyl containing 3 to 7 carbon atoms inclusive, and further members wherein —$NR_1R_2$ represents a heterocyclic radical selected from the group consisting of heterocyclic radicals containing fewer than 10 carbon atoms containing at least one hetero atom selected from the group consisting of oxygen, nitrogen and sulfur and derivatives thereof containing at least one nuclear substituent selected from the group consisting of lower alkyl, lower hydroxyalkyl, hydroxy, lower alkoxy, and lower dialkylaminoalkyl;

$f$ represents an integer from 0 to 3 inclusive; $g$ and $h$ represent integers such that the sum of $g$ and $h$ equals an integer from 3 to 4;

$R_3$ represents a member selected from the group consisting of lower alkyl, lower hydroxyalkyl, lower alkoxyalkyl and lower dialkylaminoalkyl; and HET is a heterocyclic radical selected from the group consisting of

| | |
|---|---|
| pyrimidyl | pyrrolopyridinyl |
| pyridyl | pyridobenzimidazolyl |
| indazolyl | benzothiazolyl |
| quinolyl | naphthothiazolyl |
| isoquinolyl | tetranaphthoxazolyl |
| dibenzofuryl | carbazolyl |
| furyl | tetrahydrocarbazolyl |
| benzofuryl | indolyl |
| tetrahydrodibenzofuryl | pyrrolyl |
| benzimidazolyl | thianthrenyl |
| naphthimidazolyl | phenoxathiinyl |
| quinazolinyl | methylenedioxyphenyl |
| quinoxalinyl | benzodioxanyl |
| thiazolyl | benzoxathiolyl |
| pyrazolyl | benzothiadiazolyl |
| pyrazolinyl | benzisothiazolyl |
| phthalazinyl | benzisothiazolinyl |
| benzophthalazine | thienopyridyl |
| benzothiazinyl | benzoxazolinyl |
| dibenzothiazinyl | benzoxazolyl |
| phenothiazinyl | napthoxazolinyl |
| thianaphthenyl | acridinyl |
| dibenzothienyl | acridanyl |
| benzotriazolyl | thiadiazolyl |
| triazolyl | oxadiazolyl |
| triazolinyl | imidazolyl |
| tetrazolyl | isoxazolyl |
| benzoquinolyl | thiaxanthenyl |
| phenanthridinyl | xanthenyl |
| dihydronaphthoxazinyl | benzopyranyl |
| tetrahydroquinazolinyl | pyrazinyl |
| tetrahydroquinolyl | pyridazinyl |
| indolinyl | cinnolinyl |
| dihydrobenzoxazinyl | benzocinnolinyl |
| dihydroquinolyl | naphthimidazolyl |
| tetrahydroquinoxalinyl | thienyl |
| tetrahydrobenzoquinolyl | dihydrothienyl |
| dibenzothiadiazepinyl | thiophanthrenyl |
| benzothiapyranopyridyl | triazinyl |
| phenazinyl | benzotriazinyl |
| phenazinium chloride | dihydroquinoxalinyl |
| phenazonium hydroxide inner salt | dihydroquinazolinyl chromonyl |
| phenazathionium chloride | thiachromonyl and |
| phenazoxonium chloride | benzothiapyranothiapyranyl |
| isophenoxazinyl | | and derivatives of said heterocyclic radicals containing at least one substituent of the group consisting of keto, hydroxy, lower alkyl, trifluoromethyl, phenyl, chlorophenyl, lower alkoxy, nitro, amino, imino, lower hydroxyalkyl, lower aminoalkyl, chloro, bromo, lower dialkylaminoalkyl, lower alkylamino, lower dialkylaminopiperidino, lower carbalkoxy, lower alkyl carbamate ester, phenoxy, phenylazo, anilino, pyridyl, mercapto, lower alkylmercapto, phenylmercapto, N-oxide, benzyl, tolyl, styryl, benzoyl, acetyl, trifluoroacetyl, acetamido, arsonic acid, sulfo, carboxy, thio, sulfonamido, sulfonyl, imidazolinyl and carboxamidine.

2. 5 - [4-(2-diethylaminoethylamino)-1-naphthylazo]-uracil.

3. 1-diethylamino-3-[4-(3-pyridylazo) - 1 - naphthylamino]-2-propanol.

4. 1-{2-[4-(2-thiazolylazo)-1-naphthylamino] - ethyl} piperidine.

5. 4-[4-(2-diethylaminoethylamino) - 7 - methoxy-1-naphthylazo]-2,3-dimethyl-1-phenyl-3-pyrazoline-5-one.

6. 6-[4-(2-dimethylamino - 1 - methylethylamino)-1-naphthylazo]-1 H-benzotriazole.

(References on following page)

References Cited in the file of this patent

UNITED STATES PATENTS

| | | |
|---|---|---|
| 1,925,434 | Clingestein et al. | Sept. 5, 1933 |
| 2,022,921 | Mietzsch et al. | Dec. 3, 1935 |
| 2,068,353 | Schneiderwirth | Jan. 19, 1937 |
| 2,307,650 | Tisza et al. | Jan. 5, 1943 |
| 2,430,439 | Winnek et al. | Nov. 5, 1947 |
| 2,561,948 | Rawlins | July 24, 1951 |
| 2,980,665 | Langley et al. | Apr. 18, 1961 |

FOREIGN PATENTS

| | | |
|---|---|---|
| 442,190 | Great Britain | Feb. 4, 1936 |

OTHER REFERENCES

Dickey et al.: "Ind. and Eng. Chem.," vol. 46, October 1954, pp. 2213–2220.

Conant and Blatt: "The Chem. of Org. Comp.," 4 ed. (1956), pp. 183–184, The Macmillian Co., New York.

UNITED STATES PATENT OFFICE
CERTIFICATE OF CORRECTION

Patent No. 3,139,421  June 30, 1964

Edward F. Elslager et al.

It is hereby certified that error appears in the above numbered patent requiring correction and that the said Letters Patent should read as corrected below.

Column 8, line 23, for "-naphthylazol" read -- -naphthylazo --; line 29, for "-naphthaylazo" read -- naphthylazo --; column 9, line 7, for "-dimethyl-" read -- -diethyl- --; lines 34 and 35, for "-naphthylazol" read -- -naphthylazo --; column 15, line 25, for "-(diethylaminoethyl)-" read -- -(diethylaminomethyl)- --; column 17, lines 11 to 22, the formula should appear as shown below instead of as in the patent:

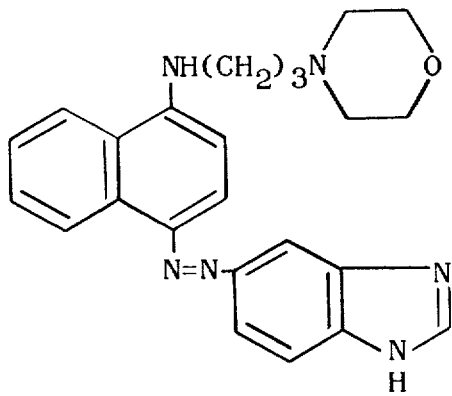

column 23, line 69, for "-(3-dimethlaminopropylamino)-" read -- -(3-dimethylaminopropylamino)- --; column 25, line 20, for "napthyl)-" read -- naphthyl)- --; column 27, line 52, for "3-[5-" read -- 3-[4-(5- --; line 53, for "-propylamino" read -- -propylimino --; same column 27, line 72, for "5" read -- 3 --; column 30, lines 29 and 30, for "-naphthylenediamine" read -- -naphthylethylenediamine --; column 31, lines 46 to 55, the formula should appear as shown below instead of as in the patent:

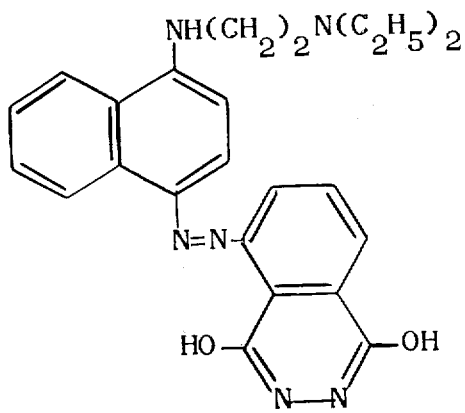

same column 31, line 64, for "-piperilino" read ---piperidino ---; column 32, line 66, for "-(2-diethylaminoethylamin)-" read -- -(2-diethylaminoethylamino)- ---; column 33, line 39, for "130-123° C." read -- 130-132° C. ---; line 53, for "2-[2-" read -- 2-[(2- ---; same column 33, line 70, for "naphthylamine" read -- naphthylamino ---; column 35, lines 19 to 28, the formula should appear as shown below instead of as in the patent:

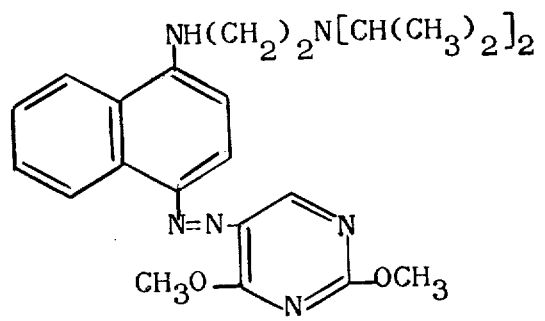

same column 35, line 60, for "-(diethylaminoethyl)-" read -- -(diethylaminomethyl)- ---; line 68, for "1.57.82" read -- 1.5782 ---; column 37, line 16, for "-pyrazol" read --- -pyrazolol ---; column 40, line 8, for "-(3-diethylaminopropyoxy)-" read -- -(3-diethylaminopropoxy)- ---; line 20, for "1-naphylthylamines" read -- 1-naphthylamines ---; line 31, for "-inadzole" read ---indazole ---; line 61, for "napthylazo" read -- naphthylazo ---; line 67, for "diimethylaminopyridine" read -- dimethylaminopyridine ---; same column 40, line 70, for "-ametamido-" read -- -acetamido- ---; column 41, line 9, for "-piperidino" read -- -piperidinol ---; column 42, line 47, for "-naphthto" read -- -naphtho ---; line 50, for "3-diethylaminoproply" read -- 3-diethylaminopropyl ---; column 43, line 32, for "-2,2-dimethylproplyamino)-" read -- -2,2-dimethylpropylamino)- ---; line 36, for "2-[4-2-" read -- 2-[4-(2- ---; same column 43, line 45, for "1-{2-4-" read -- 1-{2-[4- ---; column 44, line 41, for "3-[-5-" read -- 3-[5- ---; line 50, for "-(2-methylally)-" read -- -(2-methylallyl)- ---; column 46, lines 18 to 29, the formula should appear as shown below instead of as in the patent:

3,139,421

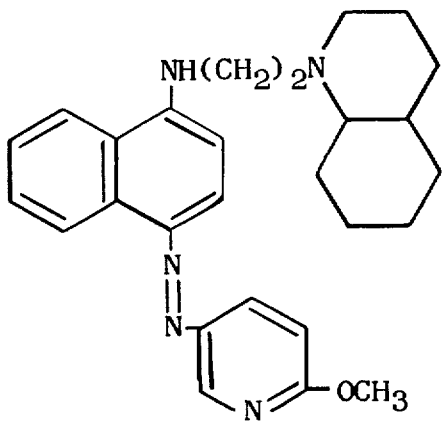

column 47, line 73, for "N,-diethylethylenediamine" read
-- N,N-diethylethylenediamine --; column 51, lines 10 to 19,
the formula should appear as shown below instead of as in the
patent:

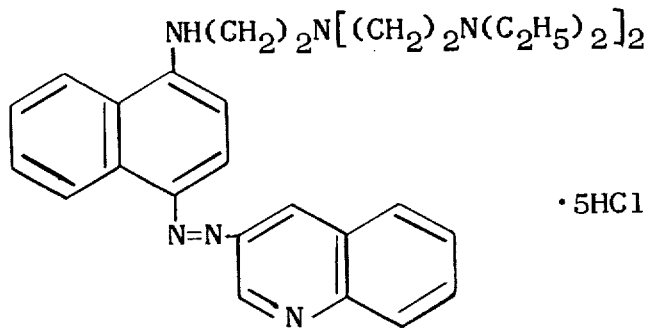

same column 51, line 69, for "1[2-1-" read -- 1[2-(1- --; column
54, line 40, for "-(2-cyclohexylmethylamino)-" read -- -(cyclo-
hexylmethylamino)- --; column 55, line 7, for "-oxo2-" read
-- -oxo-2- --; line 29, for "nitrate" read -- nitrite --; same
column 55, line 57, for "wash" read -- washed --; column 59,
line 33, for "-trifluoromethyl-" read ---trifluoroacetyl- --;
line 70, for "-2-[1-" read -- -2-[2-(1- --; column 60, line 22,
for "prepared" read -- preparative --; line 33, for "naphtyl-
amino]-" read -- naphthylamino]- --; same column 60, line 49,
for "ethyly" read -- -ethyl --.

Signed and sealed this 23rd day of March 1965.

(SEAL)
Attest:

ERNEST W. SWIDER
Attesting Officer

EDWARD J. BRENNER
Commissioner of Patents